(12) United States Patent
Tan-Ang et al.

(10) Patent No.: US 12,088,884 B2
(45) Date of Patent: Sep. 10, 2024

(54) USER INTERFACES AND ASSOCIATED SYSTEMS AND PROCESSES FOR CONTROLLING PLAYBACK OF CONTENT

(71) Applicant: Apple Inc., Cupertino, CA (US)

(72) Inventors: Jeff Tan-Ang, San Jose, CA (US); Christopher J. Ellingford, Alameda, CA (US); Christopher J. Sanders, San Jose, CA (US); Dila Sart, San Jose, CA (US); Justin K. Arnold, San Jose, CA (US); Justin D. Gaussoin, Corona Del Mar, CA (US); Kevin M. Sandlow, Cupertino, CA (US); Lucio Moreno Rufo, Campbell, CA (US); Neil P Cormican, Menlo Park, CA (US); Policarpo B. Wood, San Jose, CA (US); Yonghyun A. Kim, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/805,320

(22) Filed: Jun. 3, 2022

(65) Prior Publication Data

US 2022/0394346 A1 Dec. 8, 2022

Related U.S. Application Data

(60) Provisional application No. 63/197,489, filed on Jun. 6, 2021.

(51) Int. Cl.
*H04N 21/47* (2011.01)
*H04N 21/2187* (2011.01)
*H04N 21/431* (2011.01)
*H04N 21/462* (2011.01)
*H04N 21/472* (2011.01)
(Continued)

(52) U.S. Cl.
CPC ... *H04N 21/47217* (2013.01); *H04N 21/2187* (2013.01); *H04N 21/4316* (2013.01); *H04N 21/4622* (2013.01); *H04N 21/482* (2013.01); *H04N 21/8133* (2013.01)

(58) Field of Classification Search
None
See application file for complete search history.

(56) References Cited

U.S. PATENT DOCUMENTS

| | | | |
|---|---|---|---|
| 6,323,846 | B1 | 11/2001 | Westerman et al. |
| 6,570,557 | B1 | 5/2003 | Westerman et al. |

(Continued)

FOREIGN PATENT DOCUMENTS

| | | |
|---|---|---|
| WO | 2013/169849 A2 | 11/2013 |
| WO | 2014/105276 A1 | 7/2014 |

OTHER PUBLICATIONS

International Search Report received for PCT Patent Application No. PCT/US2022/072750, mailed on Oct. 20, 2022, 7 pages.

*Primary Examiner* — Samira Monshi
(74) *Attorney, Agent, or Firm* — Kubota & Basol LLP

(57) ABSTRACT

In some embodiments, an electronic device presents a user interface for controlling the playback of content items. In some embodiments, the user interface includes a plurality of selectable options for controlling playback of a respective content item overlaid on the content item. In some embodiments, an electronic device presents a user interface for browsing and switching between content items available for playback.

42 Claims, 33 Drawing Sheets

(51) Int. Cl.
    *H04N 21/482*     (2011.01)
    *H04N 21/81*      (2011.01)

(56)         References Cited

U.S. PATENT DOCUMENTS

| | | |
|---|---|---|
| 6,677,932 B1 | 1/2004 | Westerman |
| 7,614,008 B2 | 11/2009 | Ording |
| 7,633,076 B2 | 12/2009 | Huppi et al. |
| 7,653,883 B2 | 1/2010 | Hotelling et al. |
| 7,657,849 B2 | 2/2010 | Chaudhri et al. |
| 7,663,607 B2 | 2/2010 | Hotelling et al. |
| 7,844,914 B2 | 11/2010 | Andre et al. |
| 7,957,762 B2 | 6/2011 | Herz et al. |
| 8,006,002 B2 | 8/2011 | Kalayjian et al. |
| 8,239,784 B2 | 8/2012 | Hotelling et al. |
| 8,279,180 B2 | 10/2012 | Hotelling et al. |
| 8,381,135 B2 | 2/2013 | Hotelling et al. |
| 8,479,122 B2 | 7/2013 | Hotelling et al. |
| 9,348,458 B2 | 5/2016 | Hotelling et al. |
| 9,933,937 B2 | 4/2018 | Lemay et al. |
| 2002/0015024 A1 | 2/2002 | Westerman et al. |
| 2005/0190059 A1 | 9/2005 | Wehrenberg |
| 2006/0017692 A1 | 1/2006 | Wehrenberg et al. |
| 2006/0033724 A1 | 2/2006 | Chaudhri et al. |
| 2006/0197753 A1 | 9/2006 | Hotelling |
| 2012/0194742 A1 | 8/2012 | Barnes et al. |
| 2015/0089372 A1 | 3/2015 | Mandalia et al. |
| 2015/0370455 A1 | 12/2015 | Van Os et al. |
| 2016/0314819 A1 | 10/2016 | Elsner |
| 2018/0014076 A1 | 1/2018 | Shanson et al. |
| 2018/0249113 A1* | 8/2018 | Faulkner ................ H04N 21/47 |
| 2020/0021894 A1* | 1/2020 | Sanchez ............. H04N 21/8106 |

\* cited by examiner

USER INTERFACES AND ASSOCIATED SYSTEMS AND PROCESSES FOR CONTROLLING PLAYBACK OF CONTENT

CROSS-REFERENCE TO RELATED APPLICATIONS

This application claims the benefit of U.S. Provisional Application No. 63/197,489, filed Jun. 6, 2021, the contents of which are incorporated herein by reference in its entirety for all purposes.

FIELD OF THE DISCLOSURE

This specification relates generally to electronic devices that present user interface for controlling playback of content items.

BACKGROUND

User interaction with electronic devices has increased significantly in recent years. These devices can be devices such as computers, tablet computers, televisions, multimedia devices, mobile devices, and the like. In some circumstances, users wish to use electronic devices to control playback of content items and view content items available for playback.

SUMMARY

Some embodiments described in this disclosure are directed to ways of controlling playback of content items. Some embodiments described in this disclosure are directed to ways of browsing and switching between items of content available for playback. Enhancing a user's interactions with an electronic device in performing the above actions improves the user's experience with the device and decreases user interaction time, which is particularly important where input devices are battery-operated.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

DETAILED DESCRIPTION

Description of Embodiments

Figure 1A:
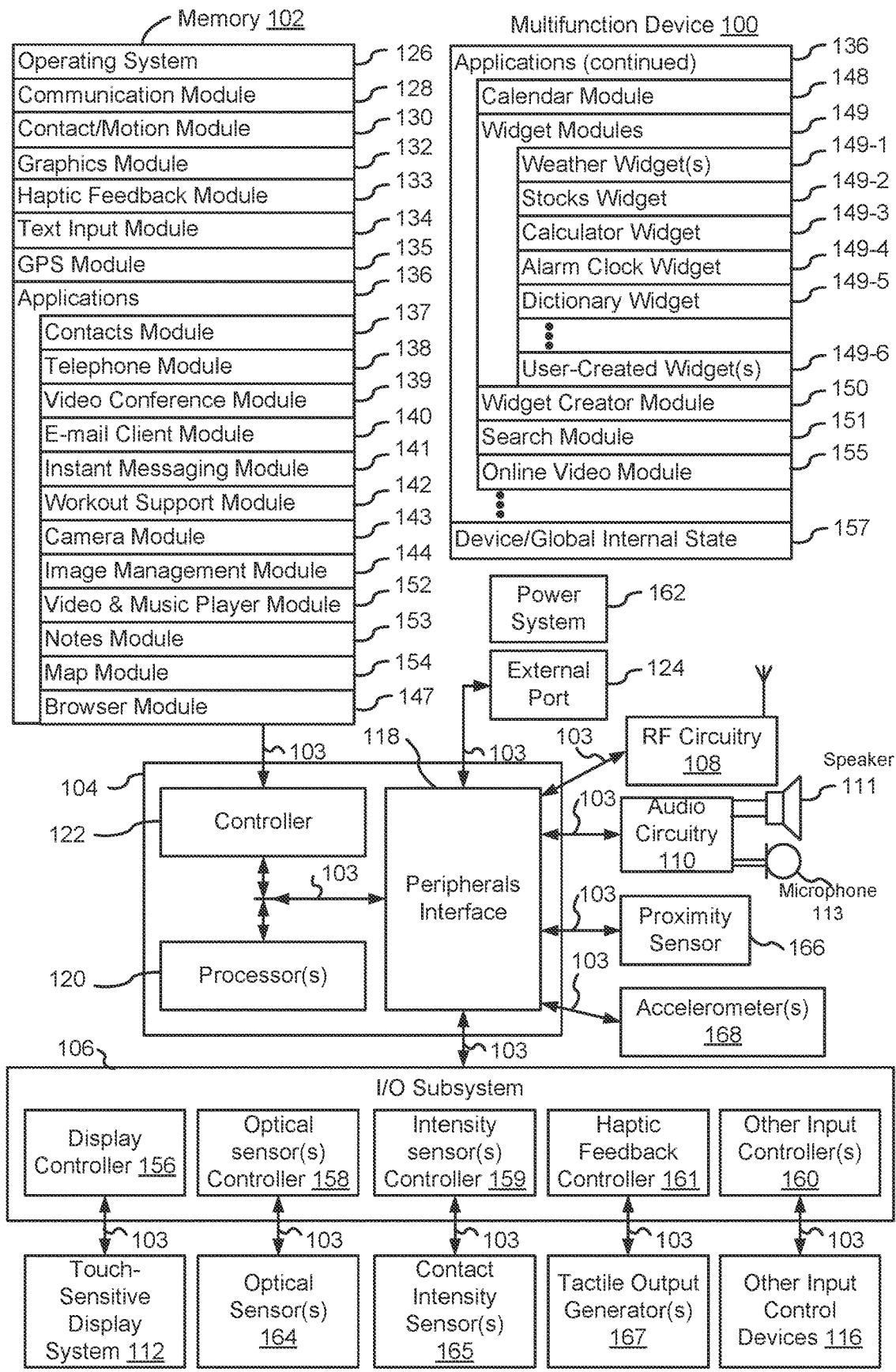
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

In some implementations, an example electronic device plays content items, such as video content and/or audio content, in a user interface that includes user interface elements for controlling the playback of the content items. For example, the user interface includes a scrubber bar and options to change the subtitle, audio, and picture-in-picture settings of the content items being played. Such techniques can reduce the cognitive burden on a user who uses an example electronic device and streamline a process for modifying playback of content items at an electronic device.

In some implementations, an example electronic device presents user interfaces for browsing and switching between content items available for playback. For example, the electronic device presents a user interface for browsing content while presenting an item of content and/or a channel guide user interface with information about content available for playback on the electronic device. Such techniques can reduce the cognitive burden on a user who uses an example electronic device and streamline a process for browsing and switching between content items at an electronic device.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Exemplary Devices

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touch pads), are, optionally, used. It should also be understood that, in some embodiments, the device is not a portable communications device, but is a desktop computer or a television with a touch-sensitive surface (e.g., a touch screen display and/or a touch pad). In some embodiments, the device does not have a touch screen display and/or a touch pad, but rather is capable of outputting display information (such as the user interfaces of the disclosure) for display on a separate display device, and capable of receiving input information from a separate input device having one or more input mechanisms (such as one or more buttons, a touch screen display and/or a touch pad). In some embodiments, the device has a display, but is capable of receiving input information from a separate input device having one or more input mechanisms (such as one or more buttons, a touch screen display and/or a touch pad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse and/or a joystick. Further, as described above, it should be understood that the described electronic device, display and touch-sensitive surface are optionally distributed amongst two or more devices. Therefore, as used in this disclosure, information displayed on the electronic device or by the electronic device is optionally used to describe information outputted by the electronic device for display on a separate display device (touch-sensitive or not). Similarly, as used in this disclosure, input received on the electronic device (e.g., touch input received on a touch-sensitive surface of the electronic device) is optionally used to describe input received on a separate input device, from which the electronic device receives input information.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, a television channel browsing application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable or non-portable devices with touch-sensitive displays, though the devices need not include touch-sensitive displays or displays in general, as described above. FIG. 1A is a block diagram illustrating portable or non-portable multifunction device 100 with touch-sensitive displays 112 in accordance with some embodiments. Touch-sensitive display 112 is sometimes called a "touch screen" for convenience, and is sometimes known as or called a touch-sensitive display system. Device 100 includes memory 102 (which optionally includes one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable or non-portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits. Further, the various components shown in FIG. 1A are optionally implemented across two or more devices; for example, a display and audio circuitry on a display device, a touch-sensitive surface on an input device, and remaining components on device 100. In such an embodiment, device 100 optionally communicates with the display device and/or the input device to facilitate operation of the system, as described in the disclosure, and the various components described herein that relate to display and/or input remain in device 100, or are optionally included in the display and/or input device, as appropriate.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures) as input. In some embodiments, the one or more input devices are integrated with the computer system. In some embodiments, the one or more input devices are separate from the computer system.

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. As described above, the touch-sensitive operation and the display operation of touch-sensitive display 112 are optionally separated from each other, such that a display device is used for display purposes and a touch-sensitive surface (whether display or not) is used for input detection purposes, and the described components and functions are modified accordingly. However, for simplicity, the following description is provided with reference to a touch-sensitive display. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
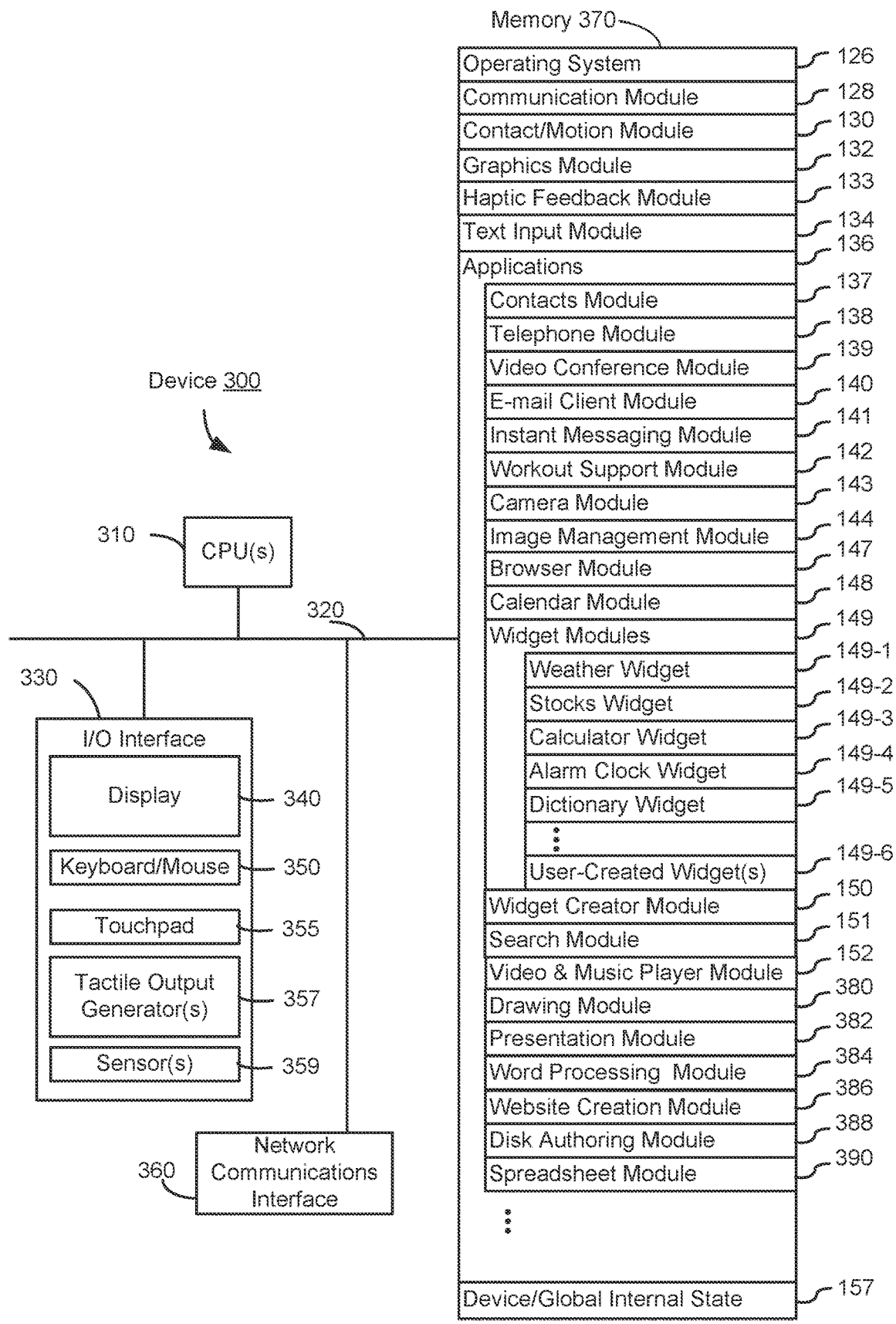
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:
   Contacts module 137 (sometimes called an address book or contact list);
   Telephone module 138;
   Video conference module 139;
   E-mail client module 140;
   Instant messaging (IM) module 141;
   Workout support module 142;
   Camera module 143 for still and/or video images;
   Image management module 144;
   Video player module;
   Music player module;
   Browser module 147;
   Calendar module 148;
   Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
   Widget creator module 150 for making user-created widgets 149-6;
   Search module 151;
   Video and music player module 152, which merges video player module and music player module;
   Notes module 153;
   Map module 154; and/or
   Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
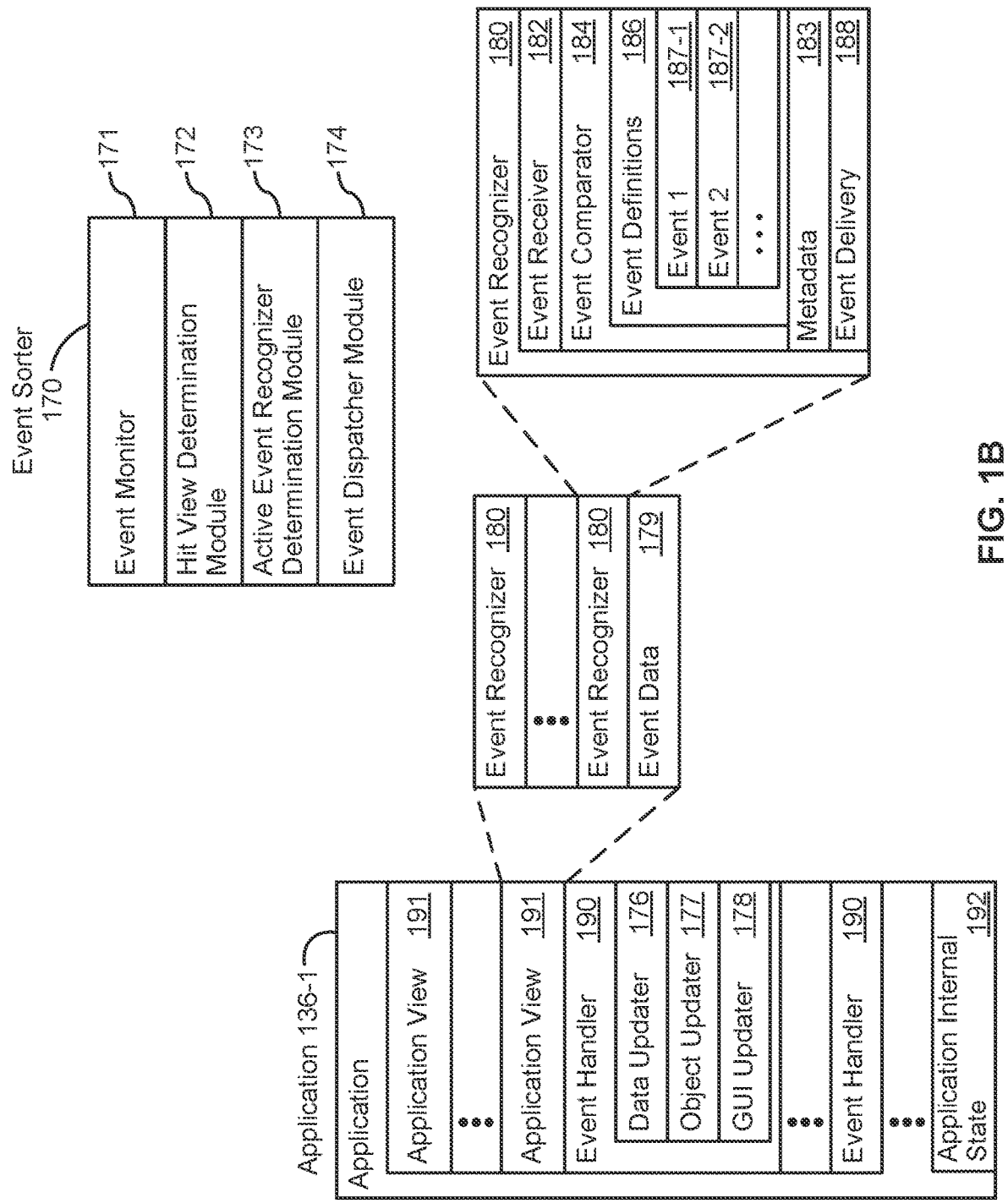
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
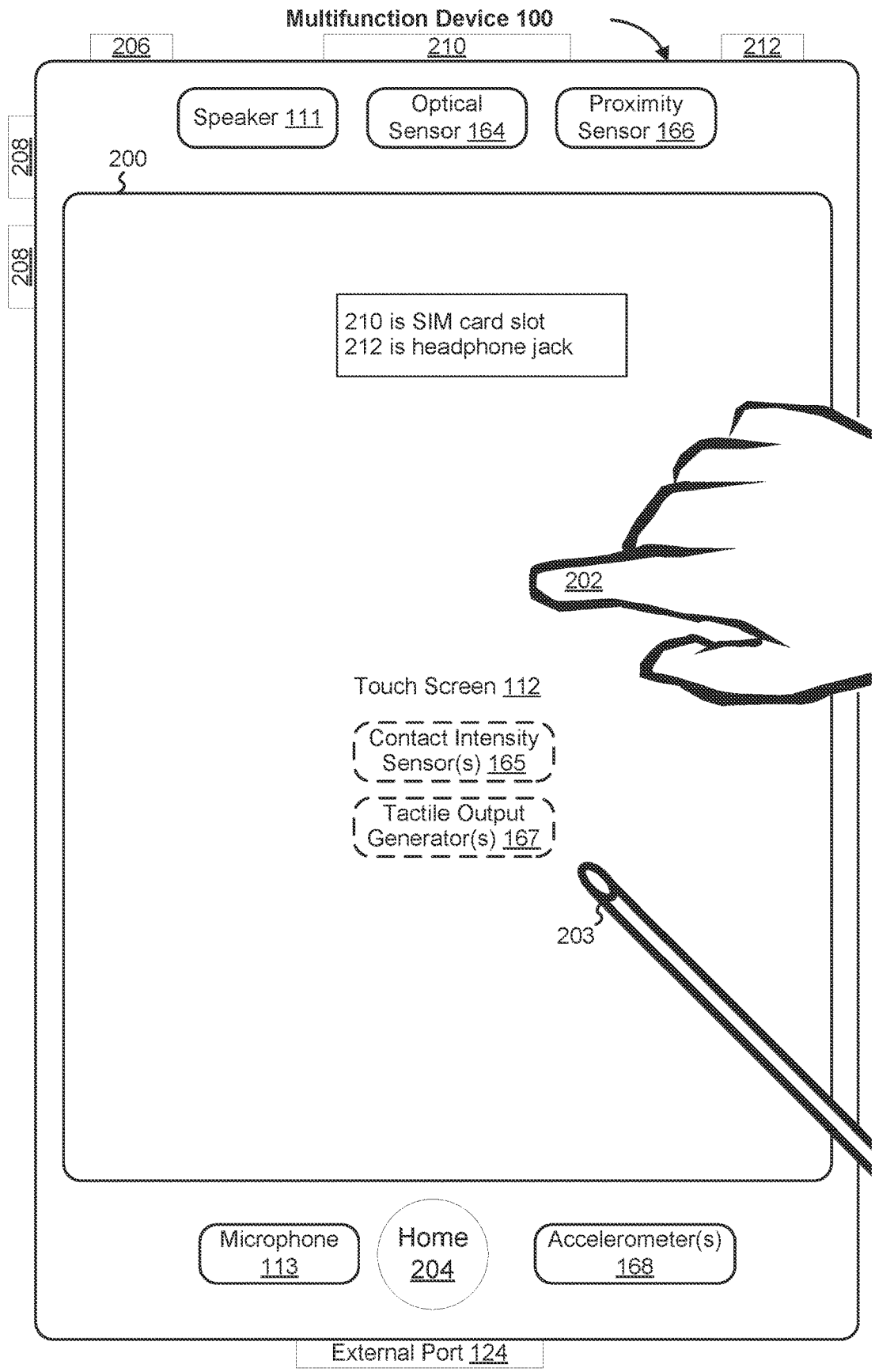
FIG. 2 illustrates a portable multifunction device having a touch screen in accordance with some embodiments.

FIG. 2 illustrates a portable or non-portable multifunction device 100 having a touch screen 112 in accordance with some embodiments. As stated above, multifunction device 100 is described as having the various illustrated structures (such as touch screen 112, speaker 111, accelerometer 168, microphone 113, etc.); however, it is understood that these structures optionally reside on separate devices. For example, display-related structures (e.g., display, speaker, etc.) and/or functions optionally reside on a separate display device, input-related structures (e.g., touch-sensitive surface, microphone, accelerometer, etc.) and/or functions optionally reside on a separate input device, and remaining structures and/or functions optionally reside on multifunction device 100.

The touch screen 112 optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 include the display and the touch-sensitive surface, as described above, but rather, in some embodiments, optionally communicates with the display and the touch-sensitive surface on other devices. Additionally, device 300 need not be portable. In some embodiments, device 300 is a laptop computer, a desktop computer, a tablet computer, a multimedia player device (such as a television or a set-top box), a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components.

Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable or non-portable multifunction device 100 (FIG. 1A), or a subset thereof. Furthermore, memory 370 optionally stores additional programs, modules, and data structures not present in memory 102 of portable or non-portable multifunction device 100. For example, memory 370 of device 300 optionally stores drawing module 380, presentation module 382, word processing module 384, website creation module 386, disk authoring module 388, and/or spreadsheet module 390, while memory 102 of portable or non-portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
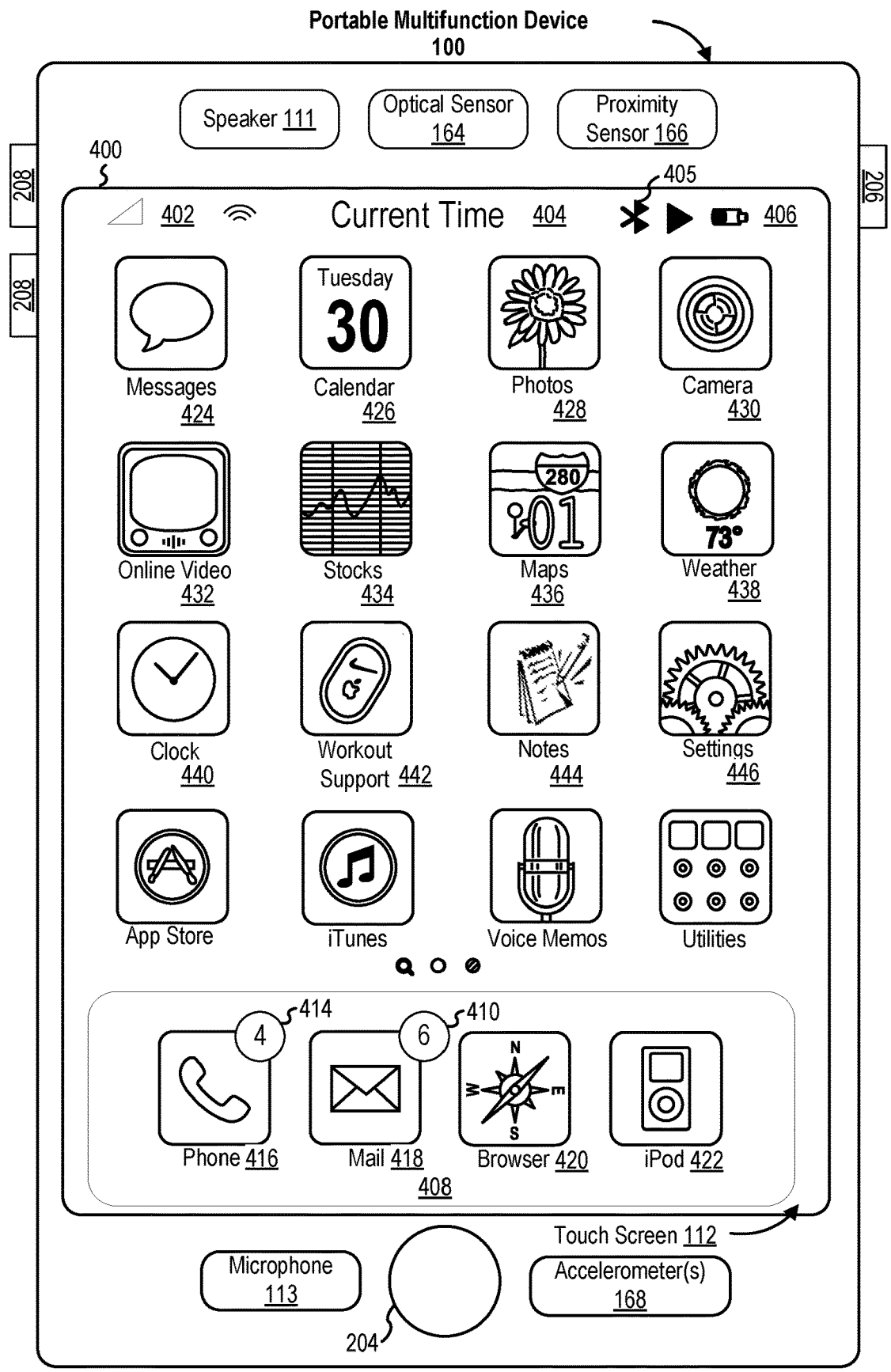
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;

Tray 408 with icons for frequently used applications, such as:

- Icon 416 for telephone module 138, labeled "Phone," which optionally includes an indicator 414 of the number of missed calls or voicemail messages;
- Icon 418 for e-mail client module 140, labeled "Mail," which optionally includes an indicator 410 of the number of unread e-mails;
- Icon 420 for browser module 147, labeled "Browser;" and
- Icon 422 for video and music player module 152, also referred to as iPod (trademark of Apple Inc.) module 152, labeled "iPod;" and Icons for other applications, such as:

- Icon 424 for IM module 141, labeled "Messages;"
- Icon 426 for calendar module 148, labeled "Calendar;"
- Icon 428 for image management module 144, labeled "Photos;"
- Icon 430 for camera module 143, labeled "Camera;"
- Icon 432 for online video module 155, labeled "Online Video;"
- Icon 434 for stocks widget 149-2, labeled "Stocks;"
- Icon 436 for map module 154, labeled "Maps;"
- Icon 438 for weather widget 149-1, labeled "Weather;"
- Icon 440 for alarm clock widget 149-4, labeled "Clock;"
- Icon 442 for workout support module 142, labeled "Workout Support;"
- Icon 444 for notes module 153, labeled "Notes;" and
- Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
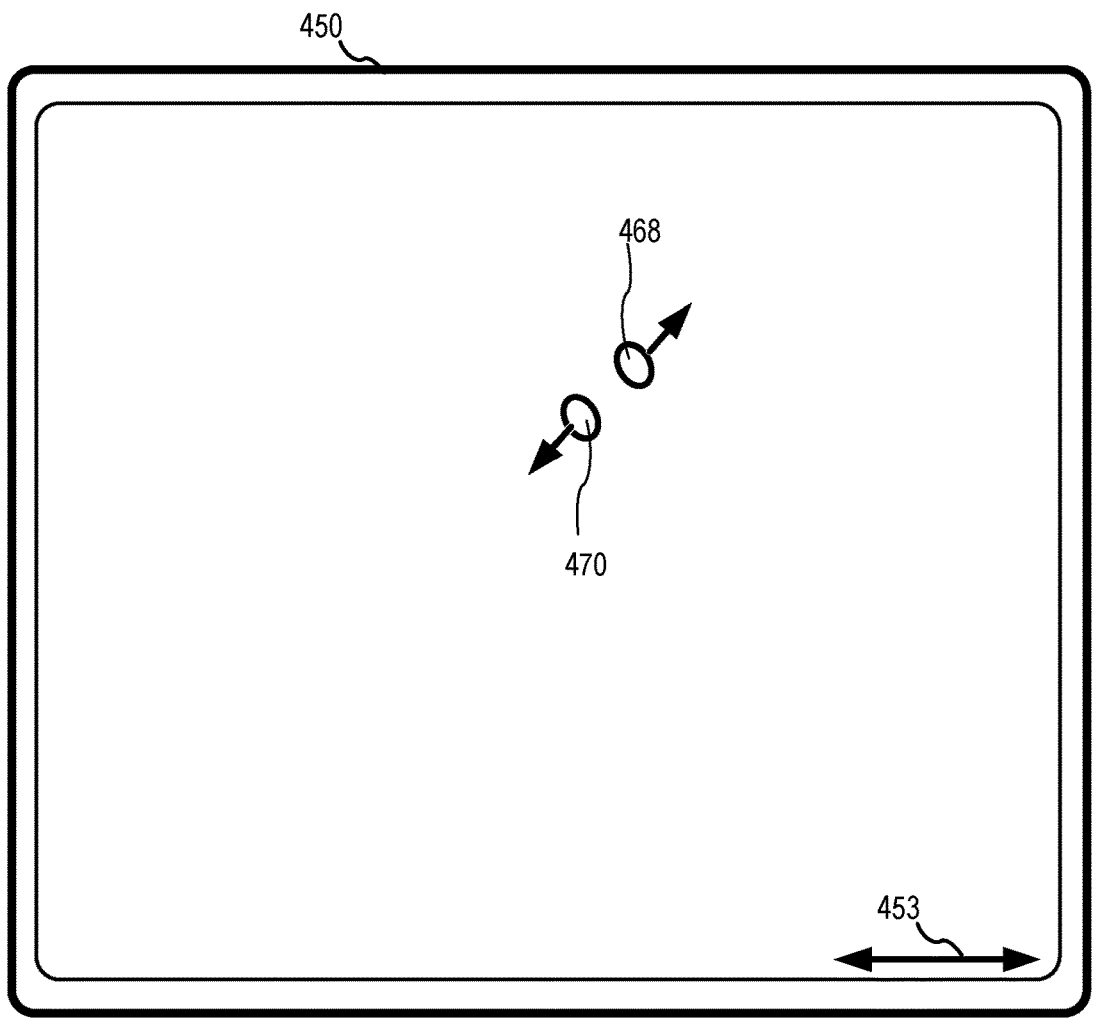
FIG. 4B illustrates an exemplary user interface for a multifunction device with a touch-sensitive surface that is separate from the display in accordance with some embodiments.
Figure 4B:
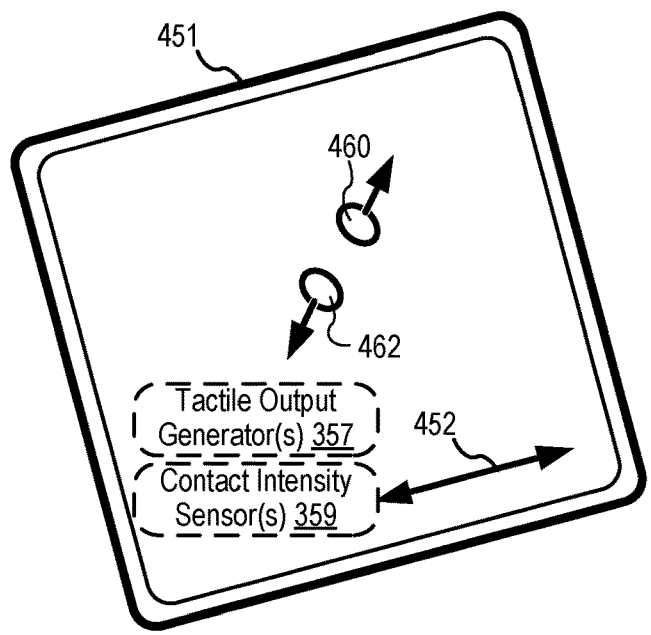

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90% or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Figure 5A:
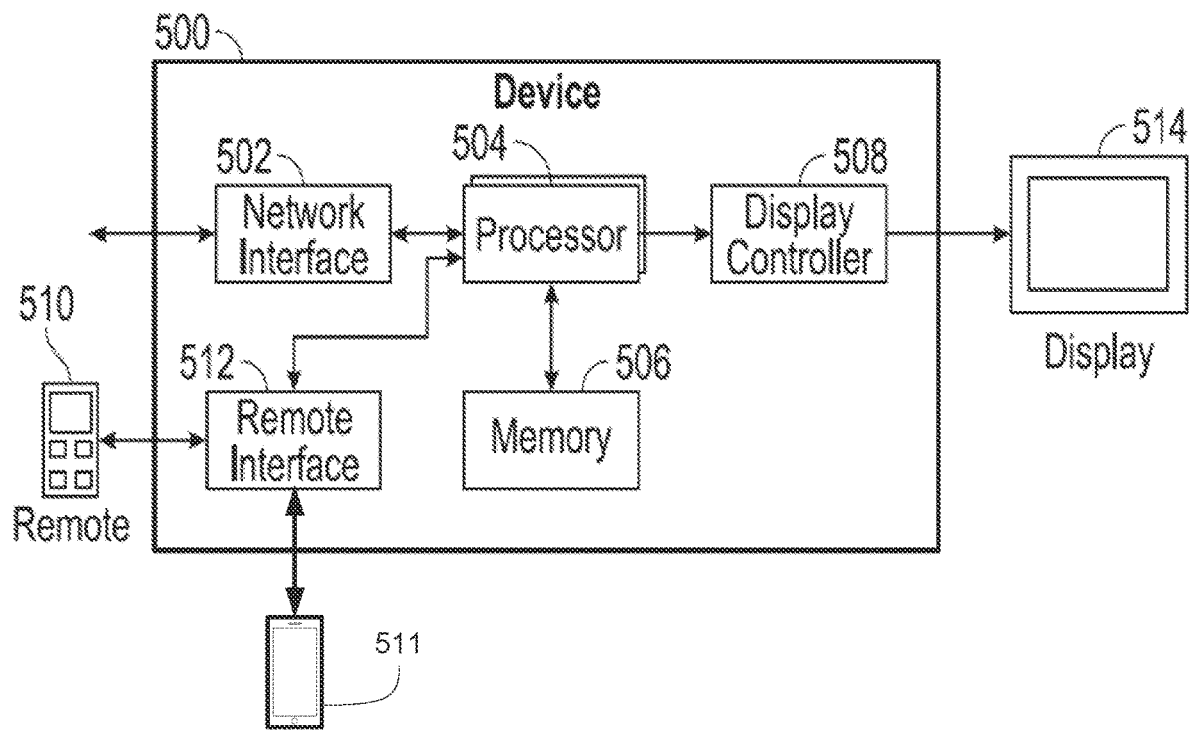
FIGS. 5A-5C illustrate block diagrams of exemplary architectures for devices according to some embodiments of the disclosure.

FIG. 5A illustrates a block diagram of an exemplary architecture for the device 500 according to some embodiments of the disclosure. In the embodiment of FIG. 5A, media or other content is optionally received by device 500 via network interface 502, which is optionally a wireless or wired connection. The one or more processors 504 optionally execute any number of programs stored in memory 506 or storage, which optionally includes instructions to perform one or more of the methods and/or processes described herein (e.g., methods 700 and 900).

In some embodiments, display controller 508 causes the various user interfaces of the disclosure to be displayed on display 514. Further, input to device 500 is optionally provided by remote 510 via remote interface 512, which is optionally a wireless or a wired connection. In some embodiments, input to device 500 is provided by a multifunction device 511 (e.g., a smartphone) on which a remote control application is running that configures the multifunction device to simulate remote control functionality, as will be described in more detail below. In some embodiments, multifunction device 511 corresponds to one or more of device 100 in FIGS. 1A and 2, and device 300 in FIG. 3. It is understood that the embodiment of FIG. 5A is not meant to limit the features of the device of the disclosure, and that other components to facilitate other features described in the disclosure are optionally included in the architecture of FIG. 5A as well. In some embodiments, device 500 optionally corresponds to one or more of multifunction device 100 in FIGS. 1A and 2 and device 300 in FIG. 3; network interface 502 optionally corresponds to one or more of RF circuitry 108, external port 124, and peripherals interface 118 in FIGS. 1A and 2, and network communications interface 360 in FIG. 3; processor 504 optionally corresponds to one or more of processor(s) 120 in FIG. 1A and CPU(s) 310 in FIG. 3; display controller 508 optionally corresponds to one or more of display controller 156 in FIG. 1A and I/O interface 330 in FIG. 3; memory 506 optionally corresponds to one or more of memory 102 in FIG. 1A and memory 370 in FIG. 3; remote interface 512 optionally corresponds to one or more of peripherals interface 118, and I/O subsystem 106 (and/or its components) in FIG. 1A, and I/O interface 330 in FIG. 3; remote 512 optionally corresponds to and or includes one or more of speaker 111, touch-sensitive display system 112, microphone 113, optical sensor(s) 164, contact intensity sensor(s) 165, tactile output generator(s) 167, other input control devices 116, accelerometer(s) 168, proximity sensor 166, and I/O subsystem 106 in FIG. 1A, and keyboard/mouse 350, touchpad 355, tactile output generator(s) 357, and contact intensity sensor(s) 359 in FIG. 3, and touch-sensitive surface 451 in FIG. 4B; and, display 514 optionally corresponds to one or more of touch-sensitive display system 112 in FIGS. 1A and 2, and display 340 in FIG. 3.

Figure 5B:
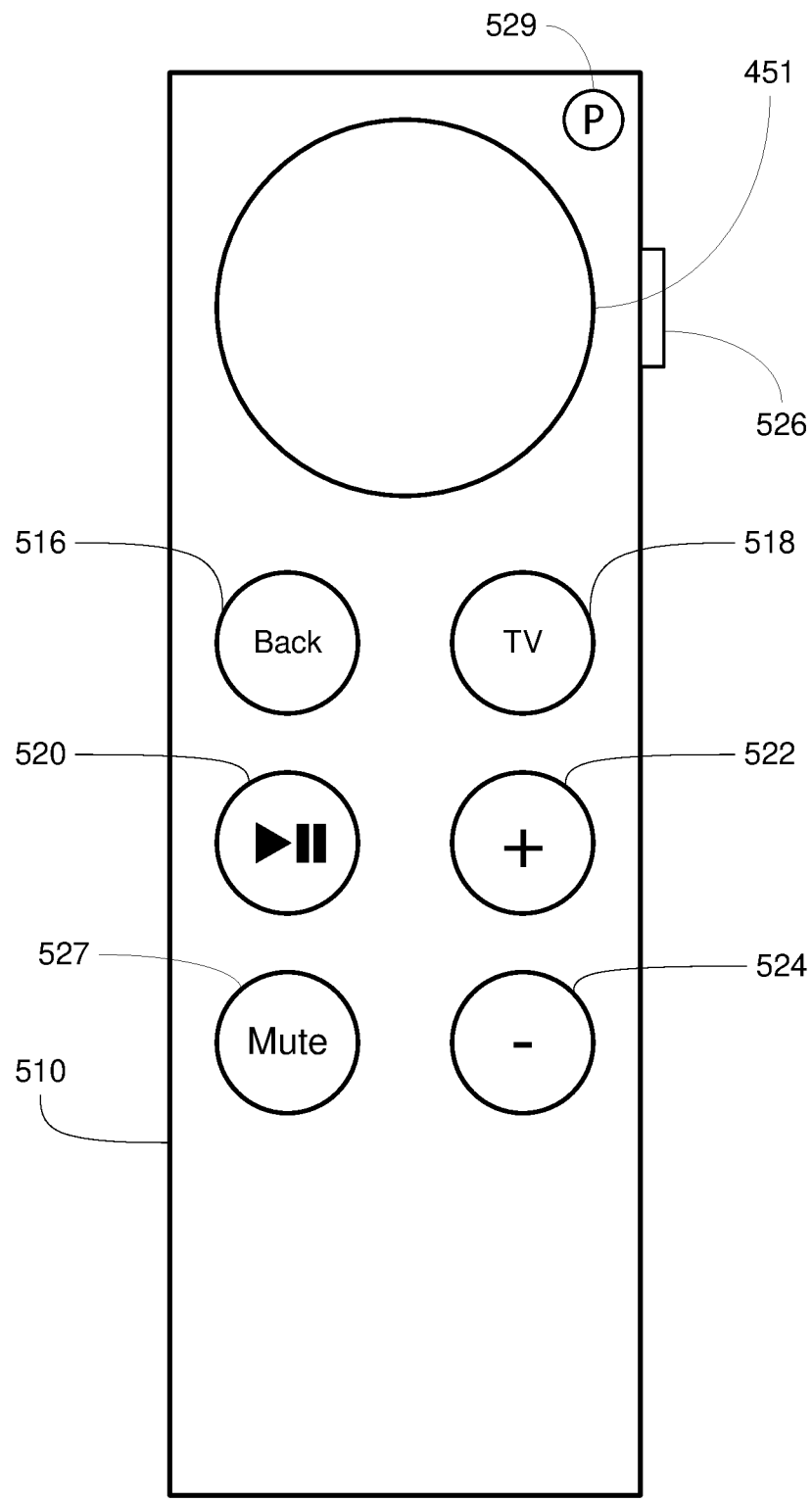

FIG. 5B illustrates an exemplary structure for remote 510 according to some embodiments of the disclosure. In some embodiments, remote 510 optionally corresponds to one or more of multifunction device 100 in FIGS. 1A and 2 and device 300 in FIG. 3. Remote 510 optionally includes touch-sensitive surface 451. Touch-sensitive surface 451 is optionally able to sense contacts as well as contact intensities (e.g., clicks of touch-sensitive surface 451), as previously described in this disclosure. Further, touch-sensitive surface 451 optionally includes a mechanical actuator for providing physical button click functionality (e.g., touch-sensitive surface 451 is "clickable" to provide corresponding input to device 500). Remote 510 also optionally includes buttons 516, 518, 520, 522, 524, 526, 527 and 529. Buttons 516, 518, 520, 522, 524, 526, 527 and 529 are optionally mechanical buttons or mechanical button alternatives that are able to sense contact with, or depression of, such buttons to initiate corresponding action(s) on, for example, device 500. In some embodiments, selection of "back" button 516 by a user navigates device 500 backwards in a currently-executing application or currently-displayed user interface (e.g., back to a user interface that was displayed previous to the currently-displayed user interface), or navigates device 500 to a one-higher-level user interface than the currently-displayed user interface. In some embodiments, selection of "TV" button 518 by a user navigates device 500 to a main, home, media browsing user interface or root user interface from any user interface that is displayed on device 500 (e.g., to a home screen of device 500 that optionally includes one or more applications accessible on device 500 or to a media browsing user interface of device 500 that includes representations of media available for viewing via device 500). In some embodiments, selection of the "TV" button 518 causes the electronic device to navigate to a unified media browsing application. In some embodiments, selection of "play/pause" button 520 by a user toggles between playing and pausing a currently-playing content item on device 500 (e.g., if a content item is playing on device 500 when "play/pause" button 520 is selected, the content item is optionally paused, and if a content item is paused on device 500 when "play/pause" button 520 is selected, the content item is optionally played). In some embodiments, selection of "+" 522 or "−" 524 buttons by a user increases or decreases, respectively, the volume of audio reproduced by device 500 (e.g., the volume of a content item currently-playing on device 500). In some embodiments, selection of "audio input" button 526 (e.g., which is optionally a button on the side surface of remote 510, rather than on the surface of remote 510 that includes buttons 516, 518, 520, 522, 524 and 527) by a user allows the user to provide audio input (e.g., voice input) to device 500, optionally, to a voice assistant on the device. In some embodiments, remote 510 includes a microphone via which the user provides audio input to device 500 upon selection of "audio input" button 526. In some embodiments, remote 510 includes one or more accelerometers for detecting information about the motion of the remote. In some embodiments, selection of "Mute" button 527 toggles the audio reproduced by device 500 on and off In some embodiments, selection of "Power" button 529 causes device 500 (and/or external devices coupled to device 500, such as display 514) to toggle between entering or exiting a low or off power state.

Figure 5C:
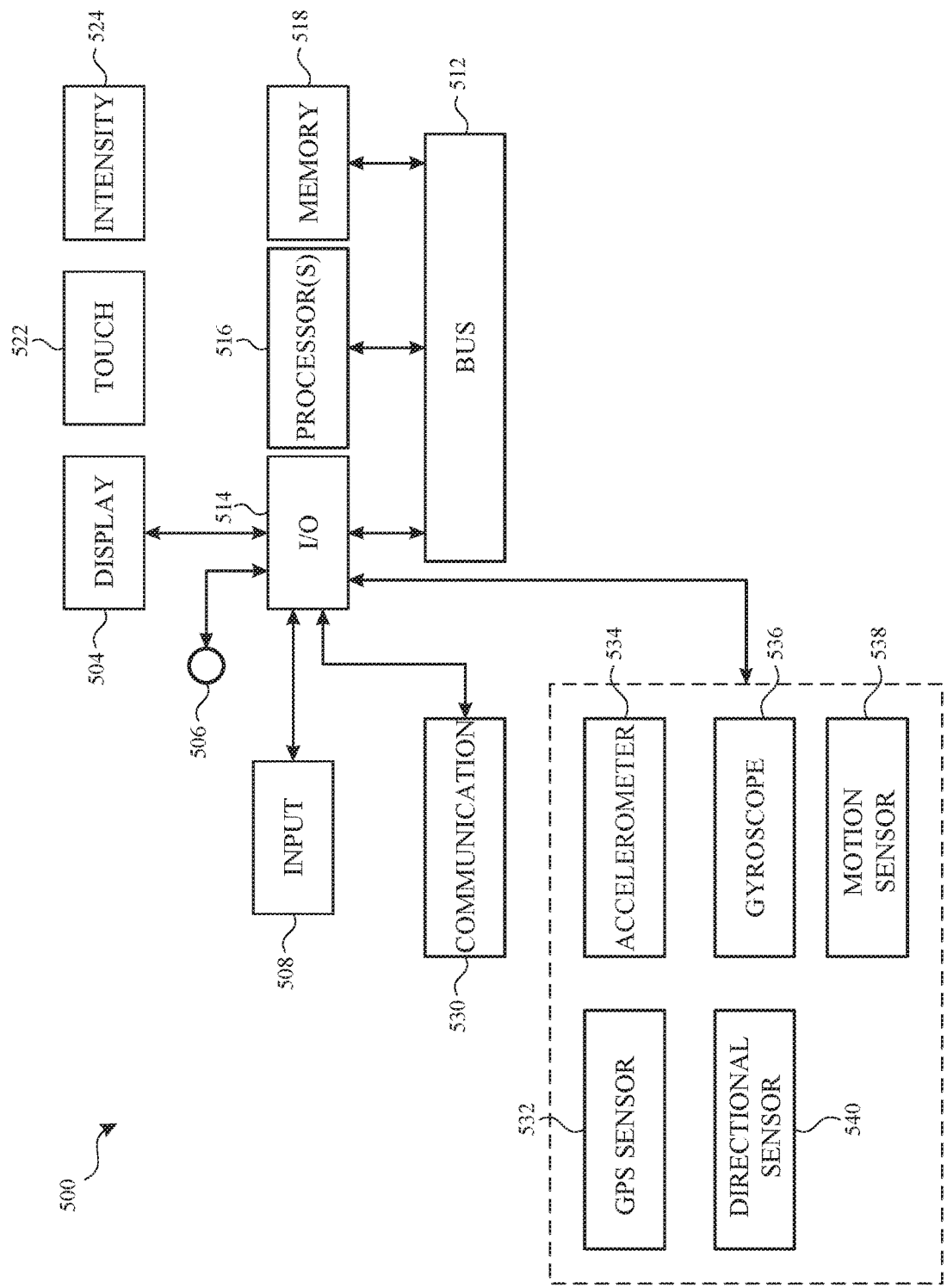

FIG. 5C depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes described with reference to FIGS. 6-9. A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5C, but can include other or additional components in multiple configurations.

In some embodiments, electronic device 500 includes one or more tactile output generators, where the one or more tactile output generators generate different types of tactile output sequences, as described below in Table 1. In some embodiments, a particular type of tactile output sequence generated by the one or more tactile output generators of the device corresponds to a particular tactile output pattern. For example, a tactile output pattern specifies characteristics of a tactile output, such as the amplitude of the tactile output, the shape of a movement waveform of the tactile output, the frequency of the tactile output, and/or the duration of the tactile output. When tactile outputs with different tactile output patterns are generated by a device (e.g., via one or more tactile output generators that move a moveable mass to generate tactile outputs), the tactile outputs may invoke different haptic sensations in a user holding or touching the device. While the sensation of the user is based on the user's perception of the tactile output, most users will be able to identify changes in waveform, frequency, and amplitude of tactile outputs generated by the device.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

- an active application, which is currently displayed on a display screen of the device that the application is being used on;
- a background application (or background processes), which is not currently displayed, but one or more processes for the application are being processed by one or more processors; and
- a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

One or more of the embodiments disclosed herein optionally include one or more of the features disclosed in the following patent applications: "User Interfaces For Interacting with Channels that Provide Content that Plays in a Media Browsing Application" (Application No. 62/822,952, filed Mar. 24, 2019), "User Interfaces For a Media Browsing Application" (Application No. 62/822,948, filed Mar. 24, 2019), and "User Interface Specific to Respective Content Items" (Application No. 62/822,966, filed Mar. 24, 2019), each of which is hereby incorporated by reference.

Attention is now directed towards embodiments of user interfaces ("UI") and associated processes that are implemented on an electronic device, such as portable multifunction device 100, device 300, or device 500.

User Interfaces and Associated Processes

User Interfaces for Controlling Playback of Content Items

Users interact with electronic devices in many different manners, including using electronic devices to play content items. The embodiments described below provide ways in which an electronic device presents a user interface for content playback that includes options for controlling the playback of the content item. Providing efficient manners of controlling content item playback enhances interactions with a device, thus reducing the amount of time a user needs to modify playback of a content item that is currently playing, which increases battery life for battery-powered devices. Additionally, providing a unified, i.e., cohesive, player across multiple content providing applications allows a user to become proficient in one set of user interface elements that work across multiple applications. Again, this unified user experience reduces the amount of time a user needs to modify playback in any application and therefore increases battery life of devices. It is understood that people use devices. When a person uses a device, that person is optionally referred to as a user of the device.

FIGS. 6A-6EE illustrate exemplary ways in which an electronic device presents a user interface for controlling the playback of content items in accordance with some embodiments. The embodiments in these figures are used to illustrate the processes described below, including the processes described with reference to FIG. 7. Although FIGS. 6A-6EE illustrate various examples of ways an electronic device is able to perform the processes described below with reference to FIG. 7, it should be understood that these examples are not meant to be limiting, and the electronic device is able to perform one or more processes described below with reference to FIG. 7 in ways not expressly described with reference to FIGS. 6A-6EE.

FIGS. 6A-6EE illustrate various examples of user interfaces for modifying playback of a content item. For example, the electronic device displays a plurality of playback control elements overlaid on a content item that is currently playing.

Figure 6B:
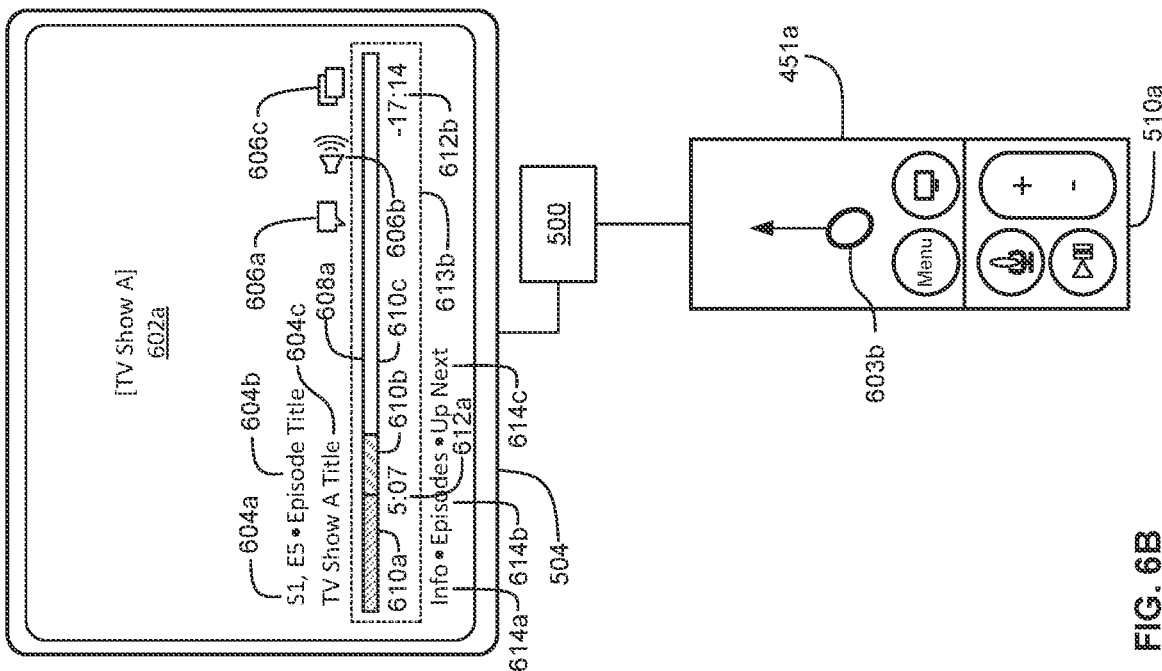
FIGS. 6A-6EE illustrate exemplary ways in which an electronic device presents a user interface for controlling the playback of content items in accordance with some embodiments.
Figure 6A:
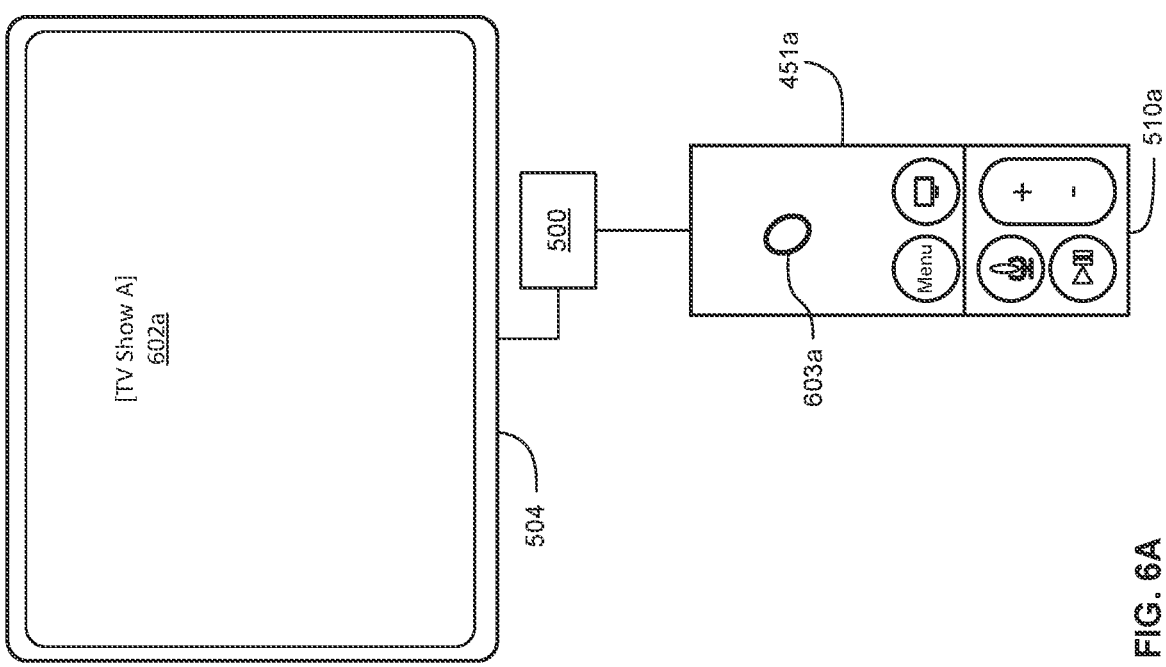

FIG. 6A illustrates an example of electronic device 500 presenting a TV show 602a via display generation component 504. In the example of FIG. 6A, the electronic device 500 is in communication with input device 510a (e.g., corresponding to input device 510 in FIG. 5B). Although some of the examples illustrated herein show electronic device in communication with a respective one of input device 510a or input device 510b, it should be understood that the examples described with input device 510a can be applied to input device 510b and vice-versa.

In some embodiments, the TV show 602a is an episode of a series that is available for streaming over the internet on-demand. In some embodiments, the electronic device 500 is also able to present content items that are live-streamed or live-broadcast (e.g., as opposed to being available on-demand). In some embodiments, in addition to being able to present TV shows and other series of episodic content, the electronic device 500 is able to present other types of video content, such as movies and sports games and audio content, e.g., music, podcasts, and audiobooks.

In some embodiments, as shown in FIG. 6A, the electronic device detects, via input device 510a, contact 603a. In some embodiments, in response to detecting the input illustrated in FIG. 6A while the electronic device 500 is playing content, the electronic device 500 updates the user interface to include a plurality of playback control elements for controlling playback of the TV show 602a, as shown in FIG. 6B.

FIG. 6B illustrates an example of the electronic device 500 presenting a user interface including a plurality of playback control elements overlaid on an item of content (e.g., a TV show 602a) that is currently playing on the electronic device 500. In some embodiments, the user interface includes an indication 604a of the season and episode number of the TV show, an indication 604b of the title of the episode, an indication 604c of the title of the TV show series, a selectable option 606a that, when selected, causes the electronic device 500 to present options for controlling subtitles of the TV show 602a, a selectable option 606b that, when selected, causes the electronic device 500 to present audio options for playback of audio content associated with the TV show 602a, an option 606c that, when selected, presents the TV show 602a in a picture-in-picture element, a scrubber bar 608a, an information tab 614a, an episodes tab 614b, and an up next tab 614c. In some embodiments, the scrubber bar 608a includes an indication 612a of the current playback position within the TV show 608a, and indication 612b of the time remaining in the TV show 602a, an indication 610a of a portion of the TV show 602a that is prior to the current playback position that the electronic device is able to skip back to, an indication 610b of a portion 610b of the TV show 602a that is after the current playback position and has buffered, and a portion 610c of the TV show 602a that is after the current playback position and has not yet buffered. In some embodiments, the electronic device 500 is able to skip ahead to portions 610b and 610c of the TV show 602a. In some embodiments, the electronic device 500 presents the various portions 610a-c of the scrubber bar 608a in differently colored or shaded styles. As shown in FIG. 6B, in some embodiments, the selectable options 606a-c and indications 604a-c are displayed above the scrubber bar 608a and the tabs 614a-c are displayed below the scrubber bar.

In some embodiments, when the electronic device 500 initially displays the user interface including the playback control elements (e.g., in response to the input illustrated in FIG. 6A), the input focus 613b of the electronic device 500 is initially on the scrubber bar 608a. In some embodiments, the input focus 613b of the electronic device 500 indicates the user interface element to which further input will be directed. The figures include visual indications 613 and 813 of the input focus of the electronic device for the sake of clarity and discussion but, in some embodiments, the electronic device 500 presents a different visual indication of input focus or does not present an indication of input focus at all. In some embodiments, as shown in FIG. 6B, the electronic device 500 detects, via input device 510a, an upward swipe of contact 603b. In some embodiments, in response to the input illustrated in FIG. 6B, the electronic device 500 moves the input focus 613b up in accordance with movement of contact 603b, as shown in FIG. 6C.

Figure 6D:
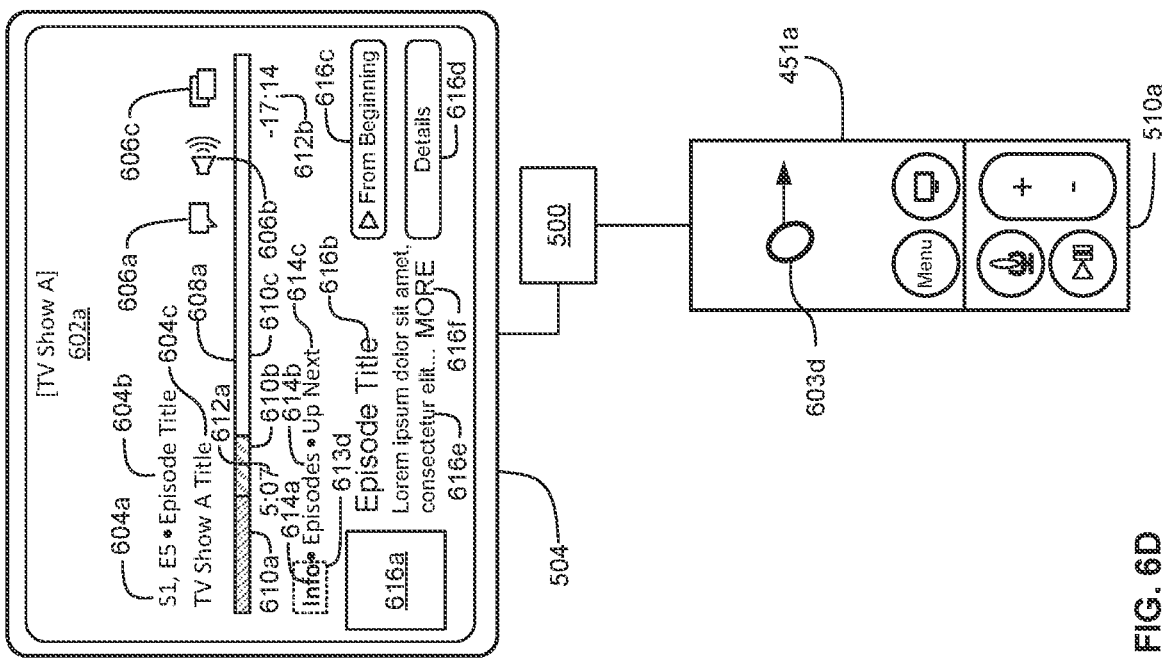
Figure 6C:
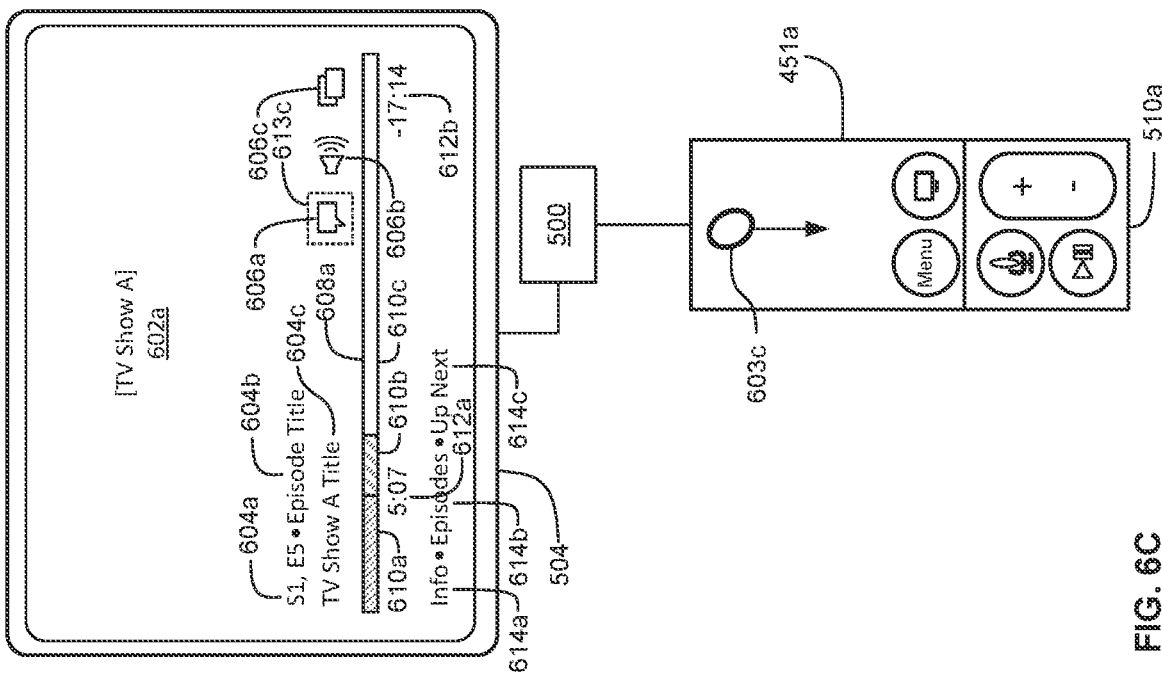

FIG. 6C illustrates an example of the updated input focus 613c of the electronic device 500 in response to the input illustrated in FIG. 6B. As shown in FIG. 6C, for example, the input focus 613c is now directed to the selectable option 606a that, when selected, causes the electronic device 500 to present options for changing the subtitles displayed with TV show 602a. In some embodiments, if the electronic device 500 were to detect, via the input device 510a, one or more swipes to the right, the electronic device 500 would move the input focus 613c to the selectable option 606b for controlling audio settings of the TV show 602a or the selectable option 606c for viewing the TV show 602a in a picture-in-picture element. Although not expressly illustrated in FIG. 6C, it should be understood that, in some embodiments, the scrubber bar 608a continues to advance as playback of the TV show 602a continues.

As shown in FIG. 6C, in some embodiments, the electronic device 500 detects, via input device 510a, a downward swipe of contact 603c. In some embodiments, in response to detecting a sequence of inputs including the input illustrated in FIG. 6C, the electronic device 500 updates the position of the input focus 613c in the user interface.

FIG. 6D illustrates an example of the user interface updated in response to a sequence of inputs including the input illustrated in FIG. 6C. For example, the electronic device 500 detects multiple (e.g., 2) downward swipes similar to the downward swipe illustrated in FIG. 6C and, in response, updates the user interface as shown in FIG. 6D. In some embodiments, in response to the first downward swipe, the electronic device 500 moves the input focus 613c shown in FIG. 6C from option 606a to the scrubber bar 608a and, in response to the second downward swipe, the electronic device 500 moves the input focus from the scrubber bar 608a to the information tab 614a as shown in FIG. 6D. In some embodiments, as shown in FIG. 6D, the input focus 613d is on the information tab of the user interface. In some embodiments, in response to detecting the input focus 613d move to the information tab 614a, the electronic device 500 animates the content of the information tab 614a described below sliding up from the bottom edge of the display generation component 504. In some embodiments, the electronic device 500 also animates the other indications 604a-c and control elements 606a-c, 608a, and 614a-c sliding up so that the contents of the information tab 614a are displayed at the location in the user interface at which the tabs 614a-c and, in some embodiments, the scrubber bar 608a were previously displayed (e.g., in FIG. 6C). While the input focus 613d is on the information tab 614a of the user interface, the electronic device 500 presents the contents of the information tab 614a, including information about the TV show 602a that is currently playing on the electronic device 500, including an image 616a associated with the TV show 602a, an indication 616b of the title of the TV show 602a, informational text 616e about the TV show 602a, an option 616f to view additional informational text about the TV show 602a, a selectable option 616c that, when selected, causes the electronic device 500 to initiate playback of the TV show 602a from the beginning, and a selectable option 616d that, when selected, causes the electronic device 500 to present a user interface including additional information about the TV show 602a. In some embodiments, the contents of the information tab 614a are presented below the tabs 614a-c and the scrubber bar 608a.

As shown in FIG. 6D, in some embodiments, while the input focus 613d is on the information tab 614a, the electronic device 500 detects, via input device 510a, a right swipe of contact 603d. In some embodiments, in response to the input illustrated in FIG. 6D, the electronic device 500 updates the input focus 613d in accordance with movement of contact 603d, as shown in FIG. 6E.

Figure 6F:
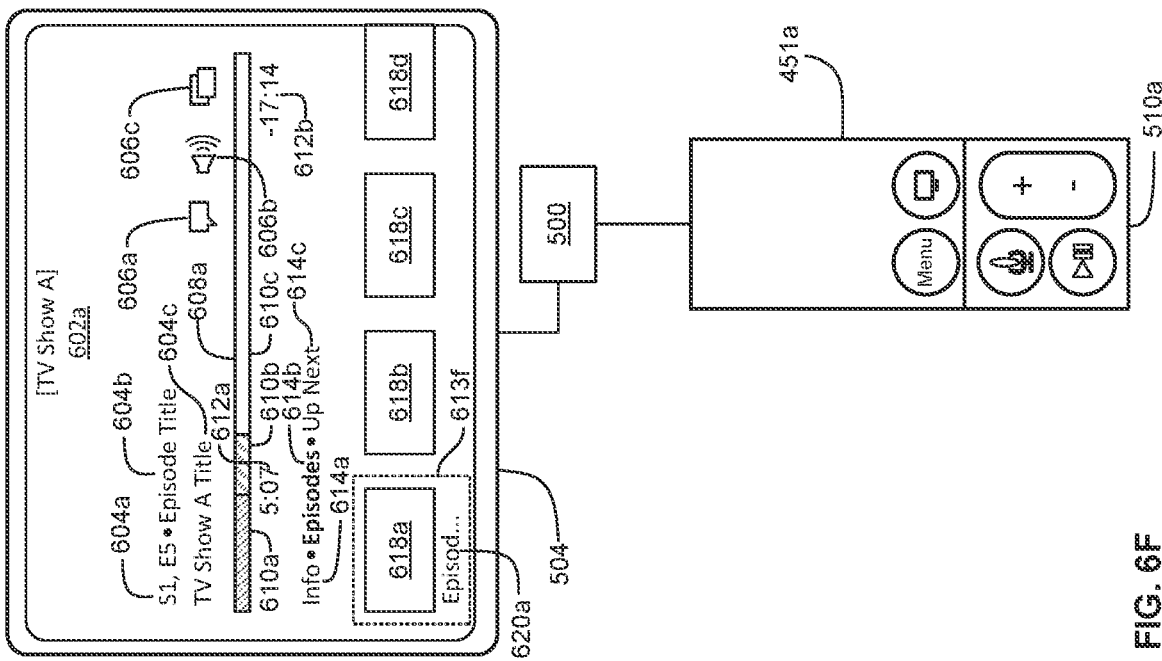
Figure 6E:
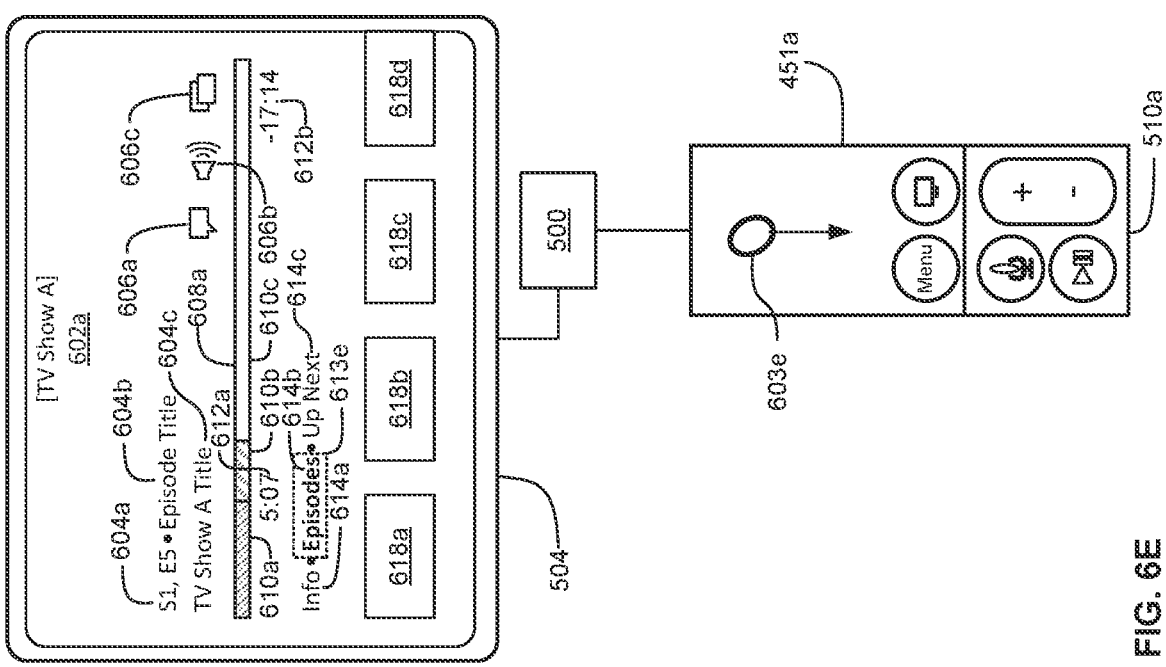

FIG. 6E illustrates an example of the user interface updated in response to the input illustrated in FIG. 6D. As shown in FIG. 6E, the current focus 613e is on the episodes tab 614b. In some embodiments, in response to detecting the input focus 613e on the episodes tab 614b, the electronic device 500 presents representations 618a-d of other episodes included in the series of the TV show 602a. In some embodiments, representations 618a-d each include an image corresponding to a respective episode of the series of the TV show 602a and are selectable to initiate playback of the corresponding respective episode of the series of the TV show 602a in place of the TV show 602a. In some embodiments, the contents of the episodes tab 614b are displayed at the same location in the user interface at which the contents of the information tab 614a had been displayed, as shown in FIG. 6D. As shown in FIG. 6E, the electronic device 500 detects, via input device 510a, a downward swipe of contact 603e, for example. In some embodiments, in response to the input illustrated in FIG. 6E, the electronic device 500 updates the current focus 613e in accordance with movement of contact 603e, as shown in FIG. 6F.

FIG. 6F illustrates an example of the user interface while the input focus 613f is on one of the representations 618a of an episode in the series of TV show 602a on the episodes tab of the user interface. In some embodiments, while the input focus 613f is on representation 618a, the electronic device 500 presents an indication 620a of the title of the episode corresponding to representation 618a. For example, the indication 620a of the episode title is displayed proximate to (e.g., below) the representation 618a of the episode. In some embodiments, if the electronic device 500 were to detect a horizontal swipe via input device 510a, the electronic device 500 would update the position of the input focus 613f to be on a representation of a different episode in the episodes tab of the user interface and display an indication of the title of the episode corresponding to the representation with the current focus. In some embodiments, the representations 618a-d are horizontally scrollable. For example, in response to detecting a swipe to the left with input device 510a while the current focus 613f is on representation 618a, the electronic device 500 reveals a representation of an episode that is not illustrated in FIG. 6F to the left of representation 618a and ceases display of representation 618d. As another example, in response to detecting a rightward swipe while the input focus 613f is on representation 618d, the electronic device 500 would reveal a representation of an episode not currently displayed to the right of representation 618d and cease display of representation 618a.

Figure 6H:
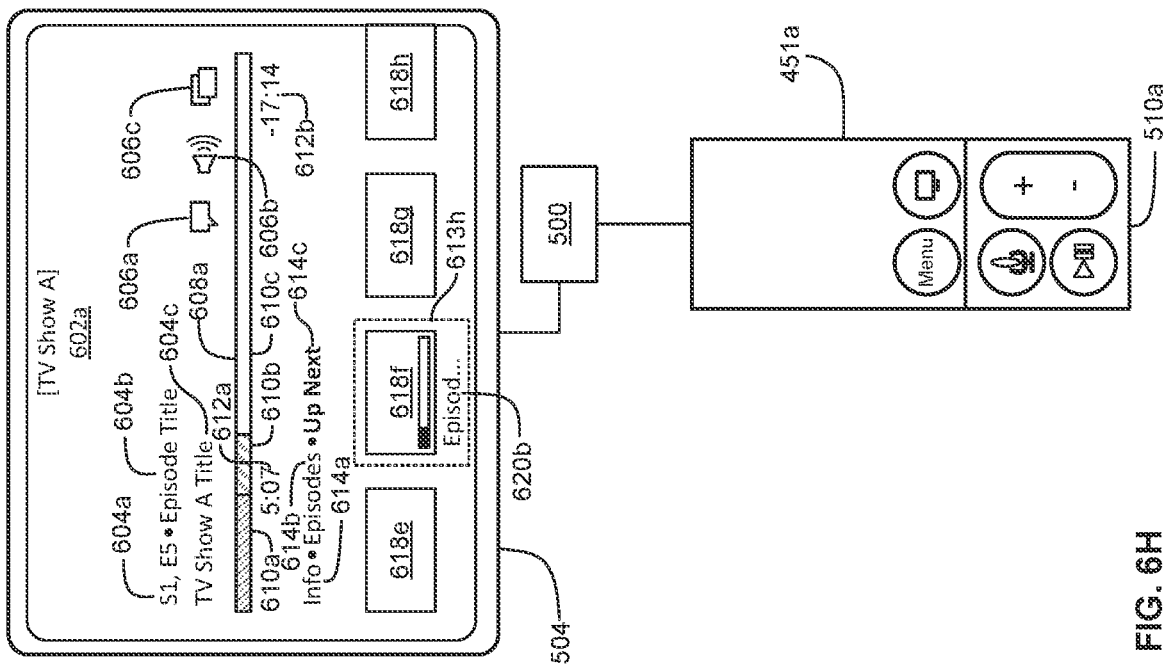
Figure 6G:
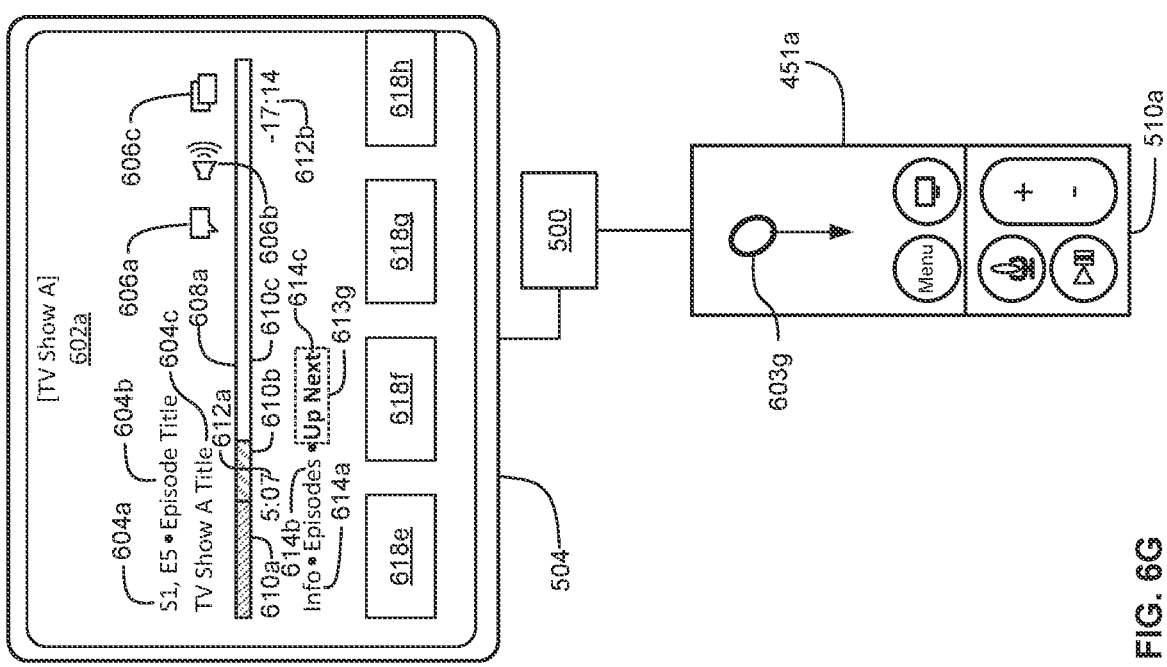

FIG. 6G illustrates an example of the user interface while the current focus 613g is on the up next tab 614c of the user interface. In some embodiments, in response to detecting the current focus 613g on the up next tab 614c of the user interface, the electronic device 500 displays representations 618e-h of content items in a playback queue associated with (e.g., a user account associated with) the electronic device 500. In some embodiments, once the electronic device 500 completes playback of TV show 602a, the electronic device 500 automatically initiates playback of the next content item in the up next queue (e.g., would start playback of the content item corresponding to representation 618e). In some embodiments, the content items in the up next queue are a mix of content types, such as episodes in series of episodic content, movies, and/or audio content such as music, podcasts, and/or audio books. In some embodiments, in response to detecting selection of one of the representations 618e-h, the electronic device 500 initiates playback of the content item corresponding to the selected representation in place of the TV show 602a. In some embodiments, the electronic device 500 displays the contents of the up next tab 614c at a location in the user interface at which the contents of the episodes tab 614b and the contents of the information tab 614a are displayed. As shown in FIG. 6G, in some embodiments, the electronic device 500 detects, via input device 510a, a downward swipe with contact 603g. In some embodiments, in response to the input illustrated in FIG. 6G, the electronic device 500 moves the input focus 613g in accordance with movement of contact 603g, as shown in FIG. 6H.

FIG. 6H illustrates an example of the user interface with the current focus 613h on one of the representations 618f of a content item in the up next queue in response to the input illustrated in FIG. 6G. In some embodiments, while the input focus is on representation 618f, the electronic device 500 presents an indication 620b of the title of the content item associated with representation 618f and updates representation 618f to include an indication of the current playback progress of (e.g., a user account associated with) the electronic device within the content item. In some embodiments, if the input focus 613h were on a different representation 618e or 618g-h of a content item, the electronic device 500 would instead display an indication of a title and an indication of playback progress for the content item associated with the respective representation 618e or 618g-h to which the input focus is directed (e.g., if the user account associated with device 500 has partially consumed the content item).

In some embodiments, the electronic device 500 presents an indication of a current playback position of a friend of the user of the electronic device 500 within a content item that is being played by the electronic device. In some embodiments, the user account associated with the electronic device 500 is associated with other user accounts that are "friends" with the user of the electronic device (e.g., the other user accounts are contacts of the user account associated with device 500 in a contacts application or service accessible from device 500). In some embodiments, when users are friends with each other, they are able to see each other's content consumption history and/or activity and/or communicate with each other through a service associated with a content consumption service or application accessible to the electronic device.

Figure 6J:
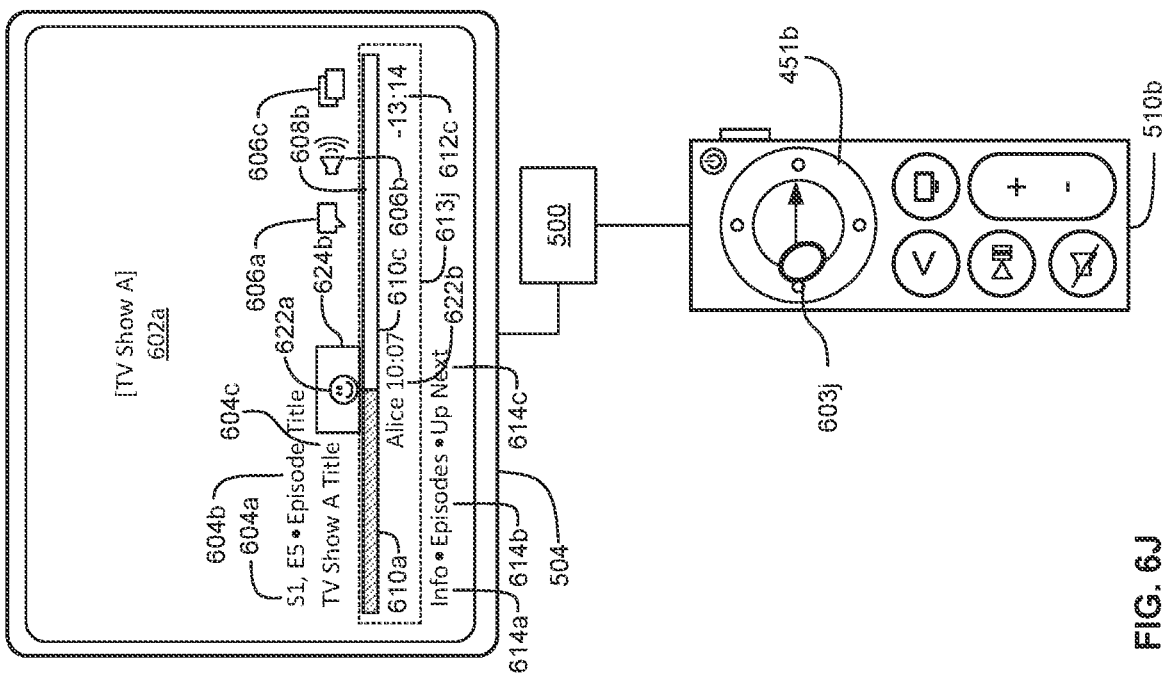
Figure 6I:
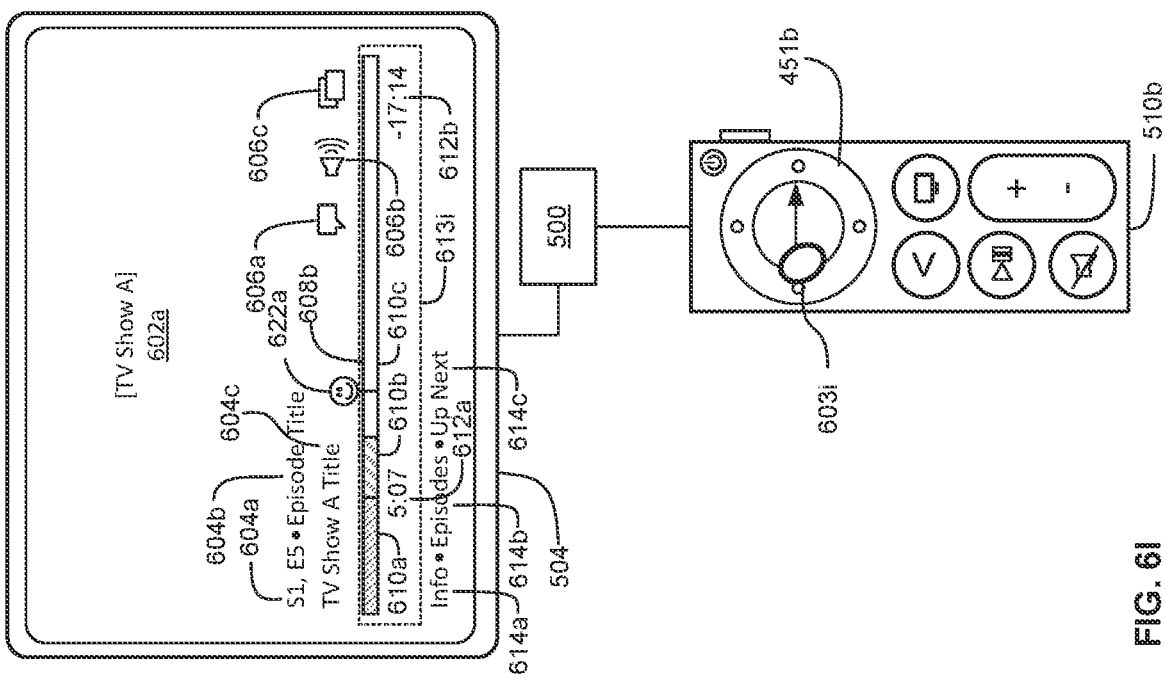

For example, in FIG. 6I, the electronic device 500 presents an indication 622a of a playback position of a friend of the user of the electronic device 500 within TV show 602a within scrubber bar 608b. In some embodiments, the indication 622a indicates the playback position at which the friend of the user is currently playing the content item (e.g., TV Show A 602a) or the playback position at which the friend stopped or paused playing the content item (e.g., the friend's latest playback position in TV Show A 602a). In some embodiments, the indication 622a includes an image associated with the user account of the friend of the user of the electronic device 500. In some embodiments, if the friend has not watched any portion of TV show 602a, the electronic device 500 would forgo presenting the indication 622a of the playback position of the friend in the scrubber bar 608b. In some embodiments, if the friend has watched the entirety of TV show 602a, the electronic device 500 would forgo presenting the indication 622a of the playback position of the friend in the scrubber bar 608b. In some embodiments, if multiple of the user's friends have watched (at least) a portion of TV show 602a, the electronic device 500 would present a plurality of representations corresponding to each of the friends that have watched (at least) portions of the TV show 602a in the scrubber bar 608b. As shown in FIG. 6I, the electronic device 500 detects, via input device 510b, a right swipe while the input focus 613i is on the scrubber bar 608b to scrub to the playback position associated with the friend of the user of the electronic device 500.

FIG. 6J illustrates an example of how the electronic device 500 updates the scrubber bar 608b in response to the input illustrated in FIG. 6I. In some embodiments, in response to the input illustrated in FIG. 6I, the electronic device 500 scrubs the scrubber bar to the playback position associated with the friend of the user of the electronic device. In some embodiments, while the electronic device 500 updates the position of the scrubber bar, the electronic device 500 continues to play the TV show 602a from the playback position indicated in FIG. 6I and does not change the playback position in accordance with the position of the scrubber bar 608b unless and until selection is detected via input device 510b. In some embodiments, while the electronic device 500 updates the position of the scrubber bar, the electronic device 500 pauses the TV show 602a at the playback position indicated in FIG. 6I and does not change the playback position in accordance with the position of the scrubber bar 608b unless and until selection is detected via input device 510b.

In some embodiments, while scrubbing the scrubber bar 608b, the electronic device 500 presents a thumbnail 624b associated with the playback position indicated by the scrubber bar 608b. Because the current playback position of the scrubber bar 608b is the same as the playback position associated with the friend of the user of the electronic device 500, the electronic device 500 displays the image 622a associated with the friend of the user of the electronic device 500 overlaid on the thumbnail 624b. In some embodiments, while scrubbing the scrubber bar, the electronic device 500 presents an indication 622b of the time associated with the playback position of the current position of the scrubber bar and an indication 612c of the time remaining in the content item from the playback position of the current position of the scrubber bar. In some embodiments, because the current position of the scrubber bar corresponds to the playback position of the friend of the user of the electronic device, the indication 622b of the playback position includes an indication of the name of the friend.

In some embodiments, the electronic device 500 detects another right swipe of contact 603j via input device 510b, as shown in FIG. 6J. In some embodiments, in response to the input illustrated in FIG. 6J, the electronic device 500 scrubs the scrubber bar to a position other than the playback position of the friend of the user of the electronic device 500, as shown in FIG. 6K.

Figure 6L:
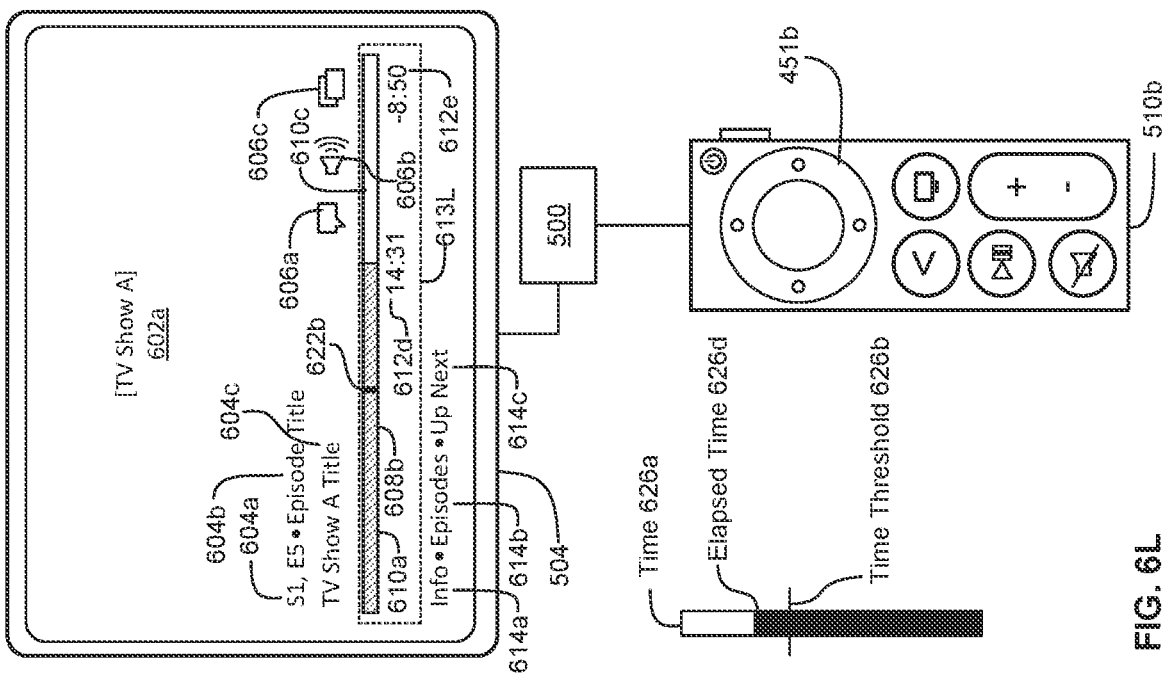
Figure 6K:
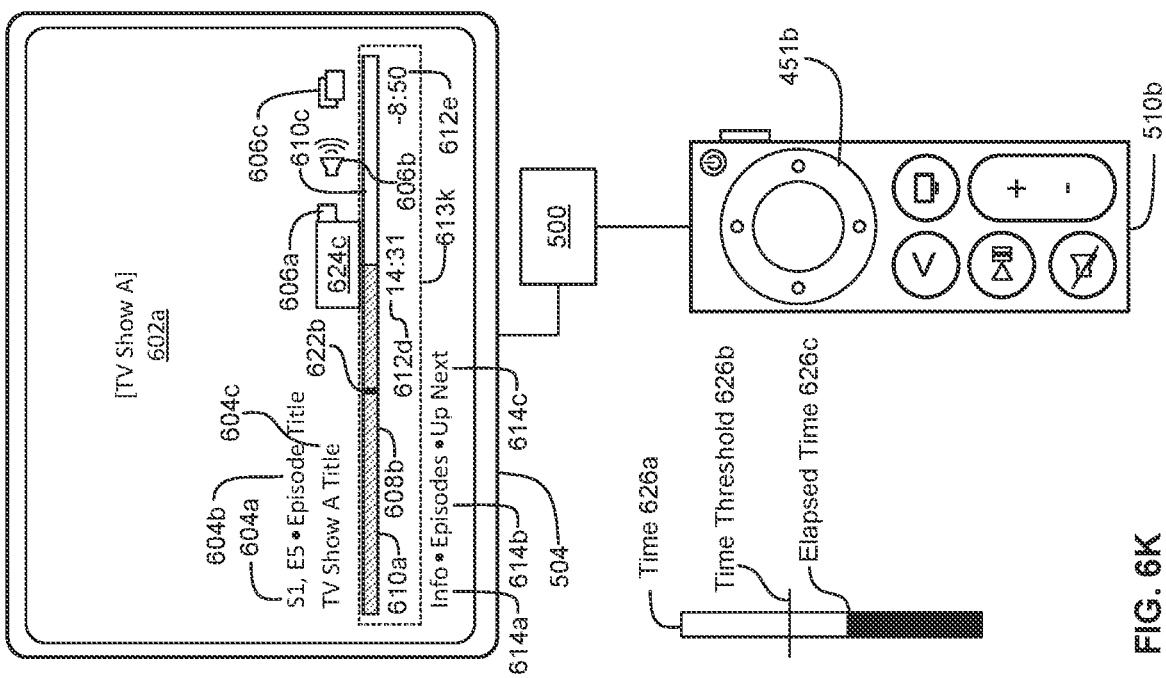

FIG. 6K illustrates an example of how the electronic device 500 updates the user interface in response to the input illustrated in FIG. 6J. As shown in FIG. 6K, the scrubber bar 608b is scrubbed to a playback position after the playback position of the scrubber bar 608b in FIG. 6J in accordance with movement of contact 603j, for example. In some embodiments, the scrubber bar 608b includes an indication 612d of the playback position time of the current position of the scrubber bar 608b, an indication 612e of the time remaining in the content item from the current position of the scrubber bar 608b, and an indication 622b of the playback position associated with the friend of the user of the electronic device 500. In some embodiments, once the electronic device 500 has scrubbed to the playback position of the friend of the user of the electronic device 500 and scrubbed away from that playback position, the electronic device 500 represents the playback position of the friend of the user of the electronic device 500 with an indication 622b that does not include the image associated with the friend of the user of the electronic device 500.

In some embodiments, the scrubber bar 608b includes a thumbnail 624c corresponding to the playback position indicated by the scrubber bar 608b. In some embodiments, the thumbnail 624c includes an image corresponding to the playback position indicated by the scrubber bar 608b, such as a still image of the content at that playback position. As shown in FIG. 6K, for example, the thumbnail 624c is at least partially overlaid on the subtitle option 606a. In some embodiments, because the thumbnail 624c is at least partially overlaid on one of the selectable options 606a-c of the user interface, the electronic device 500 will cease display of the thumbnail 624b after a predetermined time threshold 626b passes since the last input is detected via input device 510b. As shown in FIG. 6K, for example, the amount 626c of time 626a that has passed since the last input was received is less than the threshold 626b, so the electronic device 500 continues to display the thumbnail 624c. In some embodiments, as shown in FIG. 6L, once the amount 626d of time 626a that has passed since the last input was received (e.g., via input device 510b) exceeds (e.g., or meets) threshold 626b, the electronic device 500 ceases display of the thumbnail 624c illustrated in FIG. 6K, such as illustrated in FIG. 6L.

In some embodiments, if the scrubber bar 608b is scrubbed to a playback position such that the thumbnail associated with the current position of scrubber bar 608b does not overlap at least one of options 606a-c, the electronic device 500 continues to display the thumbnail even after the threshold period of time 626b passes since receiving an input (e.g., via input device 510b). For example, in FIG. 6M, the electronic device 500 displays the scrubber bar 608b scrubbed to a position that is different from the scrubber bar position in FIGS. 6K-6L. In FIG. 6M, for example, the thumbnail 624d corresponding to the current position of the scrubber bar 608b does not overlap the selectable options 606a-c, so the electronic device 500 continues to display thumbnail 624d although the amount 626e of time 626a that has passed since the last input was detected exceeds time threshold 626b.

Figure 6N:
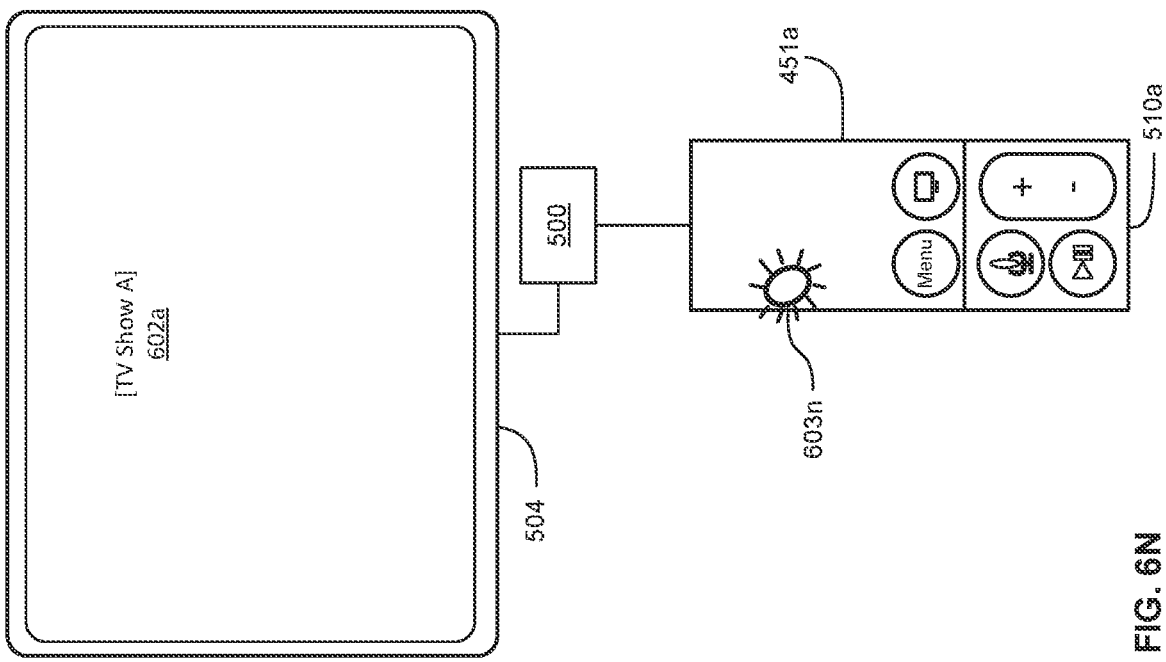
Figure 6M:
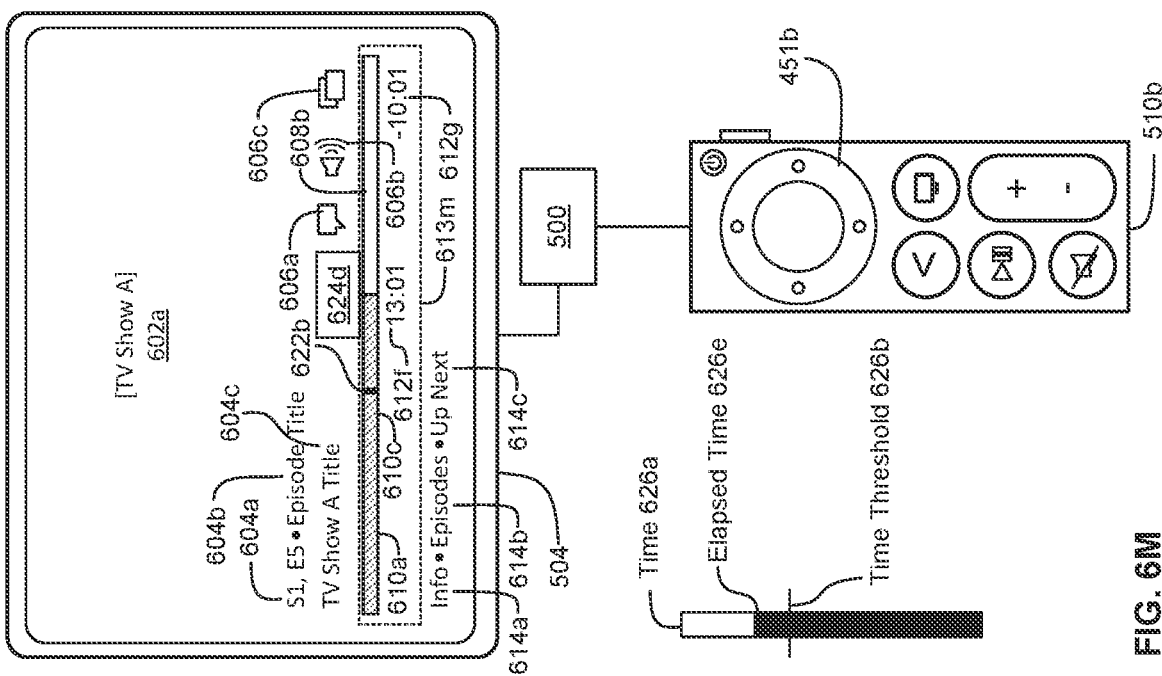

In some embodiments, as shown in FIG. 6N, while the electronic device 500 is presenting the TV show 602a (e.g., without displaying the scrubber bar or the other indications and control elements previously described with reference to FIGS. 6B-6M), the electronic device 500 detects, via the input device 510a, a click on the left side of touch surface 451a of input device 510a with contact 603n. In some embodiments, the click with contact 603n corresponds to a request to skip backwards in the content item by a predetermined amount of time (e.g., 10, 15, 30, etc. seconds). In some embodiments, in response to the input illustrated in FIG. 6N, the electronic device 500 skips back in the content by the predetermined amount of time and displays the scrubber bar overlaid on the content without displaying other playback control elements, as shown in FIG. 6O.

Figure 6P:
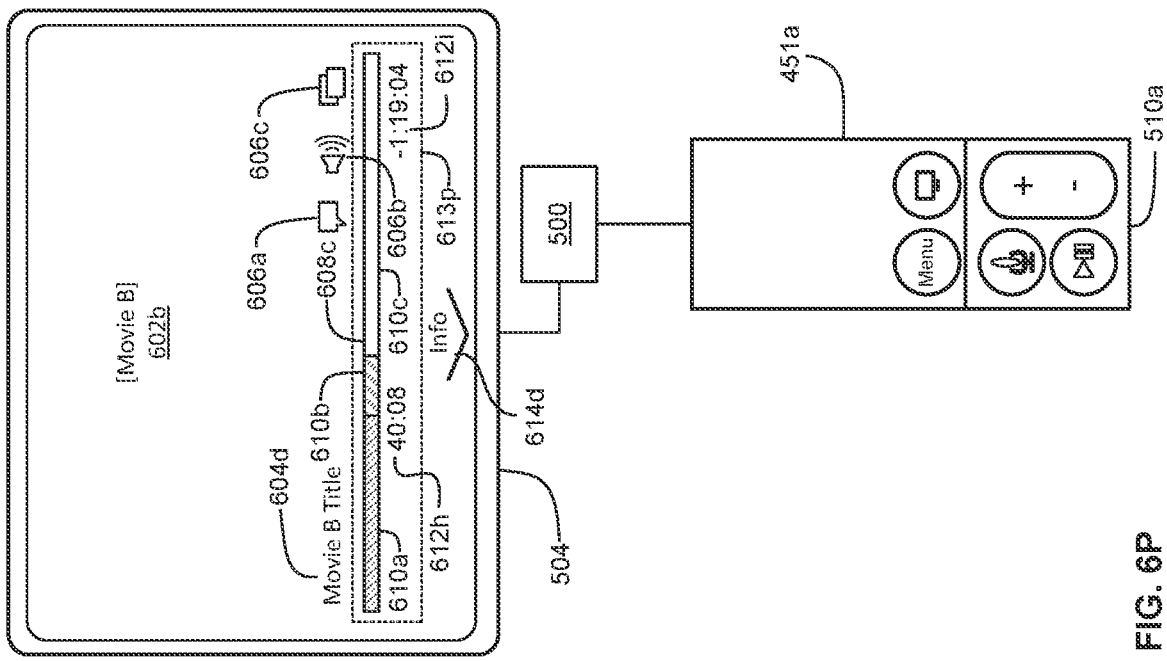
Figure 6O:
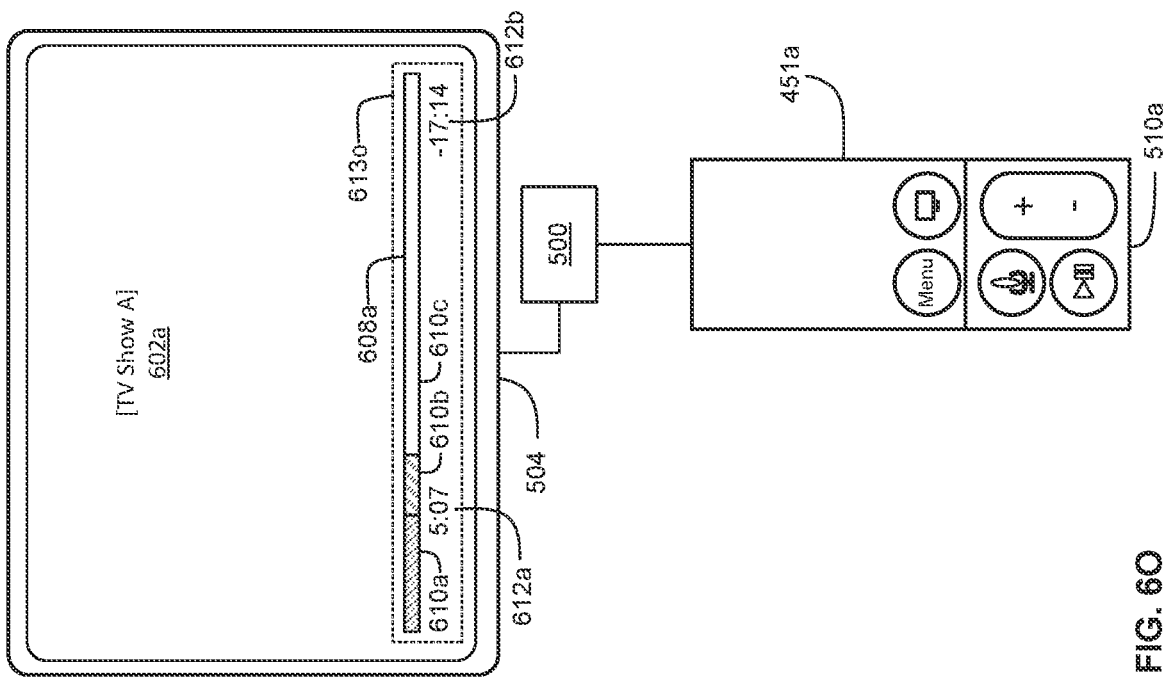

FIG. 6O illustrates an example of the user interface displayed in response to detecting the input illustrated in FIG. 6N. As shown in FIG. 6O, the electronic device 500 displays the scrubber bar 608a overlaid on the TV show 602a, which continues playing from a playback position updated in response to the input illustrated in FIG. 6N (e.g., skipped back by the predetermined amount of time). In some embodiments, as shown in FIG. 6O, the electronic device 500 forgoes display of a number of elements displayed in response to detecting the tap input illustrated in FIG. 6A. For example, as shown in FIG. 6B, in response to detecting the tap input in FIG. 6A, in addition to displaying the scrubber bar 608a, the electronic device 500 displays the indication 604a of the season and episode number of the TV show, the indication 604b of the title of the episode, the indication 604c of the title of the TV show series, a selectable option 606a that, when selected, causes the electronic device 500 to present options for controlling subtitles of the TV show 602a, the selectable option 606b that, when selected, causes the electronic device 500 to present audio options for playback of audio content associated with the TV show 602b, the selectable option 606c to present the TV show 602a in a picture-in-picture element, the information tab 614a, the episodes tab 614b, and the up next tab 614c, which are not displayed in response to the input in FIG. 6N. In some embodiments, forgoing display of the elements that are not related to skipping provides a less distracting user interface (e.g., because fewer elements are overlaid on TV show 602a) in response to the input to skip back illustrated in FIG. 6N.

In some embodiments, the user interface elements displayed overlaid on a content item that is being played by the electronic device are controlled and/or provided by an entity (e.g., studio, streaming service, publisher, creator, etc.) associated with creation of the content item. In some embodiments, the user interface elements displayed during content playback vary between content items. For example, FIG. 6P illustrates the electronic device 500 presenting a movie 602b with a number of playback control elements displayed overlaid on the movie 602b. A number of the playback control elements illustrated in FIG. 6P are the same as or similar to playback control elements described above with reference to FIG. 6B, except, instead of displaying the information tab 614a, episodes tab 614b, and up next tab 614c as shown in FIG. 6B, the electronic device 500 displays an indication 614d of the information tab in the bottom middle of the user interface. In some embodiments, the movie 602b is associated with an information tab, but not with other types of tabs that could be displayed in the user interface, so the electronic device 500 displays the indication 614d of the information tab as shown in FIG. 6P. In some embodiments, other content items could be associated with a single tab of a different type (e.g., up next, episodes, etc.), which would cause the electronic device 500 to instead display an indication of the respective tab in a manner similar to the indication 614d of the information tab illustrated in FIG. 6P. In some embodiments, if the electronic device 500 were to detect, via the input device 510a, an input corresponding to a request to move the input focus 613p down, such as a downward swipe of a contact on the touch surface 451a of the input device 510a, the electronic device 500 would present information items corresponding to the movie 602b that is similar to the information items illustrated in FIG. 6D.

Figure 6R:
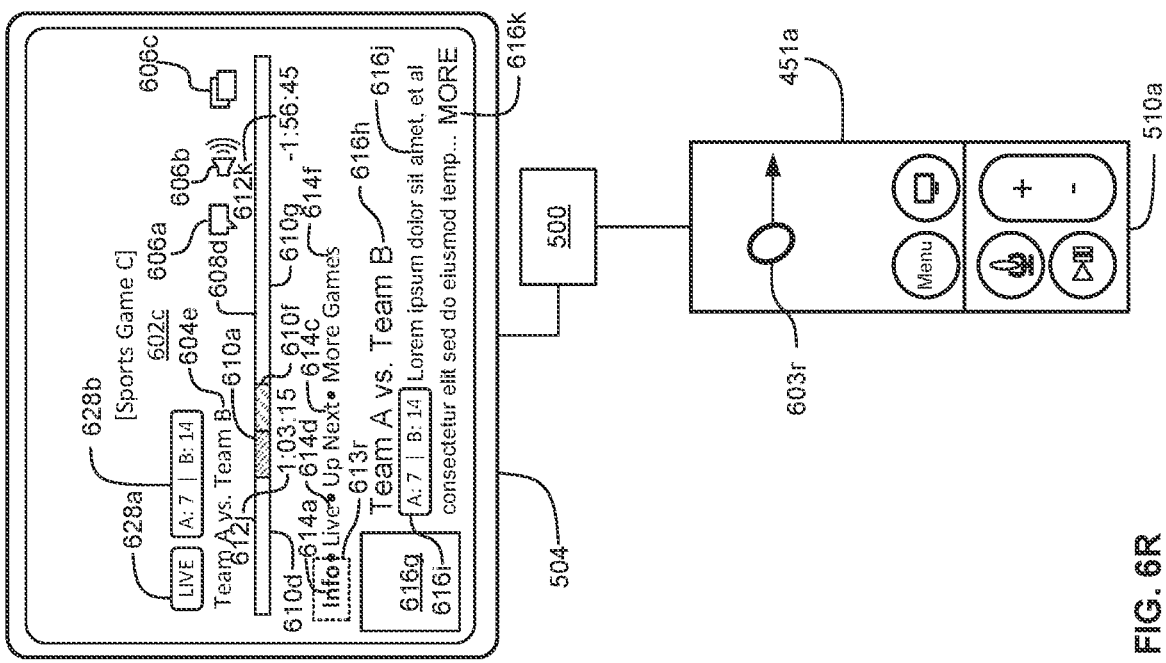
Figure 6Q:
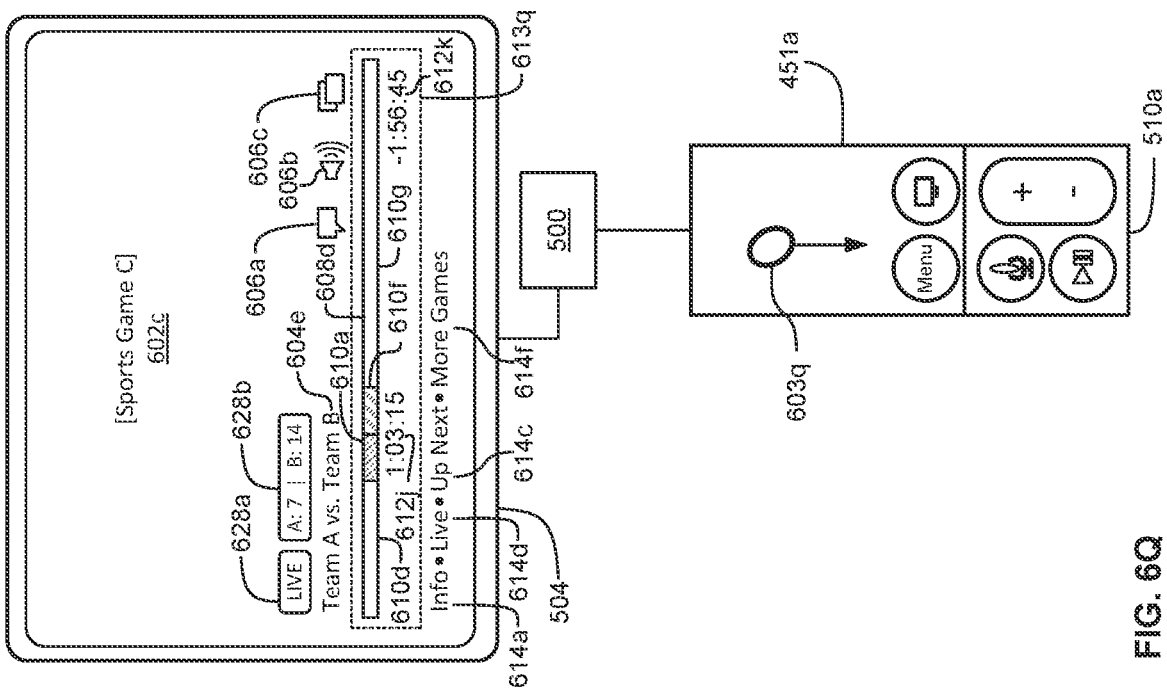

FIG. 6Q illustrates an example of the user interface elements presented by the electronic device 500 while the electronic device 500 presents a sports game 602c. In some embodiments, the sports game 602c is live-broadcast and/or live streamed to the electronic device 500. In some embodiments, because the sports game is live content, there are limitations on how far back and/or ahead in the playback position the electronic device 500 is able to skip and/or scrub. While presenting the sports game 602c, the electronic device 500 presents (e.g., in response to an input similar to the input illustrated in FIG. 6A) an indication 628a that the sports game 602c is live, an indication 628b of the current score of the sports game, selectable options 606a-c described above with reference to FIG. 6B, scrubber bar 608d, information tab 614a, a live content tab 614d, up next tab 614c, and a more games tab 614f. In some embodiments, because there are limitations on how far the electronic device 500 is able to skip and/or scrub, the scrubber bar 608d includes a region 610d corresponding to a portion of the sports game prior to the current playback position that the electronic device is not able to skip or scrub back to, a portion 610a of the sports game 602c prior to the current playback position that the electronic device is able to skip or scrub back to, an indication 610f of a portion of the sports game 602c ahead of the current playback position that the electronic device 500 is able to scrub or skip ahead to, and an indication 610g of a portion of the sports game 602c that the electronic device 500 is not able to scrub or skip ahead to. In some embodiments, the electronic device 500 presents the different regions 610d-g of scrubber bar 608d with different colors or shading to distinguish the regions 610d-g from each other. In some embodiments, the scrubber bar 608d further includes an indication 612j of the current time of the current playback position of the sports game and an indication 612k of the amount of time remaining in the sports game from the current playback position.

As shown in FIG. 6Q, the electronic device 500 detects, via input device 510a, a downward swipe of contact 603q corresponding to a request to move the current focus 613q down in the user interface. In some embodiments, in response to the input illustrated in FIG. 6Q, the electronic device 500 updates the user interface as shown in FIG. 6R.

FIG. 6R illustrates an example of how the electronic device 500 updates the user interface in response to the input illustrated in FIG. 6Q. In some embodiments, the electronic device 500 moves the current focus 613r to the information tab 614a and displays the contents of the information tab beneath the scrubber bar 608d and other tabs 614c, 614d, and 614f (e.g., in response to the current focus 613r being on the information tab 614a without detecting selection of the information tab 614a). In some embodiments, the contents of the information tab 614a include an image 616g associated with sports game 602c, an indication 616h of the title of the sports game 602c (e.g., the two teams playing against each other), an indication 616i of the current score of the sports game, informational text 616j about the sports game 602c, and an option 616k to view additional informational text 616j about the sports game. As shown in FIG. 6R, the electronic device 500 detects, via input device 510a, a right swipe of contact 603r corresponding to a request to move the current focus 613r to the right. In response to the input illustrated in FIG. 6R, the electronic device 500 updates the current focus 613r of the electronic device as shown in FIG. 6S.

Figure 6T:
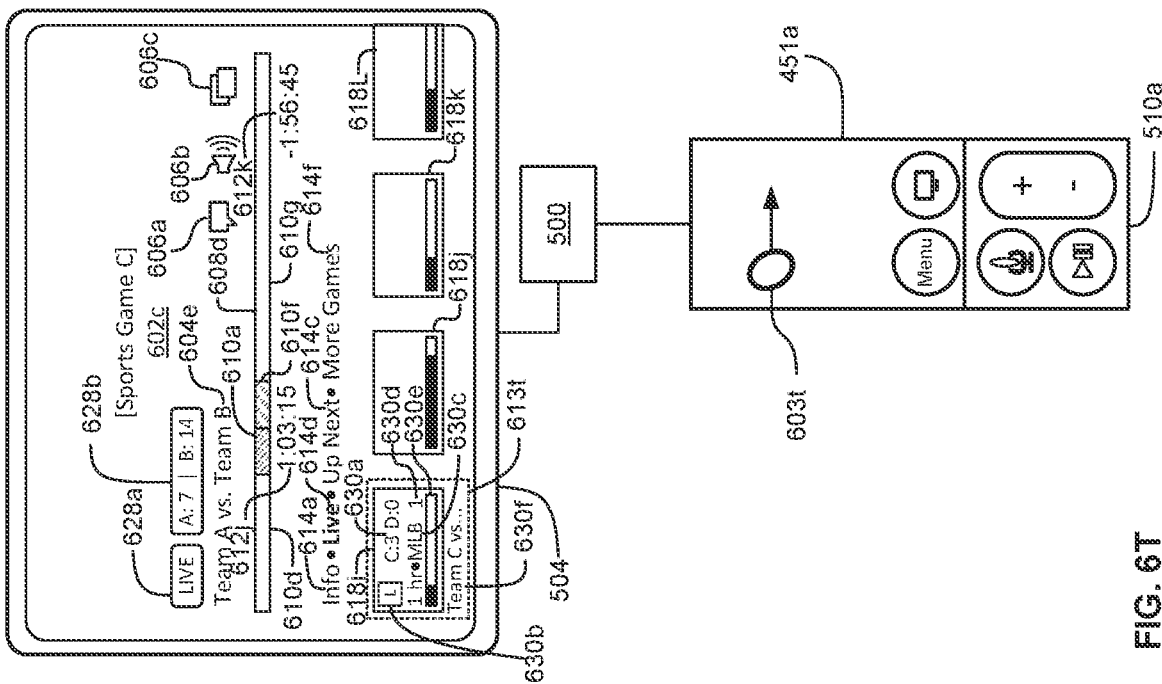
Figure 6S:
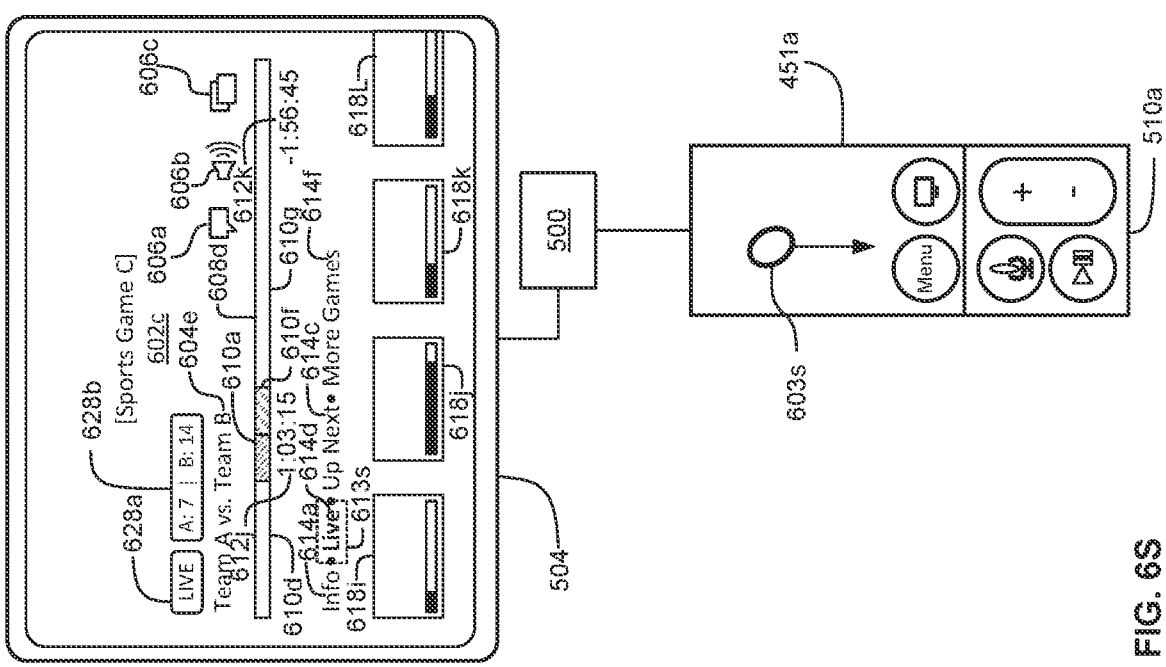

FIG. 6S illustrates an example of how the electronic device 500 updates the user interface in response to the input illustrated in FIG. 6R. In FIG. 6S, the current focus 613s is on the live tab 614d, for example, and, in response to detecting the current focus 613s move to the live tab 614d (e.g., without detecting selection of the live tab 614d), the electronic device 500 presents the contents of the live tab 614d at the location in the user interface at which the contents of the information tab were presented in FIG. 6R (e.g., below the other tabs 614a, 614c, and 614f and scrubber bar 608d). In some embodiments, the live tab 614d is only displayed while the electronic device 500 is presenting a content item that is being live streamed or live broadcast. In some embodiments, the live tab 614d includes representations 618i-L of content items currently being live streamed and/or live broadcast that are available for playback on the electronic device. In some embodiments, the representations 614i-L include images corresponding to each content item and progress bars indicating the portions of the content items that have already been broadcast and/or streamed relative to the entire duration of the content items. In some embodiments, the representations 618i-L correspond to various types of live (e.g., streamed or broadcast) content items, including television shows, movies, sports games, and the like. In some embodiments, the progress bars are independent from content consumption history of (e.g., the user account associated with) the electronic device. For example, the progresses of the progress bars do not imply that (e.g., the user account associated with) the electronic device has played any portion of the content items in the live tab 614d. In some embodiments, the progress bars are displayed in the representations 618i-L even when the input focus is not directed to the representations 618i-L. In some embodiments, in response to detecting selection of one of the representations 618i-L, the electronic device 500 initiates playback of the content item corresponding to the selected representation 618i-L in place of sports game 602c (e.g., from the playback position indicated by progress bar).

As shown in FIG. 6S, in some embodiments, the electronic device detects, via input device 510a, a downward swipe of contact 603s which corresponds to a request to move the current focus 613s in accordance with movement of contact 603s. In response to the input illustrated in FIG. 6S, the electronic device 500 updates the user interface as shown in FIG. 6T.

FIG. 6T illustrates an example of the way the electronic device 500 updates the user interface in response to the input illustrated in FIG. 6S. As shown in FIG. 6T, in some embodiments, the current focus 613t is on a respective representation 618i of a respective live content item in the live tab 614d of the user interface without a selection input of that item. For example, the representation 618i is a representation of another sports game. In some embodiments, while the current focus 613t is on representation 618i, the electronic device 500 presents indications 630a-f of metadata overlaid on representation 618i. In some embodiments, the indications of metadata include an indication 630a of the current score of the sports game, an indication 630b that the sports game is live, an indication 630c of the duration for which the game has been playing and the league of the game, an indication 630d of the channel on which the game is being broadcast or live-streamed, a progress bar 630e indicating the playback position of the game that is currently being broadcast of live-streamed, and an indication 630f of the title of the game (e.g., the teams that are playing each other). In some embodiments, the electronic device 500 detects, via input device 510a, a right swipe of contact 603t corresponding to a request to move the current focus 613t to the right. In some embodiments, in response to the input illustrated in FIG. 6T, the electronic device 500 updates the user interface as shown in FIG. 6U.

Figure 6V:
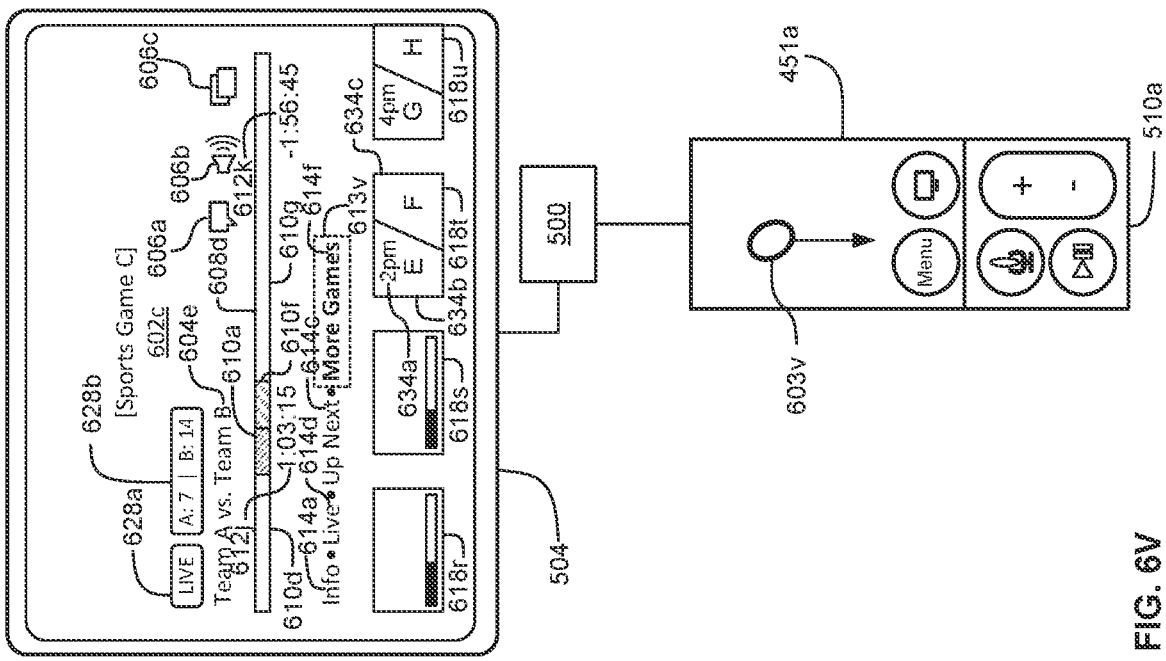
Figure 6U:
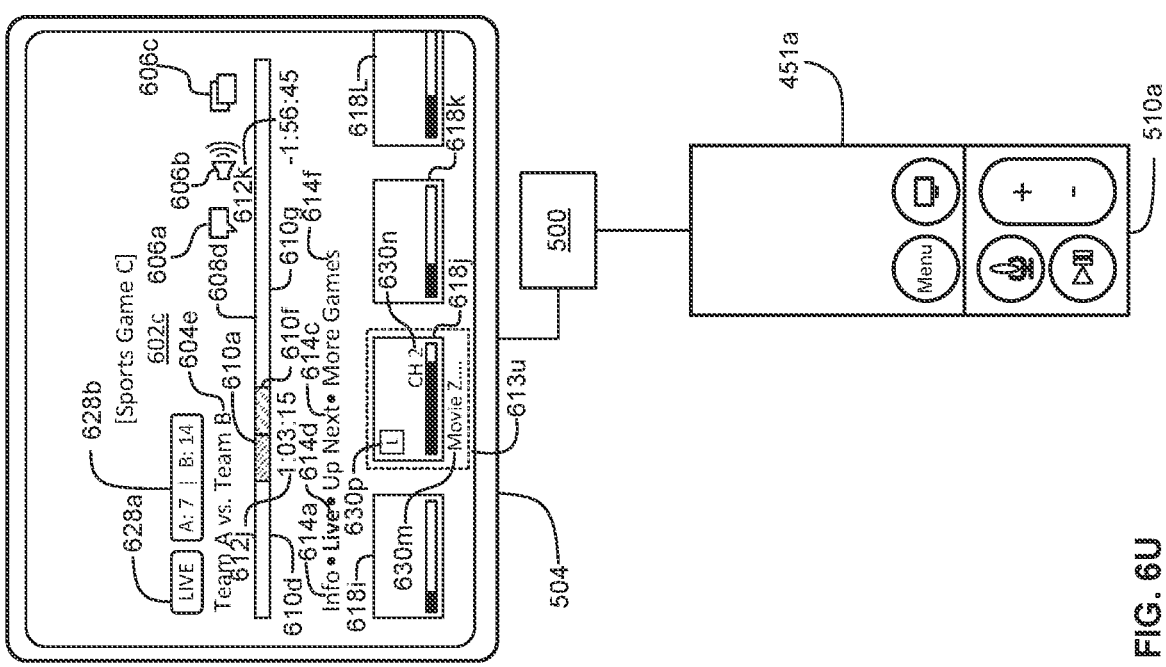

FIG. 6U illustrates an example of how the electronic device 500 updates the user interface in response to the input illustrated in FIG. 6T. In some embodiments, the electronic device 500 moves the current focus 613u to a representation 618j of a movie that is currently being live streamed or live broadcast and is available for playback on the electronic device without a selection input of the representation 618j. While the current focus 613u is on representation 618j, the electronic device 500 ceases displaying the indications of metadata overlaid on representation 618i illustrated in FIG. 6T and displays indications 630m-p of metadata overlaid on indication 618j, for example. In some embodiments, the indications of metadata overlaid on representation 618j include an indication 630p that the movie is live, an indication 630n of the channel on which the movie is being live streamed or live broadcast, and an indication 630m of the title of the movie. Thus, in some embodiments, the type of metadata displayed overlaid on the representations 618 varies depending on the type of the content item corresponding to the representation with the current focus. In some embodiments, if the electronic device 500 were to detect a further input corresponding to a request to move the current focus 613u to a different representation 618k or 618L (e.g., without a selection input of the other representation), the electronic device 500 would present metadata corresponding to the representation with the current focus overlaid on the representation with the current focus and cease displaying metadata associated with any other representations that do not have the current focus. In some embodiments, the representations 618*i*-L are horizontally scrollable to reveal additional representations not illustrated in FIG. 6U.

FIG. 6V illustrates an example of the electronic device 500 presenting the user interface with the current focus 613*v* on the more games tab 614*f* of the user interface. In some embodiments, the more games tab 614*f* is only displayed in the user interface if the electronic device 500 is playing a sports game. In some embodiments, the more games tab 614*f* is only displayed in the user interface if the electronic device is playing a content item that is live broadcast or live streamed. As shown in FIG. 6V, in some embodiments, while the current focus 613*v* is on the more games tab 614*f* (e.g., without detecting a selection input directed to the games tab 6140, the electronic device 500 displays the contents of the more games tab 614*f* at the location in the user interface at which the contents of the live tab 614*d* were presented in FIG. 6U and the location at which the contents of the information tab 614*a* were presented in FIG. 6R (e.g., below the other tabs 614*a*, 614*d*, and 614*c* and the scrubber bar 608*d*). As shown in FIG. 6V, for example, the more games tab 614*f* includes representations 618*r-u* of other sports games available for playback on the electronic device 500 without displaying representations of other types of live content other than sports games. In some embodiments, representations 618*r* and 618*s* correspond to games that are currently being live broadcast or live streamed and representations 618*t* and 618*u* correspond to games that have not yet begun to be live broadcast or live streamed (e.g., but will begin and/or be live broadcast or live streamed later in the same day and/or within a predetermined time (e.g., 10, 20, 30, 60, 120, 140 minutes) from the current time). In some embodiments, representations 618*r* and 618*s* include indications of the current progress of the games being live streamed or live broadcast (e.g., independent from content playback of those games on the electronic device). In some embodiments, in response to detecting selection of one of the representations 618*r-s*, the electronic device 500 initiates playback of the sports game corresponding to the selected one of representations 618*r-s* (e.g., from the playback position indicated by progress bar) by replacing sports game 602*c* In some embodiments, representation 618*t* includes an indication 634*a* of the time at which the game will begin to be live streamed or live broadcast and indications 634*b-c* of the teams playing in the game. In some embodiments, representation 618*u* includes elements similar to the elements of representation 618*t*.

As shown in FIG. 6V, in some embodiments, the electronic device 500 detects, via input device 510*a*, a downward swipe of contact 603*v*. In some embodiments, in response to the input illustrated in FIG. 6V, the electronic device 500 updates the current focus 613*v* in accordance with the movement of contact 603*v*, as shown in FIG. 6W.

Figure 6X:
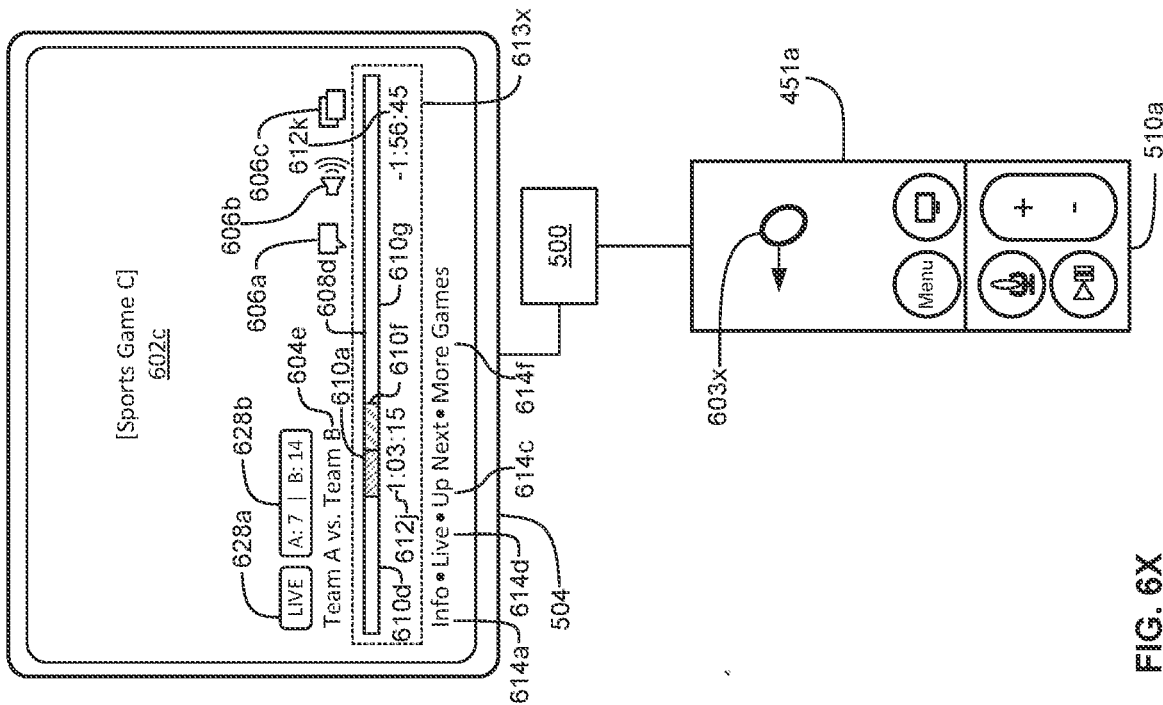
Figure 6W:
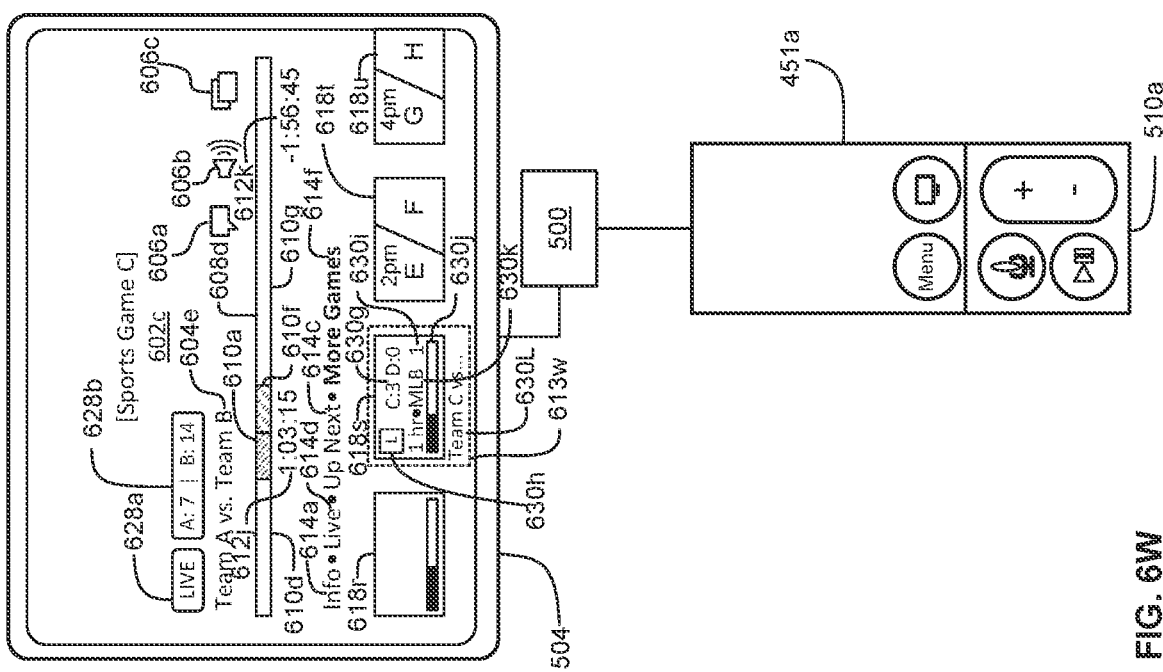

FIG. 6W illustrates an example of the electronic device 500 presenting the updated user interface in response to the input illustrated in FIG. 6V. In some embodiments, the current focus 613*w* is directed to a representation 618*s* of another sports game. In some embodiments, while the current focus 613*w* is directed to representation 618*s* (e.g., without detecting a selection input directed to representation 618*s*), the electronic device 500 presents indications 630*g-k* overlaid on representation 618*s*, including an indication 630*h* that the sports game is live, an indication 603*g* of the current score of the sports game, an indication 630*k* of the current playback position of the game and the league of the game, an indication 630*i* of the channel on which the game is being presented, and a progress bar 630*j* and presents an indication 630L of the title of the game displayed proximate to (e.g., below) representation 618*s*. In some embodiments, if the electronic device 500 were to detect a swipe to the left or right via input device 510*a*, the electronic device 500 would move the current focus to a representation 618*r* or 618*t-u* of a different game and display metadata corresponding to the representation to which the current focus is directed overlaid on the representation to which the current focus is directed. In some embodiments, the representations 618*r-u* are horizontally scrollable and the electronic device 500 reveals additional representations not illustrated in FIG. 6W if the electronic device 500 scrolls the representations.

As previously described, in some embodiments, there are limits to how far the electronic device 500 is able to scrub or skip forwards or backwards because sports game 602*c* is being live broadcast or live streamed. In FIG. 6X, for example, while the current focus 613*x* is on the scrubber bar 608*d*, the electronic device 500 detects, via input device 510*a*, a left swipe of contact 603*x*. In some embodiments, in response to the input illustrated in FIG. 6X, the electronic device 500 skips or scrubs the playback position of the sports game 602*c* back by an amount that corresponds to the speed, distance, and/or duration of the swipe of contact 603*x*, as shown in FIG. 6Y.

Figure 6Z:
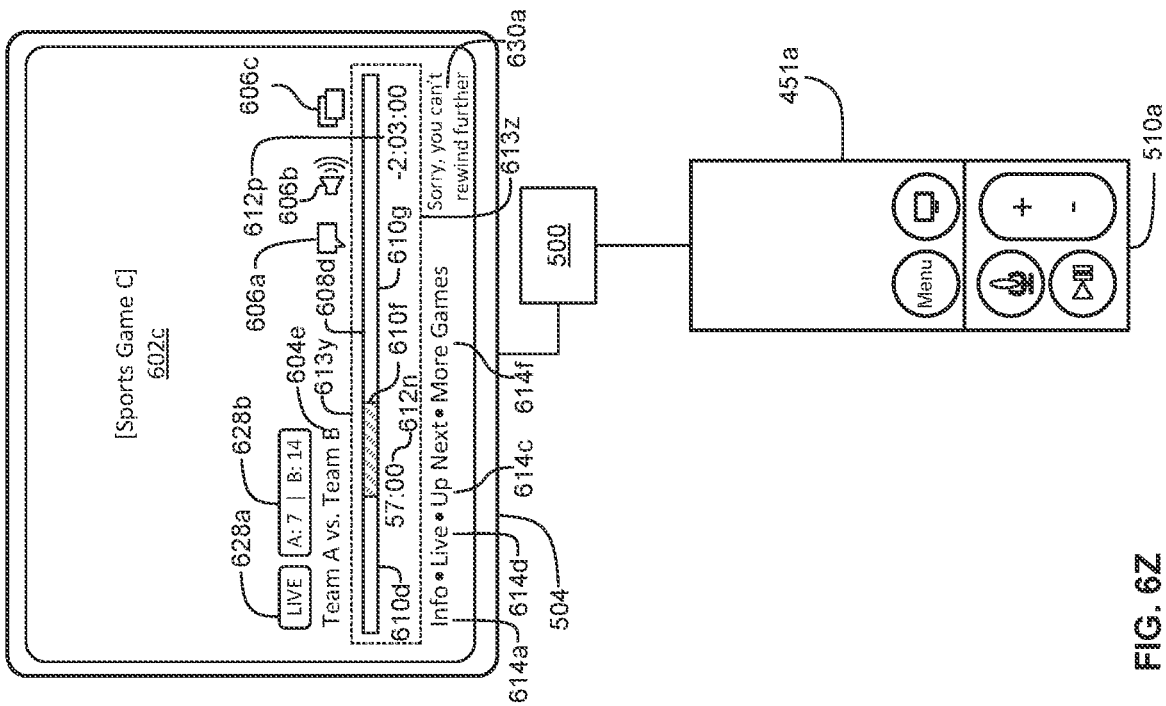
Figure 6Y:
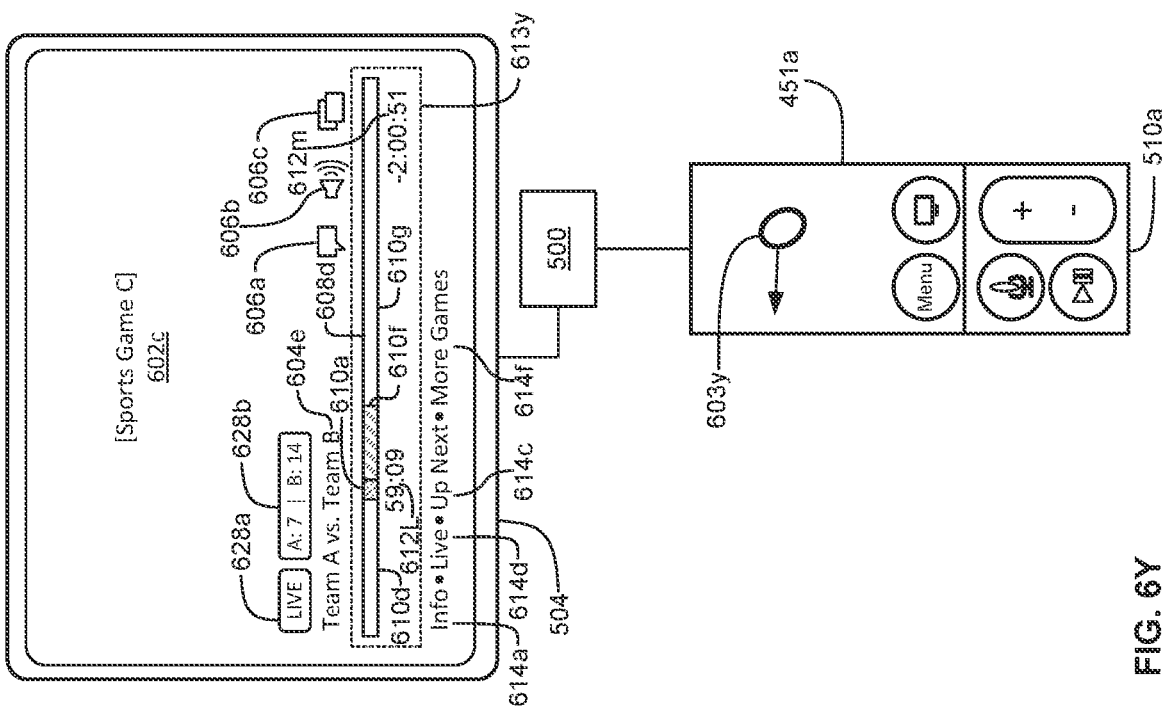
Figure 6B:
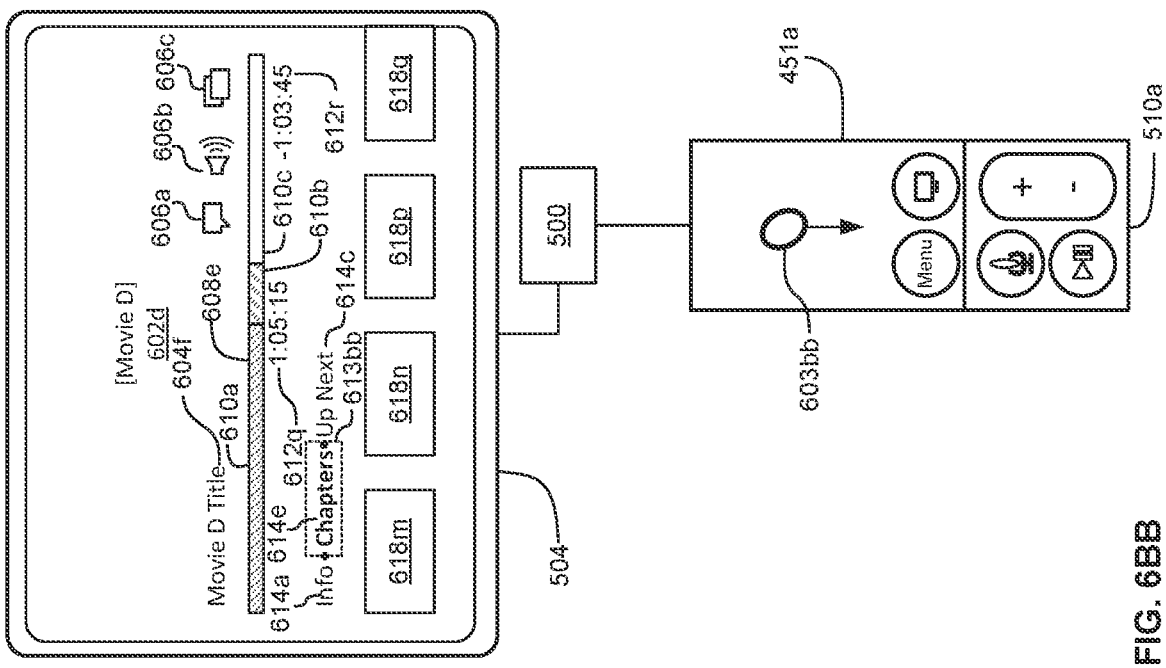
Figure 6A:
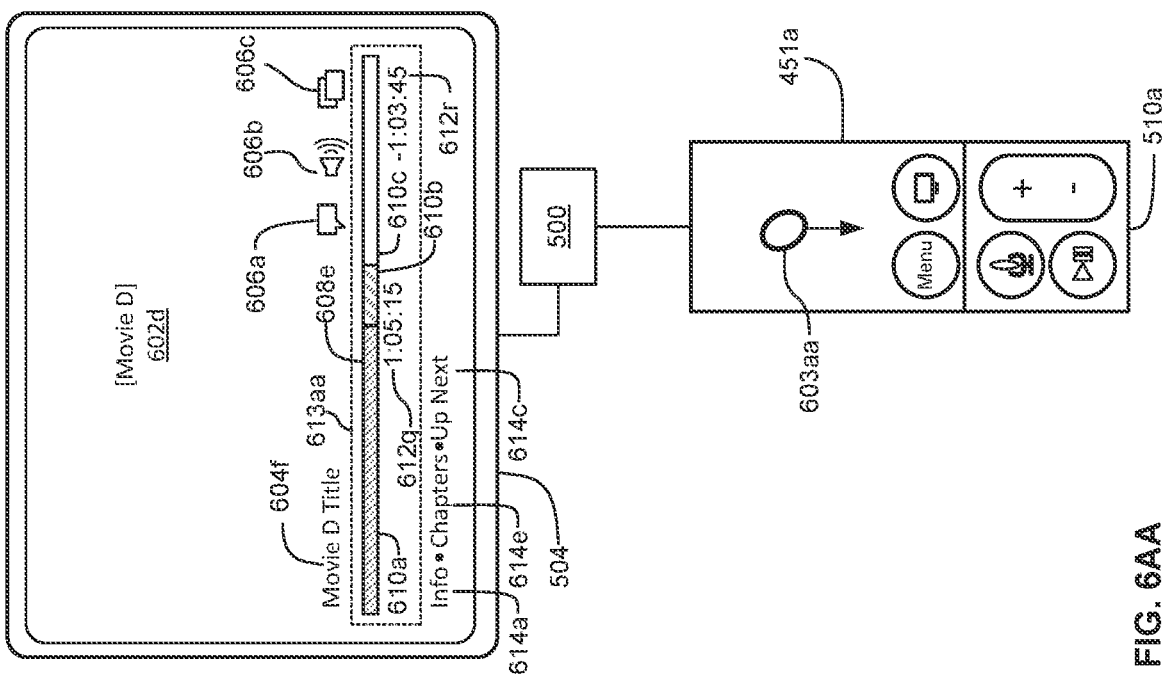
Figure 6D:
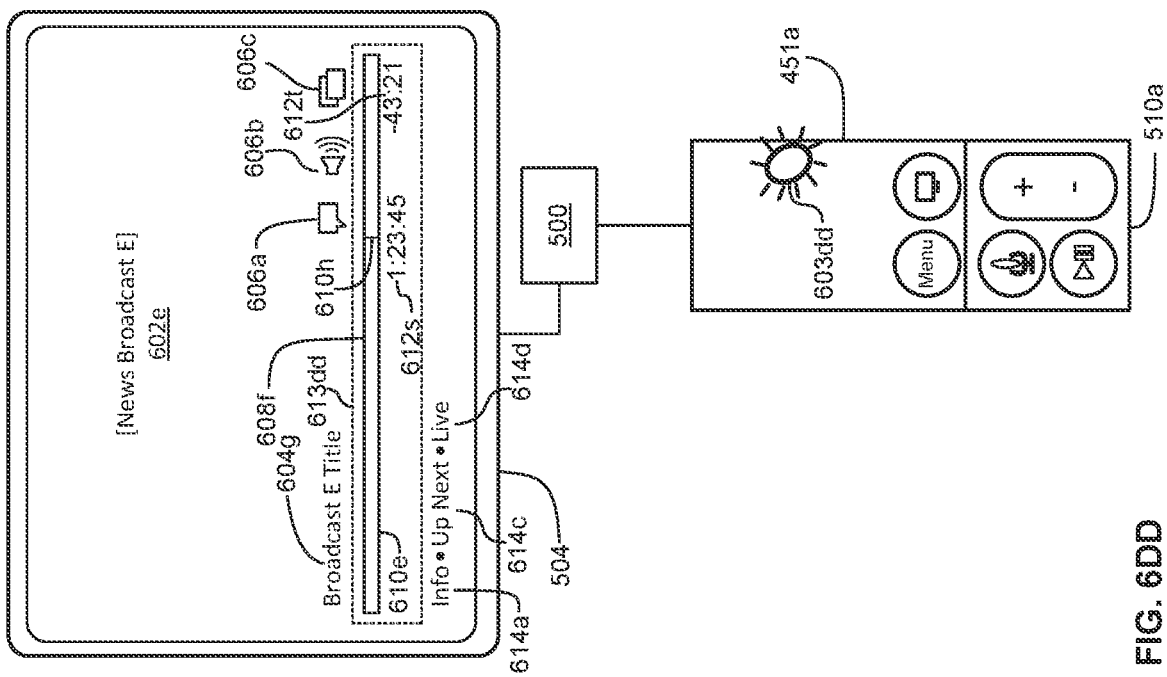
Figure 6C:
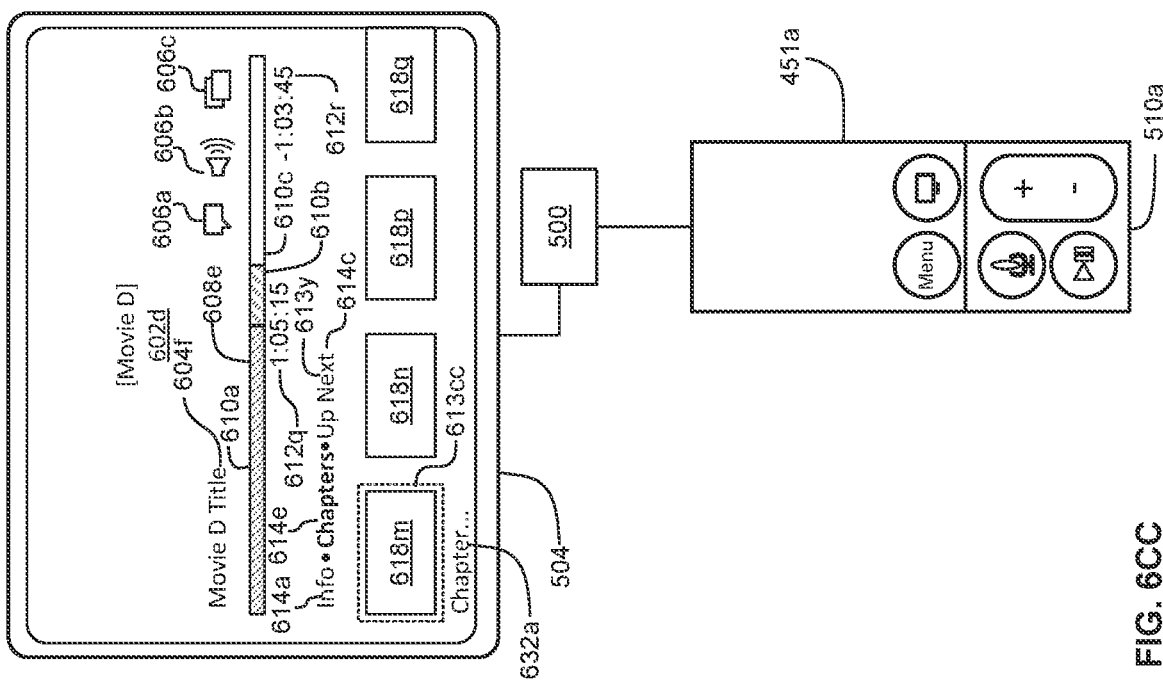
Figure 6E:
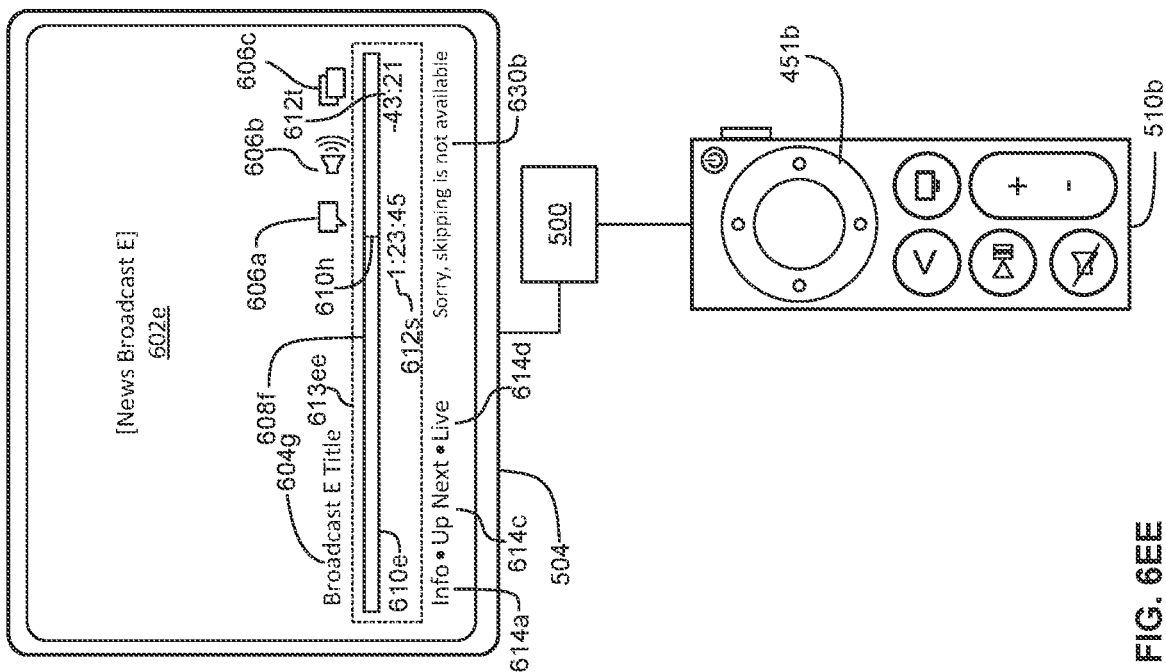

FIG. 6Y illustrates an example of the electronic device 500 presenting the sports game 602*c* after receiving the input illustrated in FIG. 6X. In some embodiments, the electronic device 500 updates the current playback position within the sports game in accordance with the speed, distance, and/or duration of the movement of contact 603*x* in FIG. 6X and updates the scrubber bar 608*d* to include an indication 612L of the current playback position and an indication 612*m* of the duration of the sports game remaining after the current playback position. In some embodiments, because the duration, distance, and/or speed of the movement of contact 603*x* corresponds to moving the playback position back within a portion of the content item in which skipping and scrubbing is allowed (e.g., indicated by region 610*a* of scrubber bar 608*d*), the electronic device 500 updates the playback position in accordance with the movement of contact 603*x*.

In some embodiments, as shown in FIG. 6Y, the electronic device 500 detects a subsequent input via input device 510 including a left swipe of contact 603*y* while the current focus is directed to scrubber bar 608*d*. In some embodiments, the input illustrated in FIG. 6Y corresponds to a request to further scrub the current playback position of scrubber bar 608*d*. In some embodiments, (e.g., the speed, distance, duration, etc. of) the movement of contact 603*y* corresponds to scrubbing or skipping the current playback position back to a portion of the sports game 602*c* that the electronic device is not able to scrub to, represented by region 610*d* of scrubber bar 608*d*. In some embodiments, in response to the input illustrated in FIG. 6Y, the electronic device 500 updates the playback position to the beginning of the portion of the sports game that the electronic device 500 is able to scrub or skip to, represented by region 610*a* of the scrubber bar 608*d*, as shown in FIG. 6Z.

FIG. 6Z illustrates the electronic device 500 presenting the sports game 602*c* in the user interface updated in response to the input illustrated in FIG. 6Y. As described above, in some embodiments, rather than skipping the current playback position back to a portion of the sports game 602*c* corresponding to (e.g., the speed, distance, duration, etc. of) the movement of contact 603*y*, the electronic device 500 updates the playback position to the earliest portion of the sports game 602*c* that the electronic device 500 is able to scrub or skip back to because the movement of contact 603y corresponds to a request to scrub or skip back further than the electronic device 500 is able to. In some embodiments, the electronic device 500 presents a visual indication 630a that the electronic device 500 is not able to scrub or skip back any further concurrently with the scrubber bar 608d and other indications and playback control elements overlaid on sports game 602c.

FIG. 6AA illustrates an example of the electronic device 500 presenting a movie 602d with playback control elements overlaid on the movie 602d. In some embodiments, a number of the playback control elements illustrated in FIG. 6AA are the same as a number of the playback control elements described above with reference to FIG. 6B. For example, scrubber bar 608e is similar to scrubber bar 608a because the electronic device 500 is able to scrub or skip to any playback location within the movie 602d. In some embodiments, the user interface illustrated in FIG. 6AA includes a chapters tab 614e instead of the episodes tab 614b described above with reference to FIG. 6B because movie 602d includes chapters, rather than including other episodes, as was the case for TV show 602a. As shown in FIG. 6AA, in some embodiments, while the current focus 613aa is on the scrubber bar 608e, the electronic device 500 detects, via input device 510a a downward swipe of contact 603aa. In some embodiments, in response to a sequence of inputs including the input illustrated in FIG. 6AA, the electronic device 500 updates the user interface as shown in FIG. 6BB. For example, the electronic device 500 first detects the input illustrated in FIG. 6AA and then detects a right swipe via input device 510a and, in response, updates the user interface as shown in FIG. 6BB.

FIG. 6BB illustrates an example of the user interface updated in response to a sequence of inputs including the input illustrated in FIG. 6AA. As shown in FIG. 6BB, in some embodiments, the current focus 613bb is on the chapters tab 614e of the user interface. For example, in response to detecting the current focus 613bb on the chapters tab 614e of the user interface (e.g., without detecting a selection input directed to the chapters tab 614e), the electronic device 500 presents representations 618m-q of chapters of movie 602d below tabs 614a, 614e, and 614c and the scrubber bar 608e. In some embodiments, the representations 618m-q of the chapters include images corresponding to each respective chapter (e.g., a screenshot from each chapter). In some embodiments, in response to detecting selection of one of the representations 618m-q of the chapters, the electronic device 500 initiates playback of the movie from the playback position of the chapter corresponding to the selected representation. In some embodiments, if the electronic device 500 were to detect a horizontal swipe via input device 510a while the current focus 613bb is on the chapters tab 614e, the electronic device 500 would cease presenting the representation 618m-q of the chapters and instead present content corresponding to the tab with the current focus 613bb at the location in the user interface at which the representations 618m-q of the chapters are displayed in FIG. 6BB (e.g., below the chapters 614a, 614e, and 614c and the scrubber bar 608e). As shown in FIG. 6BB, the electronic device 500 detects, via input device 510a, a downward swipe of contact 603bb while the current focus 613bb is on the chapters tab 614e. In some embodiments, in response to the input illustrated in FIG. 6BB, the electronic device 500 updates the user interface as shown in FIG. 6CC.

FIG. 6CC illustrates an example of how the electronic device 500 updates the user interface in response to the input illustrated in FIG. 6BB. As shown in FIG. 6CC, in some embodiments, the electronic device 500 moves the current focus 613cc to a respective representation 618m of a chapter of the movie 602d. In some embodiments, the electronic device 500 displays an indication 632a of the title of the chapter and/or an identification of the chapter number proximate to (e.g., below) the representation 618m in response to the current focus 613cc being on representation 618m (e.g., without detecting a selection input directed to the representation 618m). In some embodiments, if the electronic device 500 were to detect a horizontal swipe with input device 510a (e.g., without detecting a selection input), the electronic device 500 would move the current focus 613cc to a different representation 618m-q of a chapter, cease display of the indication 632a of the title of the chapter associated with representation 618m, and display an indication of the title of the chapter and/or an identification of the chapter number associated with the representation 618n-q that has the current focus (e.g., proximate to the representation 618n-q with the current focus). In some embodiments, the representations 618m-q of chapters are horizontally scrollable, and the electronic device 500 reveals additional representations of chapters not illustrated in FIG. 6CC in response to a request to scroll the representations 618m-q.

In some embodiments, the electronic device 500 presents live (e.g., streamed or broadcast) content for which scrubbing and/or skipping is not available. FIG. 6DD illustrates an example of the electronic device 500 presenting a news broadcast 602e that cannot be scrubbed or skipped. In some embodiments, the electronic device 500 presents playback control elements overlaid on the news broadcast 602e. A plurality of the playback control elements are the same as or similar to playback control elements described above with reference to FIGS. 6A-6CC, for example. In some embodiments, because it is not possible to scrub or skip within the news broadcast 602e, the electronic device 500 presents a scrubber bar 608f that includes a region 610e that indicates that scrubbing and skipping are not available. In some embodiments, all parts of region 610e are displayed in the same color, pattern or style. In some embodiments, the scrubber bar further includes an indication 612s of the current playback position within the news broadcast 602e and an indication 612t of the duration of the news broadcast 602e between the current playback position and the end of the news broadcast 602e. As shown in FIG. 6DD, the electronic device 500 detects, via input device 510a, a click with contact 603dd on the right side of the touch surface 451a of the input device 510a that corresponds to a request to skip ahead within the news broadcast 602e by a predetermined amount of time (e.g., 10, 15, 30, etc. seconds). In some embodiments, in response to the input illustrated in FIG. 6DD, the electronic device 500 updates the user interface as shown in FIG. 6EE.

In some embodiments, as shown in FIG. 6EE, in response to the input illustrated in FIG. 6DD, the electronic device 500 forgoes skipping ahead in the news broadcast 602e because skipping is not possible. Additionally, in some embodiments, the electronic device 500 displays a visual indication 630b that skipping ahead in the news broadcast is not possible concurrently with display of the scrubber bar 608f and other indications and control elements overlaid on news broadcast 602e.

Figure 7:
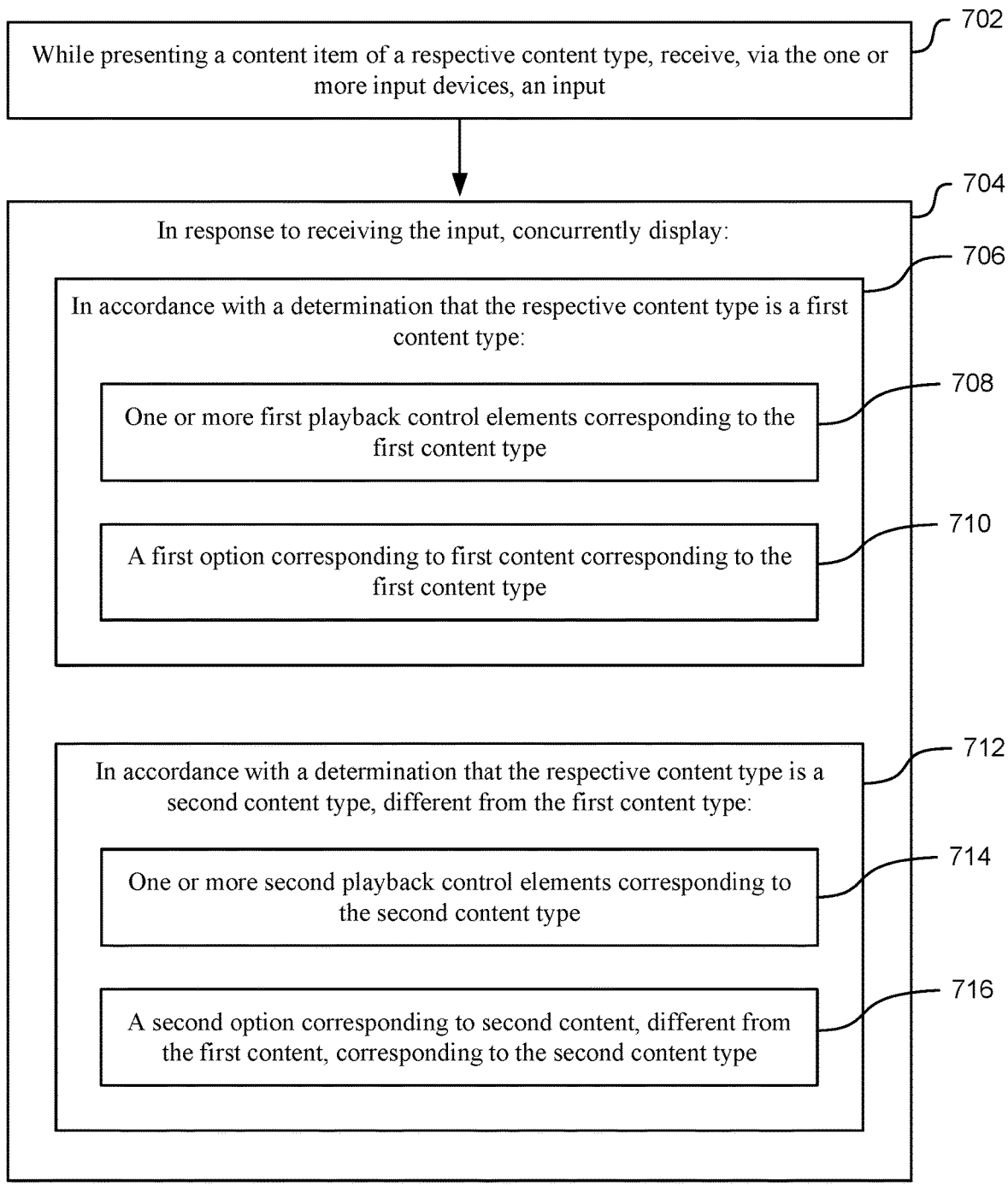
FIG. 7 is a flow diagram illustrating a method of presenting a user interface for controlling the playback of content items in accordance with some embodiments.

FIG. 7 is a flow diagram illustrating a method of presenting a user interface for controlling the playback of content items in accordance with some embodiments. The method 700 is optionally performed at an electronic device such as device 100, device 300, and device 500, as described above with reference to FIGS. 1A-1B, 2-3, 4A-4B and 5A-5C.

Some operations in method 700 are, optionally combined and/or order of some operations is, optionally, changed.

As described below, the method 700 provides ways in which an electronic device presents a user interface for controlling the playback of content items in accordance with some embodiments. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, method 700 is performed at an electronic device (e.g., 500) in communication with a display generation component and one or more input devices. In some embodiments, the electronic device is a mobile device (e.g., a tablet, a smartphone, a media player, or a wearable device), a computer (e.g., a desktop computer, a laptop computer), or a wearable device (e.g., a watch, a head-mounted device), optionally in communication with one or more of a mouse (e.g., external), trackpad (optionally integrated or external), remote control device (e.g., external), another mobile device (e.g., separate from the electronic device), a handheld device (e.g., external), and/or a controller (e.g., external, etc.), or a set-top box in communication one or more input devices (e.g., a remote control). In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc.

In some embodiments, such as in FIG. 6A, while presenting (e.g., displaying, via the display generation component) a content item (e.g., 602a) of a respective content type (e.g., audio content (music, podcasts, audiobooks), video content (series of episodic content, TV shows, movies, video clips, sports games), live (e.g., broadcast or streaming) content, on-demand (e.g., streaming or locally stored) content), the electronic device 500 receives (702), via the one or more input devices, an input (e.g., via contact 603a). In some embodiments, the input corresponds to a request to display one or more playback control elements and an option corresponding to additional content corresponding to the content item. For example, while a set-top box is presenting the content item via display generation component (e.g., television, projector, etc.) without presenting a playback control element and/or an option corresponding to additional content, a remote control in communication with the set-top box receives a selection input.

In some embodiments, such as in FIG. 6B, in response to receiving the input, the electronic device (e.g., 500) concurrently displays (704), in accordance with a determination that the respective content type is a first content type (706), one or more first playback control elements (e.g., 608a) corresponding to the first content type. In some embodiments, the one or more first playback control elements include a scrubber bar and/or one or more selectable options that, when selected, cause the electronic device to pause/play, fast forward, and/or rewind the content; present subtitle options for the content item; and/or present audio playback options for the content item. In some embodiments, the type of scrubber bar presented depends on the type of content. For example, if the content is on-demand content, the scrubber bar is a scrubber bar that enables unlimited rewinding of the content item and if the content is live content being broadcast (e.g., over the air) or streamed live, the scrubber bar is a scrubber bar that enables rewinding of the content item by no more than a predetermined threshold (e.g., 10, 15, 30, 45, etc. seconds, 1, 2, 3, 5, etc. minutes).

In some embodiments, such as in FIG. 6B, in response to receiving the input, the electronic device (e.g., 500) concurrently displays (704), in accordance with a determination that the respective content type is a first content type (706), a first option (e.g., 614b) corresponding to first content corresponding to the first content type. In some embodiments, the first option is displayed in association with the scrubber bar (e.g., above and to the left or below and to the left of the scrubber bar). In some embodiments, in response to detecting selection (e.g., or focus) of the first option, the electronic device presents representations of the first content corresponding to the first content type. For example, if the first content type is an on-demand movie, the first content is the chapters of the movie and/or items of on-demand content in a playback queue associated with (e.g., a user account associated with) the electronic device. As another example, if the first content type is a live broadcast sports game, the first content is other live content (e.g., that is currently available for live playback), scores of the sports game and other sports games, and/or on-demand content in the playback queue. As another example, the first content type is additional content recommended based on the content item (e.g., content of the same type, with the same creators, of the same genre, content liked by other users that like the content item, etc.). In some embodiments, in response to detecting selection (e.g., or focus) of the first option, the electronic device updates the locations at which the one or more playback control elements and first option are displayed overlaid on the content item. For example, in response to detecting selection (e.g., or focus) of the first option, the electronic device shifts the one or more playback control elements and the first option up and initiates display of the representations of the content corresponding to the first content type overlaid on the content item beneath the one or more playback control elements and first option.

In some embodiments, such as in FIG. 6P, in response to receiving the input, the electronic device (e.g., 500) concurrently displays (704), in accordance with a determination that the respective content type is a second content type, different from the first content type (712), one or more second playback control elements (e.g., 608c) corresponding to the second content type; and In some embodiments, some or all of the second playback control elements are the same as the first playback control elements. In some embodiments, some or all of the second playback control elements are different from the first playback control elements. In some embodiments, the first content type and second content type have completely different characteristics, such as on-demand music and a live sports game. In some embodiments, the first content type and second content type have similarities and differences, such as an on-demand movie and an on-demand TV show.

In some embodiments, such as in FIG. 6P, in response to receiving the input, the electronic device (e.g., 500) concurrently displays (704), in accordance with a determination that the respective content type is a second content type, different from the first content type (712), a second option (e.g., 614d) corresponding to second content, different from the first content, corresponding to the second content type. In some embodiments, in response to the input, the electronic device presents a third option corresponding to third content different from the first and second content that corresponds to the first content type and the second content type irrespective of whether the respective content type is the first content type or the second content type. In some embodiments, the playback control elements and options are displayed overlaid on the content item while the electronic device continues to present the content item. In some embodiments, in response to detecting selection (e.g., or focus) of the second option, the electronic device updates the locations at which the one or more playback control elements and second option are displayed overlaid on the content item. For example, in response to detecting selection (e.g., or focus) of the second option, the electronic device shifts the one or more playback control elements and the second option up and initiates display of the representations of the content corresponding to the second content type overlaid on the content item beneath the one or more playback control elements and second option.

The above-described manner of presenting playback control elements and an option corresponding to content that both correspond to the respective content type of the content item provides an efficient way of accessing playback controls and additional content relevant to the content item being presented, which additionally reduces power usage and improves battery life of the electronic device by enabling the user to use the electronic device more quickly and efficiently.

In some embodiments, such as in FIG. 6H, in accordance with the determination that the respective content type is the first content type (e.g., series of episodic content), the first content corresponding to the first content type includes second content items (e.g., 618*e-h*) in a playback queue associated with a user (e.g., a user account) of the electronic device. In some embodiments, the electronic device is configured to play the content items in the queue in the order in which they are queued one after another automatically. For example, after finishing the content item, the electronic device automatically plays the next item in the playback queue. In some embodiments, the playback queue is associated with a user account associated with a plurality of electronic devices, including the electronic device. In some embodiments, the electronic device adds content items to the playback queue in response to user inputs manually adding the content items to the playback queue. In some embodiments, the electronic device adds content items to the playback queue automatically based on content consumption history of (e.g., a user account associated with) the electronic device, such as adding an episode of a series of episodic content to the playback queue in response to (e.g., the user account associated with) the electronic device playing an episode of the series of episodic content. In some embodiments, in response to detecting an input directed to the first option, the electronic device presents representations of the content items in the playback queue at a location in the user interface at which the first option had previously been displayed. In some embodiments, in response to detecting an input directed to (e.g., current focus without selection of, selection of) the first option, the electronic device displays representations of the content items in the content playback queue. In some embodiments, in response to detecting selection of a respective one of the representations of the content items in the content playback queue, the electronic device initiates playback of the content item corresponding to the respective one of the representations of content items. In some embodiments, the electronic device displays the representations of the content items in the content playback queue concurrently with the one or more playback control elements and first option overlaid on the content item. In some embodiments, the electronic device displays, overlaid on the representation of a respective content item in the playback queue that has the current focus, an indication of a portion of the content item that has been consumed by (e.g., a user account associated with) the electronic device overlaid on the respective representation and an indication of the title of the content item associated with the respective representation. In some embodiments, the electronic device forgoes display of an indication of a portion of the content item that has been consumed by (e.g., a user account associated with) the electronic device and an indication of the title of the content item for the representations that do not have the current focus of the electronic device. In some embodiments, the electronic device ceases display of the one or more playback control elements (e.g., a scrubber bar) while displaying the representations of content items in the playback queue (or, more generally, the content associated with any other options displayed in the user interface, such as the second option, third option, etc.). In some embodiments, while the current focus is on the first option or one of the representations of content items in the playback queue (or, more generally, while presenting the representations of the content items in the playback queue), in response to detecting a respective input (e.g., selection of a "back" or "home" button of an input device), the electronic device ceases display of the representations (e.g., and the options and playback control elements) and continues to play the content item.

The above-described manner of presenting the playback queue associated with the user provides an efficient way of viewing representations of the next content items to be played while playing the content, which additionally reduces power usage and improves battery life of the electronic device by enabling the user to use the electronic device more quickly and efficiently.

In some embodiments, such as in FIG. 6D, in response to receiving the input (e.g., in accordance with the determination that the respective content type is the first content type, in accordance with the determination that the respective content type is the second content type, irrespective of whether the respective content type is the first content type or second content type), the electronic device concurrently displays a third option (e.g., 614*a*) corresponding to information about the content item. In some embodiments, the electronic device concurrently displays the third option with the one or more first playback control elements corresponding to the respective content type and the first or second option overlaid on the content. In some embodiments, the information about the content item includes one or more of an image corresponding to the content item, a description of the content item, a score of the content item (e.g., if the content item is a sports game), an option to play the content item from the beginning, and an option to view a user interface associated with the content item. In some embodiments, in response to detecting an input directed to (e.g., current focus without selection, selection) the third option, the electronic device presents the information about the content item overlaid on the content item.

The above-described manner of displaying the option corresponding to information about the content item provides an efficient way of viewing the information without ceasing playback of the content item, which additionally reduces power usage and improves battery life of the electronic device by enabling the user to use the electronic device more quickly and efficiently.

In some embodiments, such as in FIG. 6C, while displaying the third option (e.g., 614*a*) corresponding to the information about the content item, the electronic device receives, via the one or more input devices, an input (e.g., via contact 603c) directed to (e.g., current focus without selection of, selection of) the third option (e.g., 614a).

In some embodiments, such as in FIG. 6D, in response to receiving the input directed to (e.g., current focus without selection of, selection of) the third option (e.g., 614a), the electronic device concurrently displays, with the one or more first playback control elements or the one or more second playback control elements (e.g., 608a), a fourth option (e.g., 616c) that is selectable to play the content item from a beginning of the content item (e.g., 602a), and a fifth option (e.g., 616d) that is selectable to display a user interface associated with the content item (e.g., 602a) that includes additional information associated with the content item (e.g., 602a). In some embodiments, in response to detecting selection of the fifth option, the electronic device ceases playback of the content item. In some embodiments, the fourth and fifth options are displayed concurrently with the first or second option, the third option, and the one or more playback control elements overlaid on the content item. In some embodiments, the electronic device concurrently displays one or more of an image corresponding to the content item, a description of the content item, and a score of the content item (e.g., if the content item is a sports game) concurrently with the fourth and fifth options. In some embodiments, the electronic device presents the fourth and fifth options at a location in the user interface at which the third option was displayed prior to detecting the input directed to the third option. For example, prior to detecting the input directed to the third option, the electronic device displays the third option in a respective region of the user interface (e.g., at the bottom) and, in response to detecting selection of the third option, the electronic device displays the fourth and fifth options in the respective region and moves the other elements overlaid on the content item in the user interface (e.g., moves the other elements overlaid on the content item in the user interface up).

The above-described manner of presenting the fourth and fifth options provides an efficient way of starting the content item from the beginning or viewing a user interface associated with the content item which additionally reduces power usage and improves battery life of the electronic device by enabling the user to use the electronic device more quickly and efficiently.

In some embodiments, such as in FIG. 6E, the content item (e.g., 602a) is a first episode in a series of episodic content. In some embodiments, the series of episodic content is a TV show or other episodic series including a collection of content items in the series.

In some embodiments, such as in FIG. 6E, in accordance with the determination that the respective content type is the first content type (e.g., the first type is an episode of a series of episodic content), the first content corresponding to the first content type includes second content items (e.g., 618a-618d) that are episodes in the series of episodic content, including a second episode, different from the first episode, in the series of episodic content. In some embodiments, in accordance with a determination that the content item is an episode in a series of episodic content, the electronic device presents an option to view representations of the other episodes in the series of episodic content.

The above-described manner of presenting an option corresponding to other episodes in the series of episodic content provides an efficient way of browsing the series of episodic content of the content item while playing the content item, which additionally reduces power usage and improves battery life of the electronic device by enabling the user to use the electronic device more quickly and efficiently.

In some embodiments, such as in FIG. 6D, the respective content type is the first content type (e.g., an episode of a series of episodic content). In some embodiments, such as in FIG. 6D, while displaying the first option (e.g., 614b), the electronic device (e.g., 500) receives, via the one or more input devices (e.g., 510a), an input (e.g., via contact 603d) directed to (e.g., current focus without selection, selection of) the first option (e.g., 614b). In some embodiments, such as in FIG. 6F, in response to receiving the input directed to (e.g., current focus without selection, selection of) the first option (e.g., 614b), the electronic device (e.g., 500) concurrently displays, with the one or more first playback control elements (e.g., 608a), representations (e.g., 618a-618d) of the second content items that are episodes in the series of episodic content, wherein a first representation (e.g., 618b) of a first respective second content item to which current focus (e.g., 613f) of the electronic device is not directed is displayed without an indication of information (e.g., a title of the episode) associated with the first respective second content item, and a second representation (e.g., 618a) of a second respective second content item to which current focus (e.g., 613l) of the electronic device (e.g., 500) is directed is displayed with an indication of information (e.g., 620a) (e.g., a title of the episode) associated with the second respective second content item. In some embodiments, in response to detecting the input directed to the first option, the electronic device displays representations of the other episodes in the series of episodic content of which the content item is an episode overlaid on the content item at a location at which the first option was previously displayed (e.g., while continuing to display the first option). In some embodiments, in response to detecting selection of one of the representations of other episodes, the electronic device initiates playback of the episode corresponding to the selected representation. In some embodiments, the electronic device presents an indication of the title of the episode corresponding to the representation that has the current focus of the electronic device and does not display the titles of the episodes corresponding to representations that do not have the current focus of the electronic device. In some embodiments, the electronic device displays the title of the episode associated with the representation that has the current focus at a location in the user interface proximate to the representation of the episode with the current focus. In some embodiments, the representations of the episodes include images associated with the episodes (e.g., still images included in the video content of the episodes).

The above-described manner of displaying the indication of information associated with the representation that has the current focus of the electronic device provides an efficient way of presenting information about the representations while reducing the portion of the content item that is obscured, which additionally reduces power usage and improves battery life of the electronic device by enabling the user to use the electronic device more quickly and efficiently.

In some embodiments, the one or more playback control elements include an option that, in response to detecting an input directed to (e.g., current focus without selection of, selection of) the option, causes the electronic device to present subtitle options for the content item. In some embodiments, the one or more playback control elements include an option that, in response to detecting an input directed to (e.g., current focus without selection of, selection of) the option, causes the electronic device to present audio controls for the content item. In some embodiments, the one or more playback control elements include an option that, in response to detecting an input directed to (e.g., current focus without selection of, selection of) the option, causes the electronic device to cease displaying the content item in a full screen mode and present the content item in a picture-in-picture element. In some embodiments, in response to detecting selection of one of the aforementioned options, the electronic device presents the content associated with the selected option concurrently with the one or more playback control elements and option(s) overlaid on the content item. In some embodiments, the one or more playback control elements include an option that, in response to detecting an input directed to (e.g., current focus without selection of, selection of) the option, causes the electronic device to toggle inclusion or exclusion of the content item in a content library associated with (e.g., a user account of) the electronic device. In some embodiments, the electronic device further displays content item metadata (e.g., season, title, show name, content item name, sports game score, indication that the content is being live streamed or broadcast) concurrently with the playback control element(s) and option(s). In some embodiments, the electronic device presents the additional content associated with the first and second options in response to detecting the current focus directed to one of the first and second options, but does not perform the operations associated with the subtitles option, audio control option, PIP option, and library option unless and until selection of the subtitles option or audio option is detected. In some embodiments, in response to detecting input directed to the first or second option, the electronic device updates the positions of (e.g., all of) the elements displayed overlaid on the content item to present the additional content at the location in the user interface at which the first or second option was previously displayed without displaying the additional content overlaid on other elements overlaid on the content, but displays additional content (if any) associated with the subtitles option, audio control option, PIP option, and library option overlaid on the elements overlaid on the content without updating the positions of the other elements overlaid on the content. In some embodiments, the electronic device displays the first and/or second option based on the content type of the content item, but displays one or more of the subtitles option, audio control option, PIP option, and library option based on features of the content, rather than the content type itself.

Ad markers have different visual characteristic (e.g., color) depending on whether you have already watched them or if they are upcoming. In some embodiments, the one or more playback control elements include a scrubber bar. In some embodiments, the scrubber bar includes visual indications of playback positions within the content at which advertisements will play. In some embodiments, the visual indications of playback positions within the content at which advertisements will play that are before the current playback position of the electronic device in the content item are displayed with a different visual characteristic (e.g., color, size, translucency, style, etc.) than the visual indications of playback positions within the content at which advertisements will play that are after the current playback position of the electronic device in the content item.

When reaching an ad moment, the ad countdown appears in the bottom right messaging area In some embodiments, in response to detecting that the current playback position of the electronic device in the content item is within a predetermined time threshold (e.g., 5, 10, 15, 30, etc. seconds) of a playback position at which an advertisement will play, the electronic device displays a countdown indication of the time until the advertisement will begin to play. In some embodiments, the countdown indication is displayed at a predetermined location in the user interface (e.g., one of the bottom corners) overlaid on the content item.

In some embodiments, the electronic device displays the countdown indication (e.g., at the respective predetermined location in the user interface) irrespective of whether or not the electronic device is displaying the playback control elements and options overlaid on the content item. In some embodiments, the electronic device presents the countdown indication while displaying the playback control elements an options overlaid on the content item and, in response to an input to cease display of the playback control elements and options overlaid on the content item, ceases display of the playback control elements and options overlaid on the content item and continues to display the countdown indication overlaid on the content item.

In some embodiments, in accordance with a determination that the current playback position of the electronic device in the content item is greater than a threshold time (e.g., 1, 2, 3, 5, 10, 15, 30, etc. minutes) from the end of the content item, the electronic device displays, proximate to a scrubber bar included in the one or more playback control elements, a visual indication of the time remaining between the current playback position of the electronic device in the content item and the end of the content item. In some embodiments, in accordance with a determination that the current playback position of the electronic device in the content item is less than a threshold time (e.g., 1, 2, 3, 5, 10, 15, 30, etc. minutes) from the end of the content item, the electronic device forgoes display of the visual indication of the time remaining between the current playback position of the electronic device in the content item and the end of the content item. In some embodiments, in accordance with a determination that a visual indication of the current playback position of the electronic device in the content item on a scrubber bar included in the one or more playback control elements is greater than a threshold distance (e.g., 50, 100, 200, 500, etc. pixels) from a position of the scrubber bar corresponding to the end of the content item, the electronic device displays, proximate to the scrubber bar, a visual indication of the time remaining between the current playback position of the electronic device in the content item and the end of the content item. In some embodiments, in accordance with a determination that a visual indication of the current playback position of the electronic device in the content item on a scrubber bar included in the one or more playback control elements is less than a threshold distance (e.g., 50, 100, 200, 500, etc. pixels) from the position of the scrubber bar corresponding to the end of the content item, the electronic device forgoes display of the visual indication of the time remaining between the current playback position of the electronic device in the content item and the end of the content item.

In some embodiments, while the electronic device presents the content item without displaying the one or more playback control elements and options overlaid on the content item, the electronic device displays subtitles of the content item overlaid on the content item at a first position (e.g., the bottom). In some embodiments, while the electronic device presents the content item while displaying the one or more playback control elements and options overlaid on the content item, the electronic device displays the one or more playback control elements and options overlaid on the content item at the first position (e.g., the bottom) and displays the subtitles of the content item overlaid on the content item at a second position (e.g., directly above the one or more playback control elements and options).

In some embodiments, such as in FIG. 6X, the respective content type is live content (e.g., live media being live streamed or live broadcast from a source). In some embodiments, the electronic device is not able to skip within the playback positions of live media. In some embodiments, the electronic device is able to skip within a limited range of playback positions of live media. In some embodiments, the electronic device is able to skip to any playback position within live media. In some embodiments, live media is a content item that is currently being broadcast or streamed from its source during a predetermined time defined by the content source (and not before or after the time defined by the source). For example, a news broadcast is broadcast by a content source (e.g., a channel) 10 pm-11 pm, and the electronic device is able to access the news broadcast during that time period, with respective portions of the news broadcast being available at respective times, but not other times.

In some embodiments, such as in FIG. 6X, while presenting the content item (e.g., 602c), the electronic device (e.g., 500) receives, via the one or more input devices, an input (e.g., via contact 603x) corresponding to a request to rewind (or skip ahead within) the content item (e.g., 602c) by a respective amount. In some embodiments, the input is directed to a respective playback control element associated with live content (e.g., a scrubber bar for live content). In some embodiments, the respective amount corresponds to a speed, duration, distance, etc. of a directional component (e.g., swipe, pressing and holding a directional button of an input device) of the input.

In some embodiments, while presenting the content item (e.g., 602c), in response to receiving the input (e.g., contact 603x in FIG. 6X) corresponding to the request to rewind the content, in accordance with a determination that the respective amount is less than (or equal to) a (e.g., predetermined) threshold, the electronic device 500 rewinds (or skipping ahead within) the content (e.g., 602c) by the respective amount, such as in FIG. 6Z. In some embodiments, the predetermined threshold is selected by a provider or creator of the content item and different live content items are associated with different predetermined thresholds.

In some embodiments, while presenting the content item (e.g., 602c), in response to receiving the input (e.g., contact 603y in FIG. 6Y) corresponding to the request to rewind the content (e.g., 602c), in accordance with a determination that the respective amount is greater than the (e.g., predetermined) threshold, the electronic device (e.g., 500) forgoes rewinding the content by the respective amount, such as in FIG. 6Z. In some embodiments, in accordance with a determination that the respective amount is greater than the predetermined threshold, the electronic device rewinds the content by the threshold amount. In some embodiments, in accordance with a determination that the respective amount is greater than the predetermined threshold, the electronic device does not rewind the content and continues playback of the content from the current playback position. In some embodiments, in accordance with a determination that the respective amount is greater than the (e.g., predetermined) threshold, the electronic device presents a visual indication that skipping beyond the predetermined threshold is not allowed. In some embodiments, a scrubbing input includes a horizontal movement component that causes the electronic device to update a position of the scrubber bar in accordance with the horizontal movement and a selection component that causes the electronic device to initiate playback of the content item from the position of the scrubber bar. In some embodiments, the electronic device restricts movement of the indication of the scrubber bar beyond the threshold, even if the movement portion of the input corresponds to movement of the indication of the scrubber bar beyond the threshold.

The above-described manner of rewinding the content item within the predetermined threshold provides an efficient way of complying with content item licensing agreements, which additionally reduces power usage and improves battery life of the electronic device by enabling the user to use the electronic device more quickly and efficiently.

In some embodiments, such as in FIG. 6X, the first content type is live content (e.g., live media being live streamed or live broadcast from a source). In some embodiments, the electronic device is not able to skip within the playback positions of live media. In some embodiments, the electronic device is able to skip within a limited range of playback positions of live media. In some embodiments, the electronic device is able to skip to any playback position within live media.

In some embodiments, such as in FIG. 6X, the one or more first playback control elements include a scrubber bar (e.g., 608d) including a first region (e.g., 610d) (e.g., displayed with a first visual characteristic (e.g., color, size, translucency, style, pattern, etc.)) corresponding to earlier playback positions in the content item (e.g., 602c) to which rewinding is not available, a second region (e.g., 610a) (e.g., displayed with a second visual characteristic (e.g., color, size, translucency, style, pattern, etc.) optionally different from the first visual characteristic) corresponding to earlier playback positions in the content item (e.g., 602c) to which rewinding is available, and a third region (e.g., 6100 (e.g., displayed with a third visual characteristic (e.g., color, size, translucency, style, pattern, etc.) optionally different from the first and second visual characteristics) corresponding to future playback positions (e.g., of a buffered portion) of the content item. In some embodiments, the scrubber bar further includes a fourth region (e.g., displayed with a fourth visual characteristic (e.g., color, size, translucency, style, pattern, etc.) optionally different from the first, second, and third visual characteristics) corresponding to future playback positions of a portion of the content item that is not yet buffered. In some embodiments, if there are no restrictions on how far back the electronic device is able to rewind the content item, the scrubber bar includes only one region prior to the current playback position of the electronic device in the content item (e.g., the entire scrubber bar corresponding to playback positions before the current playback position of the electronic device in the content item has one visual characteristic). In some embodiments, the electronic device is able to update an indication of the scrubber bar to a location within the second region or third region, but not the first or fourth regions.

The above-described manner of including different regions of the scrubber bar corresponding to portions of the content item to which skipping back is allowed, to which skipping is not allowed, and after the current playback position provides an efficient way of indicating how far back the electronic device is able to skip within the content item which additionally reduces power usage and improves battery life of the electronic device by enabling the user to use the electronic device more quickly and efficiently.

In some embodiments, such as in FIG. 6DD, in response to the input, the electronic device displays, in accordance with a determination that the respective content type is live content (e.g., live media being live streamed or live broadcast from a source), in accordance with a determination that skipping a playback position within the content item is not available, a scrubber bar (e.g., 608*f*) (e.g., included in the one or more playback control elements) including a first region (e.g., 610*e*) corresponding to playback positions of the content item before a current playback position of the content item (e.g., 602*e*), and a second region (e.g., 610*h*) corresponding to playback positions of the content item (e.g., 602*e*) after the current playback position of the content item, wherein the first region (e.g., 610*e*) of the scrubber bar and the second region (e.g., 610*h*) of the scrubber bar (e.g., 608*f*) are displayed with a same visual style (e.g., same color, size, translucency, overall appearance). In some embodiments, the electronic device is not able to skip within the playback positions of live media. In some embodiments, the electronic device is able to skip within a limited range of playback positions of live media. In some embodiments, the electronic device is able to skip to any playback position within live media. In some embodiments, the scrubber bar includes a visual indication of a current playback position of the electronic device within the content item. In some embodiments, the scrubber bar includes a visual indication of the time remaining between the current playback position of the electronic device within the content item and the end of the content item. In some embodiments, the electronic device is not able to update the scrubbing position indicated by the scrubber bar based on a scrubbing input (e.g., the scrubbing position of the scrubber bar indicates the current playback position of the content item, which is based on the portion of the content item currently being provided by the content source).

The above-described manner of displaying the first and second regions of the scrubber bar with the same visual characteristic when skipping is not available provides an efficient way of indicating to the user that inputs directed to the scrubber bar will not cause the electronic device to skip the playback position within the content item, which additionally reduces power usage and improves battery life of the electronic device by enabling the user to use the electronic device more quickly and efficiently.

In some embodiments, such as in FIG. 6I, while displaying a respective playback control element (e.g., 608*b*) (e.g., a scrubber bar included in the one or more playback control elements) corresponding to the respective content item (e.g., 602*a*), in accordance with a determination that a friend of a user of the electronic device (e.g., 500) has consumed (at least) a portion of the content item (e.g., 602*a*), the respective playback control element (e.g., 608*b*) includes a first visual indication (e.g., 622*a*) of a current playback position of the content item (e.g., 602*a*) associated with (e.g., at the end of) the portion of the content item (e.g., 602*a*) consumed by the friend, including a graphical representation of the friend. In some embodiments, the graphical representation of the friend is an image or avatar associated with a user account of the friend or a contact card entry of (e.g., a user account associated with) the electronic device associated with the friend. In some embodiments, "friends" are uses with whom content consumption history is shared. In some embodiments, the graphical representation of the friend is displayed at a position of the scrubber bar corresponding to the playback position within the content item that the friend most recently played (e.g., a playback position where the friend paused or stopped the content, or a playback position the friend is currently playing). In some embodiments, the electronic device presents the first visual indication irrespective of whether the friend has finished the content item or has played only a subset of the content item. In some embodiments, the electronic device only presents the first visual indication if the friend has watched a subset of the content item, and forgoes presenting the first visual indication if the friend has watched the entire content item.

The above-described manner of presenting the visual indication of the current playback position of the content item associated with the portion of the content item consumed by the friend provides an efficient way of sharing the friend's content consumption history with the user of the electronic device, which additionally reduces power usage and improves battery life of the electronic device by enabling the user to use the electronic device more quickly and efficiently.

In some embodiments, such as in FIG. 6I, while displaying the respective playback control element (e.g., 608*b*) (e.g., scrubber bar) including the first visual indication (e.g., 622*a*) of the current playback position of the content item (e.g., 602*a*) associated with the friend, including the graphical representation of the friend, the electronic device (e.g., 500) receives, via the one or more input devices (e.g., 510*b*), a sequence of one or more inputs (e.g., via contact 603*i*) directed to the respective playback control element (e.g., 608*b*), including an input directed to the first visual indication (e.g., 622*a*) of the current playback position of the content item associated with the portion of the content item consumed by the friend. In some embodiments, the input corresponds to a request to update the playback position of the scrubber bar to the playback position associated with the friend. In some embodiments, the sequence of one or more inputs includes an input corresponding to a request to pause the content item that is detected prior to the input corresponding to the request to update the playback position of the scrubber bar to the playback position associated with the friend. In some embodiments, the sequence of one or more inputs further includes an input corresponding to a request to further update the playback position of the scrubber bar that is detected after the input corresponding to the request to update the playback position of the scrubber bar to the playback position associated with the friend.

In some embodiments, such as in FIG. 6K, in response to receiving the sequence of one or more inputs (e.g., including contact 603*j* in FIG. 6J), the electronic device (e.g., 500) ceases display of the first visual indication (e.g., 622*a* in FIG. 6J) of the current playback position of the content item (e.g., 602*a*) associated with the portion of the content item (e.g., 602*a*) consumed by the friend, including the graphical representation of the friend. In some embodiments, while the playback position of the scrubber bar is the same as the playback position of the content item associated with the portion of the content item consumed by the friend, the electronic device displays the first visual indication of the current playback position of the content item associated with the portion of the content item consumed by the friend. In some embodiments, in response to detecting an input corresponding to a request to further update the playback position of the scrubber bar to a playback position other than the playback position of the content item associated with the portion of the content item consumed by the friend, the electronic device ceases display of the first visual indication of the playback position of the content item associated with the portion of the content item consumed by the friend.

In some embodiments, such as in FIG. 6K, in response to receiving the sequence of one or more inputs, the electronic device (e.g., 500) displays, in association with the respective playback control element (e.g., 608*b*), a second visual indication (e.g., 622*b*) of the current playback position of the content item (e.g., 602*a*) associated with the portion of the content item (e.g., 602*a*) consumed by the friend without including the graphical representation of the friend. In some embodiments, the second visual indication of the playback position of the content item associated with the portion of the content item consumed by the friend is an indication of a position on the scrubber bar that does not include the graphic representation of the friend. In some embodiments, in response to detecting an input corresponding to a request to update the playback position indicated by the scrubber bar to the playback position of the content item associated with the portion of the content item consumed by the friend, the electronic device displays the first visual indication of the playback position of the content item associated with the portion of the content item consumed by the friend. The above-described manner of displaying the second visual indication of the current playback position of the content item associated with the portion of the content item consumed by the friend without including the graphical representation of the friend in response to the sequence of one or more inputs provides an efficient way of reducing the portion of the content obscured by the graphical representation of the friend while still indicating the current playback position of the content item associated with the portion of the content item consumed by the friend, which additionally reduces power usage and improves battery life of the electronic device by enabling the user to use the electronic device more quickly and efficiently.

In some embodiments, such as in FIG. 6I, while displaying the respective playback control element (e.g., 608*b*) including the first visual indication (e.g., 622) of the current playback position of the content item (e.g., 602*a*) associated with the portion of the content item (e.g., 602*a*) consumed by the friend (or the second visual indication of the current playback position of the content item associated with the portion of the content item consumed by the friend), the electronic device (e.g., 500) receives, via the one or more input devices (e.g., 510*b*), an input (e.g., via contact 603*i*) directed to the first visual indication (e.g., 622*a*) of the current playback position of the content item (e.g., 602*a*) associated with the portion of the content item (e.g., 602*a*) consumed by the friend (or the second visual indication of the current playback position of the content item associated with the portion of the content item consumed by the friend). In some embodiments, the input corresponds to a request to update the playback position of the scrubber bar to the playback position associated with the friend.

In some embodiments, in response to receiving the input (e.g., via contact 603*i*) directed to the first visual indication, such as in FIG. 6I, the electronic device (e.g., 500) displays, in association with the respective playback control element (e.g., 608*b*), a visual indication (e.g., 622*b*) of a name of the friend (e.g., proximate to the first visual indication of the current playback position of the content item associated with the portion of the content item consumed by the friend). In some embodiments, if the input is received while displaying the second visual indication and the input is directed to the second visual indication, in response to receiving the input, the electronic device displays the first visual indication and the visual indication of the name of the friend.

The above-described manner of displaying the visual indication of the name of the friend in association with the respective playback control element provides an efficient way of providing more information about the friend, which additionally reduces power usage and improves battery life of the electronic device by enabling the user to use the electronic device more quickly and efficiently.

In some embodiments, such as in FIG. 6N, while presenting the content item (e.g., 602*a*) without displaying one or more respective control elements (e.g., a scrubber bar) corresponding to the respective content type (e.g., without displaying the one or more first playback control elements or the one or more second playback control elements and without displaying the first option or second option), the electronic device (e.g., 500) receives, via the one or more input devices, an input (e.g., 603*n*) corresponding to a request to update a current playback position in the content item (e.g., 602*a*) by a predetermined amount (e.g., 5, 10, 15, 20, 30, etc. seconds, such as a click input detected in a right (forward skip) or left (backward skip) portion of an input region (e.g., touch-sensitive surface 451) of a remote control device). In some embodiments, the request is to skip ahead or skip back within the content item.

In some embodiments, such as in FIG. 6N, while presenting the content item (e.g., 602*a*) without displaying one or more respective control elements (e.g., a scrubber bar) corresponding to the respective content type (e.g., without displaying the one or more first playback control elements or the one or more second playback control elements and without displaying the first option or second option), in response to receiving the input (e.g., 603*n*) corresponding to the request to update the current playback position in the content item (e.g., 602*a*) by the predetermined amount, such as in FIG. 6N, the electronic device (e.g., 500) updates the current playback position in the content item (e.g., 602*a*) by the predetermined amount, such as in FIG. 6O. In some embodiments, updating the current playback position in the content item by the predetermined amount includes continuing playback of the content item from the updated playback position.

In some embodiments, such as in FIG. 6N, while presenting the content item (e.g., 602*a*) without displaying one or more respective control elements (e.g., a scrubber bar) corresponding to the respective content type (e.g., without displaying the one or more first playback control elements or the one or more second playback control elements and without displaying the first option or second option), in response to receiving the input (e.g., 603*n*) corresponding to the request to update the current playback position in the content item (e.g., 602*a*) by the predetermined amount, such as in FIG. 6N, the electronic device (e.g., 500) displays a respective control element (e.g., 608*a*) (e.g., the scrubber bar) corresponding to the respective content type without displaying a respective option corresponding to respective content corresponding to the respective content type. In some embodiments, in response to receiving the input corresponding to the request to update the current playback position in the content item by the predetermined amount, the electronic device displays the scrubber bar without displaying one or more other playback control elements or other indications or options displayed while displaying the one or more playback control elements and the first or second option. For example, the electronic device forgoes display of the chapters option even if the content item is a movie and forges display of the episodes option even if the content item is an episode of a series of episodic content. As another example, the electronic device forgoes display of the information option, subtitles option, audio option, library option, PIP option, and/or metadata associated with the content item. In some embodiments, the electronic device (e.g., automatically, without receiving a further input) ceases display of the scrubber bar after a predetermined time threshold (e.g., 5, 10, 15, 20, 30, etc. seconds) has passed since initiating display of the scrubber bar without detecting further inputs. In some embodiments, in addition to displaying the scrubber bar, the electronic device displays a visual indication associated with the input.

The above-described manner of presenting the respective control element without the respective option in response to the input corresponding to the request to update the current playback position in the content item by the predetermined amount provides an efficient way of reducing the portion of the content item obscured by playback control elements and options while providing visual feedback of the input, which additionally reduces power usage and improves battery life of the electronic device by enabling the user to use the electronic device more quickly and efficiently.

In some embodiments, such as in FIG. 6J, while displaying one or more playback control elements (e.g., 608b) corresponding to the respective content type (e.g., the one or more first playback control elements or the one or more second playback control elements), the electronic device (e.g., 500) receives, via the one or more input devices (e.g., 510b), an input (e.g., 603j) directed to a first playback control element (e.g., 608b) (e.g., a scrubber bar) corresponding to the respective content type. In some embodiments, the input corresponds to a request to update a playback position indicated by the scrubber bar.

In some embodiments, while displaying one or more playback control elements (e.g., 608b) corresponding to the respective content type (e.g., the one or more first playback control elements or the one or more second playback control elements), in response to receiving the input (e.g., 603j) directed to the first playback control element (e.g., 608b) corresponding to the respective content type, such as in FIG. 6J, the electronic device (e.g., 500) displays, proximate to the first playback control element (e.g., 608b), a thumbnail (e.g., 624b) corresponding to a respective portion of the content item (e.g., 602a) in accordance with the input. In some embodiments, the thumbnail includes a still image of the content item at the playback position indicated by the scrubber bar in accordance with the input.

In some embodiments, while displaying one or more playback control elements (e.g., 608b) corresponding to the respective content type (e.g., the one or more first playback control elements or the one or more second playback control elements), in response to receiving the input (e.g., 603j) directed to the first playback control element (e.g., 608b) corresponding to the respective content type, such as in FIG. 6J, after a predetermined time (e.g., 626b) (e.g., 5, 10, 15, 20, 30, etc. seconds) has passed since initiating display of the thumbnail (e.g., 624c) (e.g., with no further inputs detected), in accordance with a determination that the thumbnail (e.g., 624c) is displayed overlaid on a second playback control element (e.g., 606a) of the one or more playback control elements corresponding to the respective content type, such as in FIG. 6K, the electronic device (e.g., 500) ceases display of the thumbnail, such as in FIG. 6L. In some embodiments, the second playback control element is displayed proximate to the scrubber bar in the user interface, such as above the scrubber bar. In some embodiments, display of the thumbnail times out after the predetermined time threshold if the thumbnail is (at least partially) overlaid on a playback control element.

In some embodiments, while displaying one or more playback control elements (e.g., 608b) corresponding to the respective content type (e.g., the one or more first playback control elements or the one or more second playback control elements), in response to receiving the input (e.g., 603j) directed to the first playback control element (e.g., 608b) corresponding to the respective content type, such as in FIG. 6J, after a predetermined time (e.g., 626b) (e.g., 5, 10, 15, 20, 30, etc. seconds) has passed since initiating display of the thumbnail (e.g., 624d) (e.g., with no further inputs detected), in accordance with a determination that the thumbnail (e.g., 624d) is not displayed overlaid on the second playback control element (e.g., 606a) (e.g., or any other control element), the electronic device (e.g., 500) maintains display of the thumbnail (e.g., 624d), such as in FIG. 6M. In some embodiments, display of the thumbnail does not time out after the predetermined time threshold if the thumbnail is not overlaid on a playback control element. The above-described manner of ceasing display of the thumbnail after the predetermined time if the thumbnail is displayed (at least partially) overlaid on another playback control element provides an efficient way of presenting the playback control element in the user interface, which additionally reduces power usage and improves battery life of the electronic device by enabling the user to use the electronic device more quickly and efficiently.

In some embodiments, in response to receiving the input (e.g., 603a in FIG. 6A), the electronic device (e.g., 500) displays one or more respective playback control elements (e.g., 608a) corresponding to the respective content type (e.g., the one or more first playback control elements or the one or more second playback control elements), such as in FIG. 6B. In some embodiments, the electronic device displays the one or more respective playback control elements overlaid on the content item.

In some embodiments, such as in FIG. 6B, the one or more respective playback control elements include a scrubber bar (e.g., 608a). In some embodiments, such as in FIG. 6B, a current focus (e.g., 613b) of the electronic device (e.g., 500) is initially directed to the scrubber bar (e.g., 608a) in response to receiving the input. In some embodiments, the electronic device concurrently displays one or more interactive control elements or options above the scrubber bar and one or more interactive control elements or options below the scrubber bar. For example, the electronic device displays the first or second option below the scrubber bar and, in response to a downward input, moves the current focus from the scrubber bar to the first or second option. As another example, the electronic device displays an audio option, subtitles option, PIP option, and/or library option above the scrubber bar and, in response to an upward input, moves the current focus from the scrubber bar to one of the audio option, subtitles option, PIP option, or library option.

The above-described manner of initially directing the current focus of the electronic device to the scrubber bar provides an efficient way of providing inputs directed to the scrubber bar, which additionally reduces power usage and improves battery life of the electronic device by enabling the user to use the electronic device more quickly and efficiently.

In some embodiments, in response to receiving the input (e.g., 603a in FIG. 6A), the electronic device (e.g., 500) displays one or more options (e.g., 614a-614c) corresponding to respective content corresponding to the respective content type (e.g., including the first option or second option and optionally one or more additional options), such as in FIG. 6A. In some embodiments, such as in FIG. 6P, in accordance with a determination that the one or more options is one option (e.g., 614d) (e.g., the first option or second option), the option (e.g., 614d) is displayed with a first visual characteristic (e.g., and is not selectable and/or cannot have current focus directed to it). In some embodiments, displaying the option with the first visual characteristic includes displaying the option aligned with the center of the content with an arrow indicating that a downward input (e.g., swipe, selection of a down arrow key, etc.) will perform a respective function associated with the option. For example, if the option is the first option, the electronic device displays representations of first content in response to detecting the downward input. As another example, if the option is the second option, the electronic device displays representations of second content in response to detecting the downward input.

In some embodiments, such as in FIG. 6B, in accordance with the determination that the one or more options are a plurality of options (e.g., 614*a*-614*c*) (e.g., including the first and/or second options), the plurality of options (e.g., 614*a*-614*c*) are displayed with a second visual characteristic different from the first visual characteristic (e.g., and are selectable and/or can have current focus directed to them). In some embodiments, displaying the options with the second visual characteristic includes displaying the option aligned with the a (e.g., left or right) side of the content without the arrow indicating that a downward input (e.g., swipe, selection of a down arrow key, etc.) will perform a respective function associated with the option. In some embodiments, if the electronic device displays a plurality of options, the electronic device performs the action with respect to the options in response to detecting an input directed to (e.g., current focus without selection of, selection of) the options. In some embodiments, the number of options displayed depends on the type(s) of additional content associated with the content item that are available. If one option is displayed below the scrubber bar, a downward input detected while the current focus is on the scrubber bar will move the current focus to the additional content associated with the option in some embodiments. In some embodiments, if multiple options are displayed below the scrubber bar, a downward input detected while the current focus is on the scrubber bar will cause the current focus to move to the option and a subsequent downward input will cause the current focus to move to the content associated with the option.

The above-described manner of displaying the one or more options with different visual characteristics depending on whether there is one option or a plurality of options provides an efficient way of performing actions with respect to the options and an efficient way of ensuring the option is easily visible to the user if only one option is displayed, which additionally reduces power usage and improves battery life of the electronic device by enabling the user to use the electronic device more quickly and efficiently.

In some embodiments, such as in FIG. 6DD, while displaying one or more respective playback control elements (e.g., 608*f*) corresponding to the respective content type (e.g., the one or more first playback control elements or the one or more second playback control elements), the electronic device (e.g., 500) receives, via the one or more input devices (e.g., 510*a*), an input (e.g., 603*dd*) corresponding to a request to perform an action with respect to the content item (e.g., 602*e*), such as in FIG. 6DD. In some embodiments, the action with respect to the content item is skipping the current playback position of the electronic device within the content item ahead or backwards by a respective amount or by any amount.

In some embodiments, such as in FIG. 6DD, while displaying one or more respective playback control elements (e.g., 6080 corresponding to the respective content type (e.g., the one or more first playback control elements or the one or more second playback control elements), in response to receiving the input (e.g., 603*dd*) corresponding to the request to perform the action with respect to the content item, such as in FIG. 6DD, in accordance with a determination that the action is not available, the electronic device (e.g., 500) forgoes performing the action, such as in FIG. 6EE. In some embodiments, skipping the playback position of the content item is not available for (e.g., any, some) live media. In some embodiments, in response to an input corresponding to a request to skip the current playback position of the electronic device within the content item, if skipping the playback position within the content item is not available, the electronic device forgoes skipping the current playback position of the content item.

In some embodiments, such as in FIG. 6DD, while displaying one or more respective playback control elements (e.g., 6080 corresponding to the respective content type (e.g., the one or more first playback control elements or the one or more second playback control elements), in response to receiving the input (e.g., 603*dd*) corresponding to the request to perform the action with respect to the content item, such as in FIG. 6DD, the electronic device (e.g., 500) concurrently displays, with the one or more respective playback control elements (e.g., 6080 corresponding to the respective content type (e.g., and the first or second option), a message (e.g., 630*b*) that the action is not available. In some embodiments, the message is displayed at a respective predetermined position in the user interface. In some embodiments, in accordance with a determination that the action is available, in response to the input, the electronic device performs the action without displaying the message that the action is not available. In some embodiments, if the action is available, in response to the input, the electronic device performs the action and presents a visual indication (e.g., a message, an image) confirming performance of the action. In some embodiments, the visual indication confirming performance of the action is displayed at the respective predetermined position in the user interface at which the message that the action is not available would be displayed (or is displayed for a different action and/or different content item).

The above-described manner of presenting the message that the action is not available provides an efficient way of confirming the input was received without performing the action, which additionally reduces power usage and improves battery life of the electronic device by enabling the user to use the electronic device more quickly and efficiently.

In some embodiments, in response to receiving the input (e.g., 603*a* in FIG. 6A), the electronic device (e.g., 500) displays one or more respective options (e.g., 614*a-c*) corresponding to respective content corresponding to the respective content type, such as in FIG. 6B (e.g., and concurrently displaying one or more respective playback control elements corresponding to the respective content type (e.g., the one or more first playback control elements or the one or more second playback control elements) overlaid on the content item).

In some embodiments, such as in FIG. 6B, in accordance with a determination that a source (e.g., creator, publisher, distributor, streaming service, network, channel, etc.) of the content item (e.g., 602*a*) is a first source, the one or more respective options are one or more first respective options (e.g., 614*a*-614*c*). In some embodiments, the source of the content item is able to set the one or more options concurrently displayed with the one or more playback control elements overlaid on the content item in response to the input. In some embodiments, the one or more options displayed vary from content item to content item provided by the source. For example, a respective content source may provide one or more first options for content items of a first type and one or more second options for content items of a second type. Examples of types of content items include series of episodic content, movies, fiction, non-fiction, sports, news, etc.

In some embodiments, such as in FIG. 6Q, in accordance with a determination that the source of the content item (e.g., 602c) is a second source, the one or more respective options are one or more second respective options (e.g., 614a, 614d, 614c, and 614f). In some embodiments, different content sources provide different options to be displayed concurrently with one or more playback control elements overlaid on the content item in response to detecting the input. In some embodiments, content items of the same types form different sources will have different associated options. For example, a movie from a first source is associated with a first plurality of options and a movie from a second source is associated with a second plurality of options.

The above-described manner of displaying respective options depending on the source of the content provides an efficient way of presenting options relevant to the content being presented, which additionally reduces power usage and improves battery life of the electronic device by enabling the user to use the electronic device more quickly and efficiently.

In some embodiments, such as in FIG. 6B, in accordance with the determination that the respective content type is the first content type (e.g., an episode of a series of episodic content), the one or more respective options include an information option (e.g., 614a) associated with (e.g., that, in response to detecting an input directed to (e.g., current focus without selection of, selection of) the option, causes the electronic device to display) information about the content item (e.g., 602a), an episodes option (e.g., 614b) associated with (e.g., that, in response to detecting an input directed to (e.g., current focus without selection of, selection of) the option, causes the electronic device to display representations of) episodes of a same episodic content series associated with the content item (e.g., 602a), and a playback queue option (e.g., 614c) associated with (e.g., that, in response to detecting an input directed to (e.g., current focus without selection of, selection of) the option, causes the electronic device to display representations of) a plurality of third content items in a playback queue of the user of the electronic device (e.g., 500). In some embodiments, in response to detecting an input directed to (e.g., current focus without selection of, selection of) a respective one of the options, the electronic device presents the content associated with the option at a respective location in the user interface. In some embodiments, the electronic device presents the content associated with each option at the same location in the user interface overlaid on the content item.

The above-described manner of presenting an information option, an episodes option, and a playback queue option if the content type is the first content type provides an efficient way of presenting options relevant to the content item, which additionally reduces power usage and improves battery life of the electronic device by enabling the user to use the electronic device more quickly and efficiently.

In some embodiments, such as in FIG. 6AA, in accordance with the determination that the respective content type is the second content type (e.g., a movie), the one or more respective options include an information option (e.g., 614a) associated with (e.g., that, in response to detecting an input directed to (e.g., current focus without selection of, selection of) the option, causes the electronic device to display) information about the content item, a chapters option (e.g., 614e) associated with (e.g., that, in response to detecting an input directed to (e.g., current focus without selection of, selection of) the option, causes the electronic device to display representations of) chapters of the content item, and an up next queue option (e.g., 614c) associated with (e.g., that, in response to detecting an input directed to (e.g., current focus without selection of, selection of) the option, causes the electronic device to display representations of) a plurality of third content items in a playback queue. In some embodiments, in response to detecting an input directed to (e.g., current focus without selection of, selection of) a respective one of the options, the electronic device presents the content associated with the option at a respective location in the user interface. In some embodiments, the electronic device presents the content associated with each option at the same location in the user interface overlaid on the content item.

The above-described manner of presenting an information option, a chapters option, and a playback queue option if the content type is the second content type provides an efficient way of presenting options relevant to the content item, which additionally reduces power usage and improves battery life of the electronic device by enabling the user to use the electronic device more quickly and efficiently.

In some embodiments, such as in FIG. 6B, the one or more respective options (e.g., 614a-614c) associated with the respective content (e.g., 602a) are displayed in a first region of a user interface including the content item (e.g., 602a). In some embodiments, the first region of the user interface including the content item is a region overlaid on the content item below a respective playback control element (e.g., a scrubber bar). In some embodiments, the electronic device displays all of the options that, in response to detecting an input directed to (e.g., current focus without selection of, selection of) a respective option, the electronic device presents respective content associated with the respective option, in the first region of the user interface.

In some embodiments, such as in FIG. 6B, one or more respective options (e.g., 606a-606c) not associated with respective content are not displayed in the first region of the user interface. In some embodiments, the one or more respective options not associated with respective content are displayed in a second region of the user interface. In some embodiments, the user interface does not include one or more respective options not associated with respective content. In some embodiments, the electronic device does not display options not associated with content in the first region of the user interface. For example, the electronic device presents options that, in response to detecting an input directed to (e.g., current focus without selection of, selection of) a respective option, cause the electronic device to display settings and/or playback control elements of the content item in a second region of the user interface, different from the first region. In some embodiments, the second region of the user interface is above a respective playback control element (e.g., a scrubber bar).

The above-described manner of presenting options associated with content in the first region of the user interface provides an efficient way of presenting the options associated with content proximate to a respective region of the user interface in which content will be displayed in response to detecting inputs directed to the options, which additionally reduces power usage and improves battery life of the electronic device by enabling the user to use the electronic device more quickly and efficiently.

It should be understood that the particular order in which the operations in FIG. 7 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 900) are also applicable in an analogous manner to method 700 described above with respect to FIG. 7. For example, the ways of presenting a user interface for controlling the playback of content items described above with reference to method 700 optionally have one or more of the characteristics of the ways of presenting user interfaces for browsing and switching between content items available for playback described herein with reference to other methods described herein (e.g., method 900). For brevity, these details are not repeated here.

The operations in the information processing methods described above are, optionally, implemented by running one or more functional modules in an information processing apparatus such as general purpose processors (e.g., as described with respect to FIGS. 1A-1B, 3, 5A-5C) or application specific chips. Further, the operations described above with reference to FIG. 7 are, optionally, implemented by components depicted in FIGS. 1A-1B. For example, receiving operation 702 and displaying operation 704 are, optionally, implemented by event sorter 170, event recognizer 180, and event handler 190. Event monitor 171 in event sorter 170 detects a contact on touch screen 504, and event dispatcher module 174 delivers the event information to application 136-1. A respective event recognizer 180 of application 136-1 compares the event information to respective event definitions 186, and determines whether a first contact at a first location on the touch screen corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

User Interfaces for Browsing and Switching Between Content Items

Users interact with electronic devices in many different manners, including using electronic devices to play content items. The embodiments described below provide ways in which an electronic device presents a user interface for browsing and selecting content items available for playback on the electronic device. Providing efficient manners of browsing and switching between content items enhances interactions with a device, thus reducing the amount of time a user needs to find a content item to be played, which increases battery life for battery-powered devices. It is understood that people use devices. When a person uses a device, that person is optionally referred to as a user of the device.

FIGS. 8A-8L illustrate exemplary ways in which an electronic device presents a user interface for browsing and switching between content items available for playback in accordance with some embodiments. The embodiments in these figures are used to illustrate the processes described below, including the processes described with reference to FIG. 9. Although FIGS. 8A-8L illustrate various examples of ways an electronic device is able to perform the processes described below with reference to FIG. 9, it should be understood that these examples are not meant to be limiting, and the electronic device is able to perform one or more processes described below with reference to FIG. 9 in ways not expressly described with reference to FIGS. 8A-8L.

FIGS. 8A-8L illustrate various examples of user interfaces for browsing and switching between content items available for playback on the electronic device. For example, the electronic device displays representations of content items, optionally while playing a respective content item.

Figure 8B:
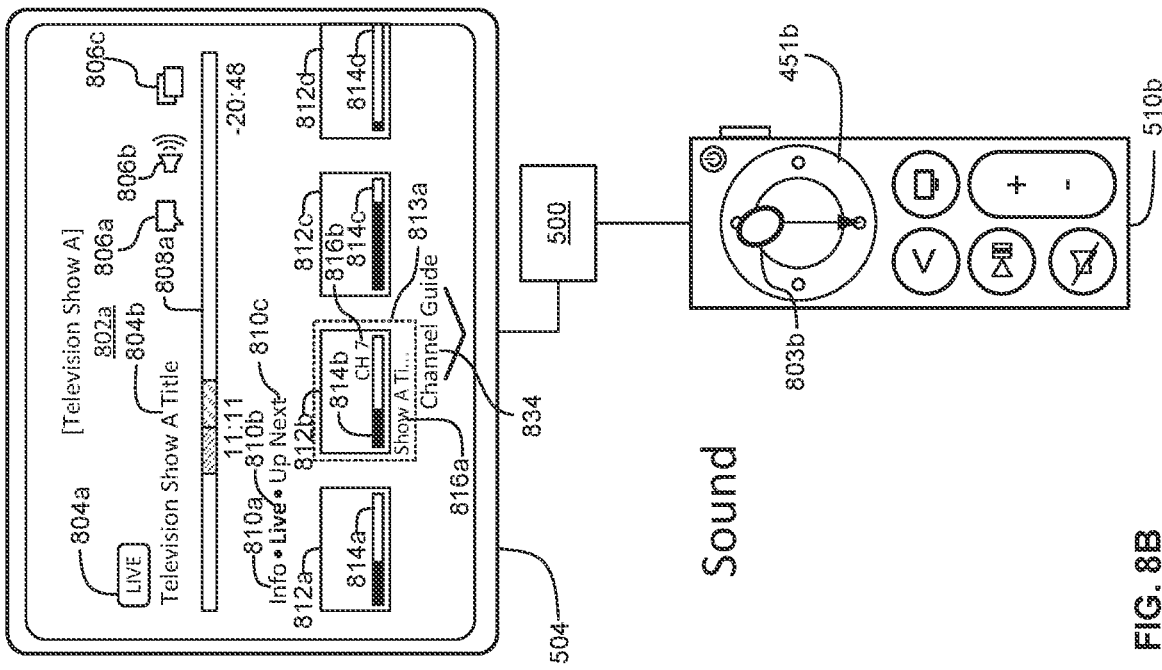
FIGS. 8A-8L illustrate exemplary ways in which an electronic device presents a user interface for browsing and switching between content items available for playback in accordance with some embodiments.
Figure 8A:
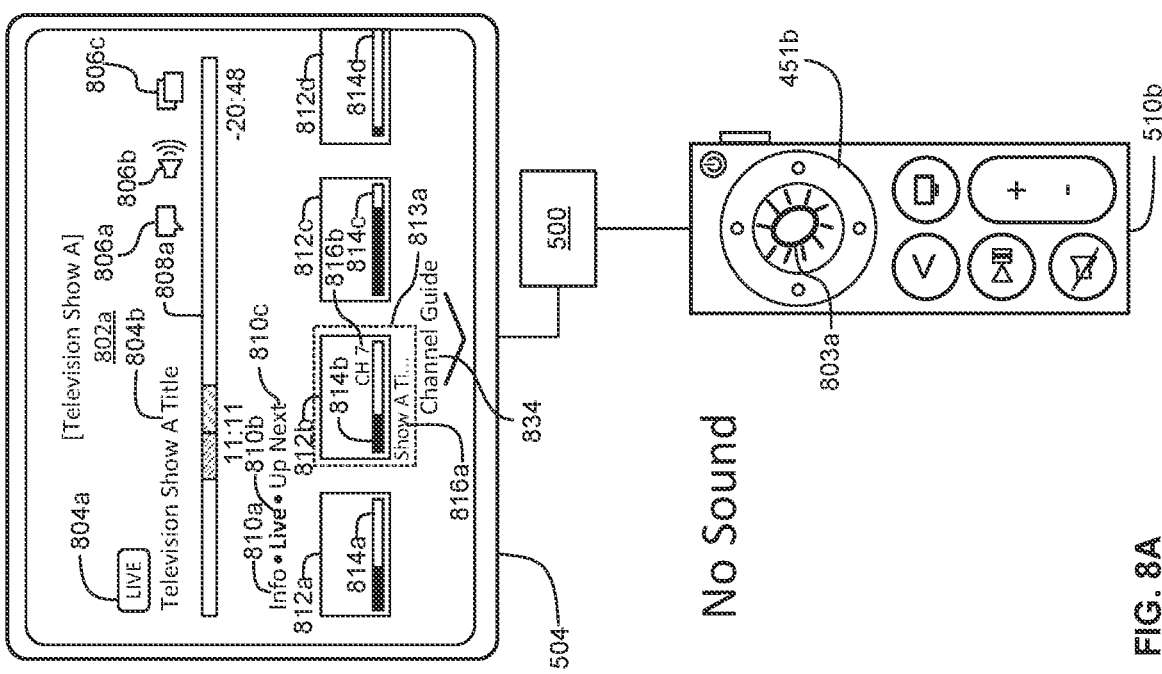

FIG. 8A illustrates the electronic device 500 presenting playback control elements overlaid on a television show 802a playing on the electronic device 500. In some embodiments, the way in which the electronic device 500 presents the playback control elements overlaid on TV show 802a includes one or more steps of method 700. In some embodiments, the user interface illustrated in FIG. 8A is presented by the electronic device 500 when the electronic device 500 is initially powered on, initially enters a content playback mode, and/or initially navigates to a live content tab 810b and does not include playback of the sound of TV show 802a. In some embodiments, the user interface includes an indication 804a that the TV show 802a is live (e.g., streamed or broadcast), an indication 804b of the title of the TV show 802a, an option 806a to view subtitle options for playback of the TV show 802a, an option 806b to view audio options for playback of the TV show 802a, an option 806c to present the TV show 802a in a picture-in-picture element, a scrubber bar 808a, an information tab 810a, a live tab 810b, an up next tab 810c, and an indication 834 of how to access a channel guide user interface (e.g., by swiping down while the current focus 813a is on the contents of one of tabs 810a-c is displayed).

In some embodiments, the electronic device 500 presents the contents of the live tab 810b in the user interface, including representations 812a-d of items of content currently streaming or being broadcast live that are available for playback on the electronic device 500. In some embodiments, representations 812a-d include playback progress bars 814a-d that indicate the portions of the content items that have already been live streamed or live broadcast, independent from whether the (e.g., user account associated with the) electronic device has played any portion(s) of any of the content items. As shown in FIG. 8A, the current focus 813a is on a representation 812b corresponding to TV show 802a that is currently playing, for example. In some embodiments, while the current focus 813a is on representation 812b, the electronic device 500 presents an indication 816b of the channel that is streaming or broadcasting the content item overlaid on representation 812b and an indication 816a of the title of the content item proximate to (e.g., below) the representation 812b. In some embodiments, if the electronic device 500 were to detect a horizontal swipe with input device 510b, the electronic device 500 would update the current focus to a different representation 812a, 812c, or 812d in accordance with the swipe, display metadata associated with the representation 812a, 812c, or 812d, and cease display of metadata 816a and 816b. In some embodiments, the representations 812*a-d* are horizontally scrollable and the electronic device 500 optionally reveals additional representations not illustrated in FIG. 8A in response to the scrolling. In some embodiments, the electronic device 500 facilitates interactions with the indications and control elements overlaid on the television show 802*a* according to one or more steps of method 700 described above.

As shown in FIG. 8A, the electronic device 500 detects, via input device 510*a* selection (e.g., via contact 803*a*) of the representation 812*b*. In some embodiments, as shown in FIG. 8B, in response to the input illustrated in FIG. 8A, the electronic device 500 initiates playback of the sound associated with TV show 802*a*. In some embodiments, if the electronic device 500 detected selection of a different representation 812*a*, 812*c*, or 812*d*, the electronic device 500 would initiate playback of the content item associated with the selected representation 812*a*, 812*c*, or 812*d* (e.g., with sound).

As shown in FIG. 8B, in some embodiments, the electronic device 500 detects, via input device 510*b*, a downward swipe of contact 803*b* while the current focus 813*b* is on the representation 812*b* of the TV show 802*a*. In some embodiments, in response to the input illustrated in FIG. 8B, the electronic device 500 presents a channel guide user interface illustrated in FIG. 8C.

Figure 8D:
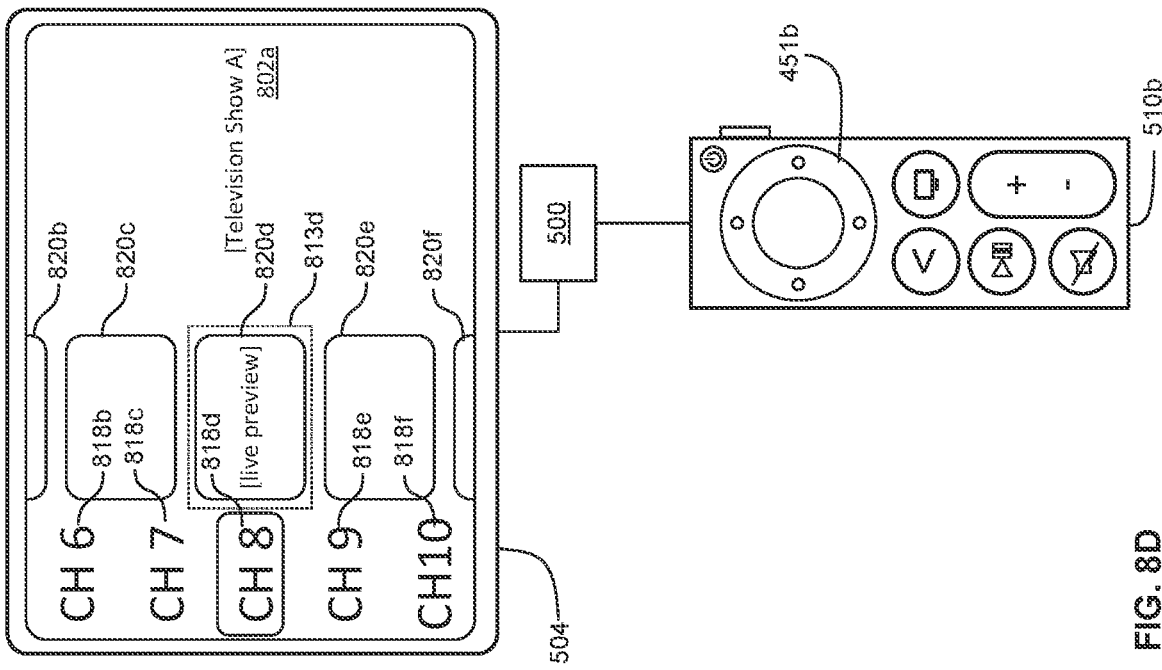
Figure 8C:
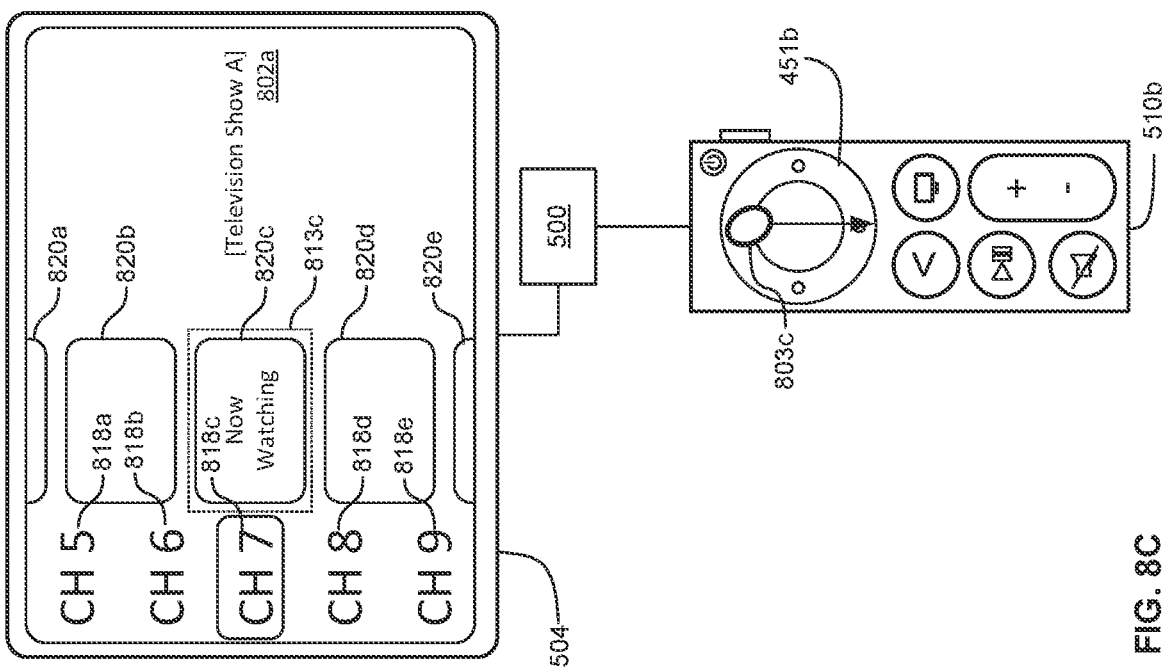

FIG. 8C illustrates an exemplary channel guide user interface presented in response to the input illustrated in FIG. 8B. In some embodiments, the channel guide user interface includes indications 818*a-e* of various channels (or more generally, sources of live content) accessible to the electronic device and representations 820*a-e* of content items currently live streaming or live broadcasting on the channels. In some embodiments, the user interface illustrated in FIG. 8C does not include representations of content items that are not currently streaming or broadcasting (e.g., content items that will stream or broadcast in the future). In some embodiments, the indications 818*a-e* and representations are displayed overlaid on the TV show 802*a* that the electronic device 500 was presenting in FIG. 8B, which continues playing in the background (e.g., with or without audio). Although FIG. 8C illustrates the indications 818*a-e* of the channels as numerical indications, in some embodiments, the electronic device presents images and/or names of channels in place of the numbers of the channels. In some embodiments, the channel guide user interface is initially scrolled to a channel on which the TV show 802*a* is playing (e.g., channel 7). In some embodiments, the representation 820*c* of TV show 802*a* is a user interface element that indicates that the electronic device 500 is currently playing the content associated with representation 820*c*. In some embodiments, the representations 820*a-b* and 820*d-e* of content items on other channels are (e.g., still) images associated with the content items. In some embodiments, as shown in FIG. 8C, the electronic device 500 detects, via input device 510*b*, a downward swipe of contact 803*c*. In some embodiments, in response to detecting the input in FIG. 8C, the electronic device 500 scrolls the indications 818*a-e* of channels and representations 820*a-e* of content items on the channels, as shown in FIG. 8D. In some embodiments, the indications 818*a-e* of channels and representations 820*a-e* of content items on the channels scroll at different speeds (e.g., because the indications 818*a-e* and representations 820*a-e* are different sizes or because, in some embodiments, there are a different number of indications 818*a-e* from the number of representations 820*a-e* displayed at a given moment in time).

FIG. 8D illustrates an example of how the electronic device 500 updates the channel guide user interface in response to the input illustrated in FIG. 8C. As shown in FIG. 8D, in some embodiments, the electronic device 500 scrolls the indications 818*b-f* of channels and representations 820*b-f* of content items on the channels such that a representation 820*d* of channel 8, represented by indication 818*d* has the current focus. In some embodiments, the electronic device 500 continues playback of the TV show 802*a* while and after scrolling the indications 818*b-f* and representations 820*b-f*. In some embodiments, the representation 820*c* of the TV show 802*a* playing on the electronic device 500 is an indication that the TV show 802*a* is currently playing. In some embodiments, the representation 820*c* of TV show 802*a* playing on the electronic device is an image associated with the TV show 802*a*. In some embodiments, the representation 820*d* with the current focus is a live video preview (e.g., without audio) of the content item. In some embodiments, the electronic device 500 initially presents a still image in representation 820*d* until the live video preview buffers on the electronic device. In some embodiments, the representations 820*b*, 820*e*, and 820*f* include still images associated with the content items corresponding to each representation 820*b*, 820*e*, and 820*f*. In some embodiments, in response to detecting selection of one of the representations 820*a-e*, the electronic device 500 ceases displaying the channel guide user interface and presents the content corresponding to the selected representations.

Figure 8F:
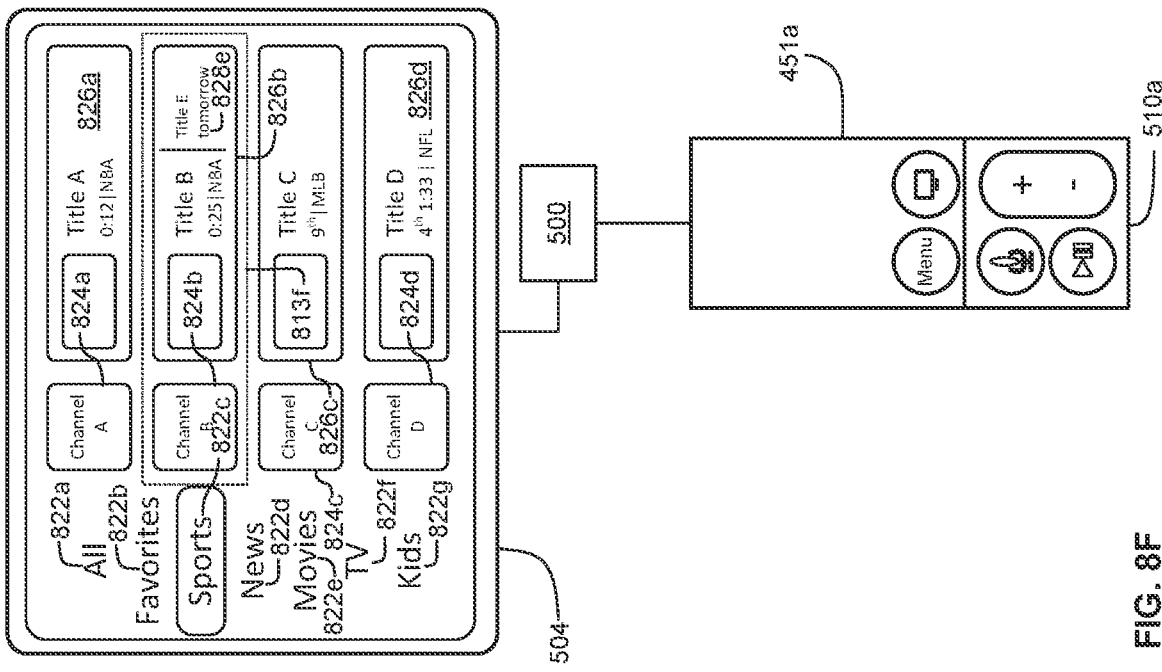
Figure 8E:
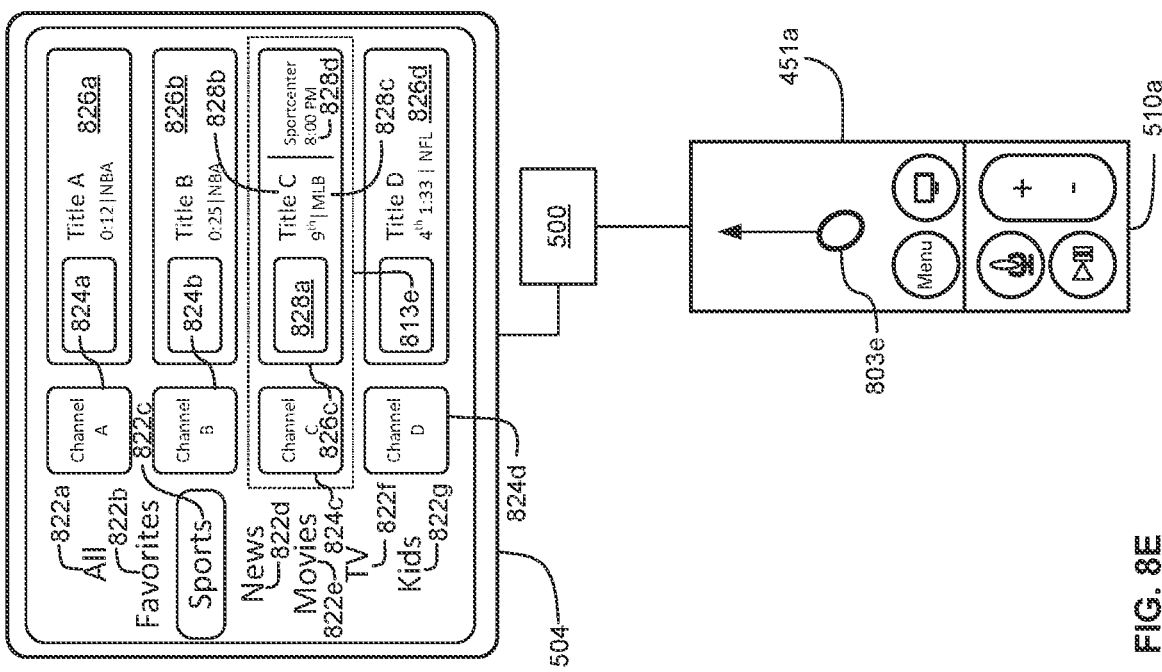

FIG. 8E illustrates an example of a channel guide user interface according to some embodiments. In some embodiments, the user interface in FIG. 8E is displayed in response to the input illustrated in FIG. 8B. In some embodiments, the user interface illustrated in FIG. 8E includes genre-filtered tabs 822*a-g*, indications 824*a-d* of channels (or more generally, sources of live content), and indications 826*a-d* of content items currently playing on the channels available to the electronic device 500. In some embodiments, in response to detecting selection of one of the indications 826*a-d*, the electronic device 500 ceases display of the channel guide user interface an initiate playback of the content item corresponding to the selected indication (e.g., with audio). For example, in FIG. 8E, the sports tab 822*c* is currently selected, so the user interface includes representations 826*a-d* of sports content currently playing on the channels accessible to the electronic device 500. In some embodiments, the representations 824*a-d* of channels scroll vertically with the representations 826*a-d* of content on the channels. In some embodiments, the sports tab 822*c* of the channel guide user interface does not include all the channels available to the electronic device 500. In some embodiments, the sports tab 822*c* only includes channels that are currently playing sports content (e.g., and does not include channels that are not currently playing sports content).

As shown in FIG. 8E, the current focus 813*e* is on the representation 824*c* of channel C and the representation 826*c* of a content item currently playing on channel C, for example. In some embodiments, representation 826*c* includes an image 828*a* corresponding to the content item, the title 828*b* of the content item, an indication 828*c* of the portion and/or progress of the content item (e.g., the current inning and/or current quarter in a game) and league associated with the content item, and an indication 828*d* of the next sports-related content item playing on channel C. In some embodiments, the other representations 826*a-b* and 826*d* include associated images, titles, and indications of portions and leagues. In some embodiments, only the representation 826c with the current focus 813e includes the indication 828d of the next sports-related content item on the channel. In some embodiments, the indication 828d includes an indication of the title of the content item and an indication of the time at which the content item will be available (e.g., via broadcast or streaming). In some embodiments, the content item corresponding to indication 828d is not necessarily the next content item playing on the channel after the currently-playing content item. For example, there could be one or more content items between the currently-playing content item and the content item corresponding to indication 828d that are not in the sports genre, and representation 826c would not include indications of those content items. In some embodiments, the content item corresponding to indication 828d is the next content item on the channel, irrespective of the genre of that content item (e.g., the genre could be a genre other than sports, such as movies or news). As shown in FIG. 8E, the electronic device 500 detects, via input device 510a, an upward swipe of contact 803e. In some embodiments, in response to the input illustrated in FIG. 8E, the electronic device 500 updates the user interface as shown in FIG. 8F.

FIG. 8F illustrates an example of the channel guide user interface updated in accordance with the input illustrated in FIG. 8E. As shown in FIG. 8F, for example, the electronic device 500 presents the user interface with the current focus 813f on the representation 824b of channel B and the representation 826b of a content item playing on channel B. In some embodiments, while the current focus 813f is on representation 826b, the electronic device 500 updates representation 826b to include an indication 828e of an upcoming content item on channel B. In some embodiments, the indication 828e is an indication of the next sports-related content item on channel B (e.g., even if there are other non-sports-related content items before the next sports-related content item). In some embodiments, the indication 828e is an indication of the next content item on channel B, even if the next content item is not in the sports genre.

Figure 8H:
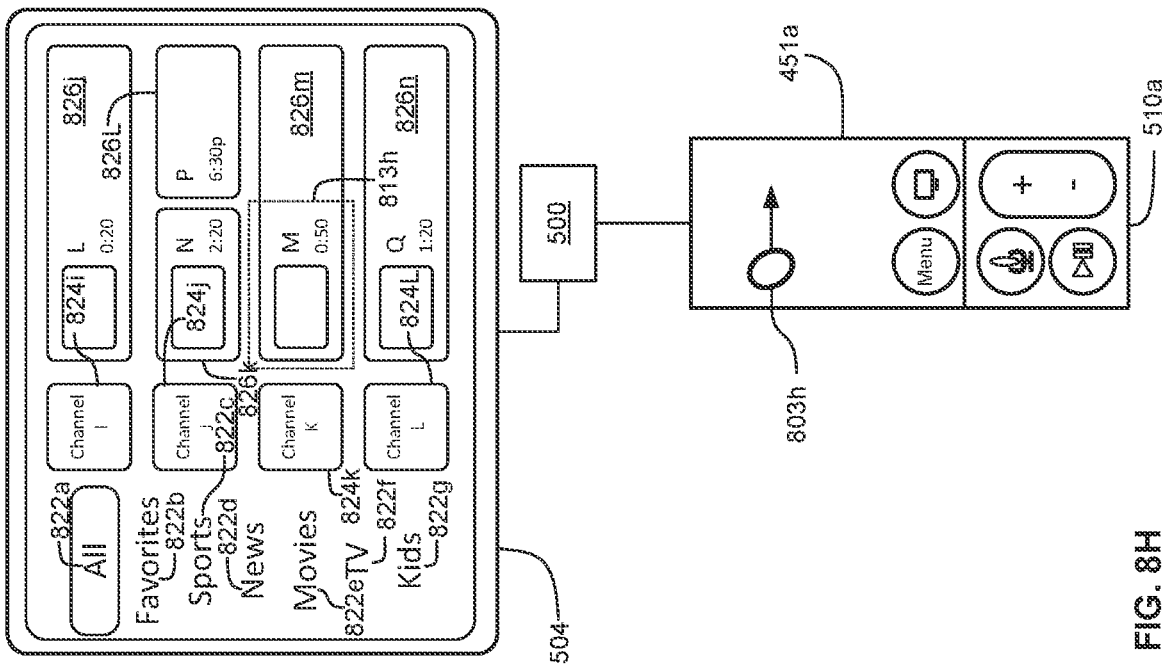
Figure 8G:
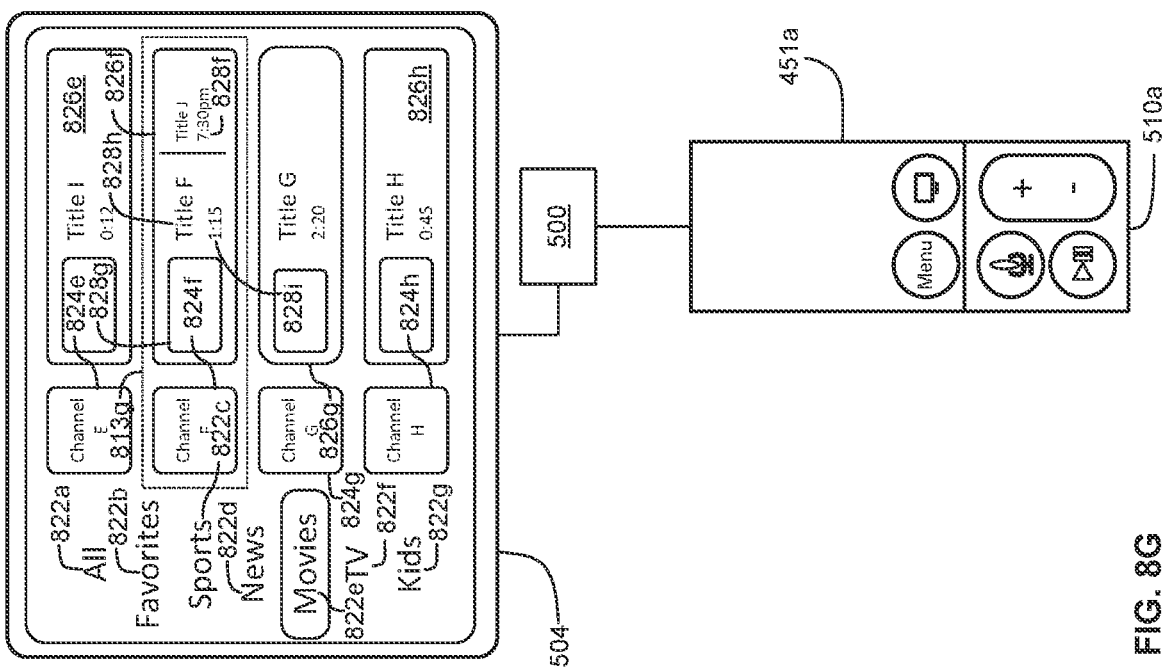

FIG. 8G illustrates an example of the electronic device 500 presenting a movies tab of the channel guide user interface (e.g., in response to selection of tab 822e). In some embodiments, the movies tab of the channel guide user interface includes indications 824e-h of channels currently live streaming or live broadcasting movies that are available for playback on the electronic device 500 and indications 826e-h of the movies currently being live streamed or live broadcast. In some embodiments, the user interface does not include indications of channels that are not currently playing movies. For example, indication 826f is associated with a respective movie currently being live streamed or live broadcast on channel F. In some embodiments, indication 826f includes a thumbnail 828g associated with the respective movie, an indication 828h of the title of the respective movie, and an indication 828i of the current playback position of the respective movie being live streamed or live broadcast (e.g., irrespective of the user or electronic device's consumption of the content item). In some embodiments, the representations 826e, 826g, and 826h include similar elements to elements 828g-i included in representation 826f. In some embodiments, because the current focus 813g is on representation 826f, the electronic device 500 displays representation 826f with an indication 828f of an upcoming content item on channel F. In some embodiments, the upcoming content item is the next movie on channel F (e.g., even if there are non-movie content items that will be broadcast or streamed before the next movie). In some embodiments, the upcoming content item is the next content item playing on channel F even if it is not a movie.

In some embodiments, while displaying a genre-filtered page of the channel guide, such as in FIGS. 8E-8G, the electronic device 500 displays representations of content items that are currently playing that have the same width irrespective of the duration of the content items. In some embodiments, when displaying the "all" tab 822a of the channel guide, the electronic device 500 presents representations of currently-playing content items and upcoming content items from a plurality of genres, and the representations have widths corresponding to the duration of the content items associated therewith.

FIG. 8H illustrates an example of the electronic device 500 presenting the "all" tab 822a of the channel guide user interface (e.g., in response to selection of tab 822a). In some embodiments, the user interface includes indications 824i-L of channels available for playback on the electronic device 500. The user interface further includes, in some embodiments, indications 826j-n of content items being broadcast or live streamed on the channels currently and in the future. In some embodiments, indications 826j-n correspond to content items of a plurality of genres, rather than all being from the same genre as was the case for the user interfaces illustrated in FIGS. 8E-8G. In some embodiments, the widths of the indications 826j-n correspond to the durations of the content items. For example, the width of representation 826m corresponds to a content item that is at least an hour long (e.g., because, in some embodiments, the width of representation 826m is wider than the width of the area of the user interface in which representations 826j-n are displayed) and representation 826L corresponds to a content item that is at least half an hour long (e.g., because, in some embodiments, the width of representation 826L is wider than the width of the area of the user interface in which representations 826j-n are displayed). In some embodiments, the indications 826j-k and 826m-n of content items currently playing include thumbnails representing the content items corresponding to the indications and the indication 826L of an upcoming content item does not include a thumbnail. In some embodiments, in response to detecting selection of one of the indications 826j-n, the electronic device 500 initiates playback of the content item currently playing on the channel of the content item corresponding to the selected indication 826j-n (e.g., and ceases display of the channel guide user interface).

In some embodiments, the representations 826j-n are horizontally scrollable to reveal additional representations of content items to be played after the content items currently displayed in the user interface. In some embodiments, in response to a request to scroll the representations 826j-n, the electronic device 500 scrolls the representations by a distance that corresponds to a predetermined period of time (e.g., 15 minutes, 20 minutes, 30 minutes, 1 hour, etc.) irrespective of the duration of the content item corresponding to the representation 826j-n with the current focus 813h. For example, as shown in FIG. 8H, while the current focus 813h is directed to (e.g., a first 30 minute portion of) representation 826m corresponding to a content item that is at least an hour long (e.g., the width of representation 826m is the full width of the area in which representations 826j-n are displayed), the electronic device 500 detects, via input device 510a, a right swipe of contact 803h corresponding to a request to horizontally scroll representations 826j-n to the right. In some embodiments, in response to the input illustrated in FIG. 8H, the electronic device 500 scrolls the representations 826*j-n* by a predetermined amount corresponding to a predetermined amount of time, as shown in FIG. 8I.

Figure 8J:
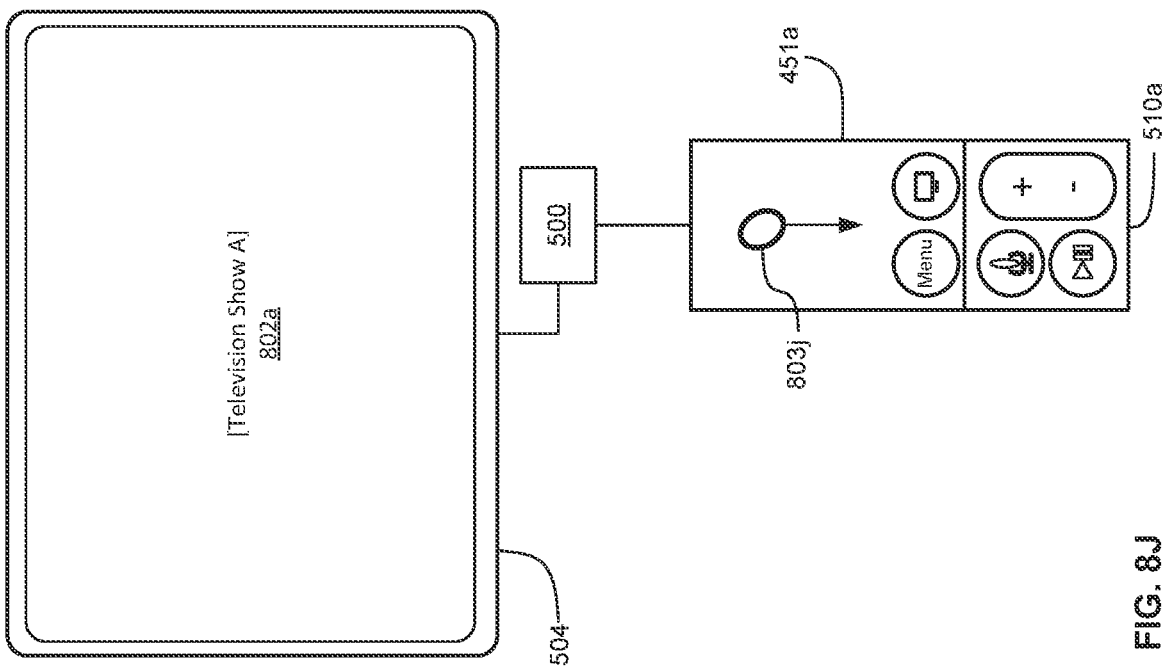
Figure 8I:
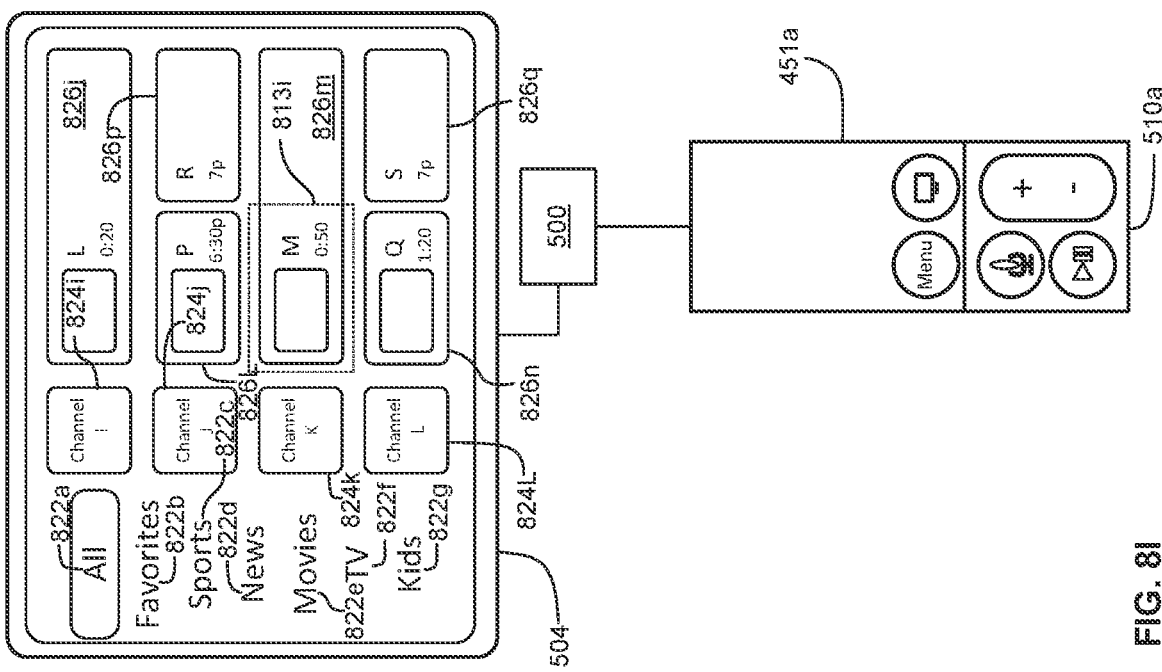

FIG. 8I illustrates an example of the channel guide user interface after being scrolled in response to the input illustrated in FIG. 8H. In some embodiments, although the current focus 813*h* was directed to representation 826*m* in FIG. 8H when the input was received, the electronic device 500 still scrolls the representations 826*j-q* by the predetermined amount, even though that amount does not cause the electronic device 500 to display the next representation after representation 826*m* (e.g., because the duration of the content item corresponding to representation 826*m* causes the representation to extend beyond the predetermined amount by which representations 826*j-q* were scrolled). As shown in FIG. 8I, for example, scrolling the representations 826*j-q* in response to the input illustrated in FIG. 8H reveals representations 826*p* and 826*q* which were not visible in FIG. 8H. Further, in FIG. 8I, a second 30 minute portion— immediately following the first 30 minute portion—of representation 826*m* currently has focus.

In some embodiments, as will be described with reference to FIGS. 8J-8L, the electronic device 500 presents a user interface for changing channels that includes indications of the channels and previews of the content on the channels. In FIG. 8J, for example, the electronic device 500 presents a television show 802*a*. In some embodiments, while presenting the television show 802*a* without presenting the playback control elements described above with reference to FIGS. 8A-8B and method 700, the electronic device 500 detects, via input device 510*a*, a downward swipe of contact 803*j*. In some embodiments, in response to the input illustrated in FIG. 8J, the electronic device 500 presents the channel changing user interface illustrated in FIGS. 8K-8L.

Figure 8L:
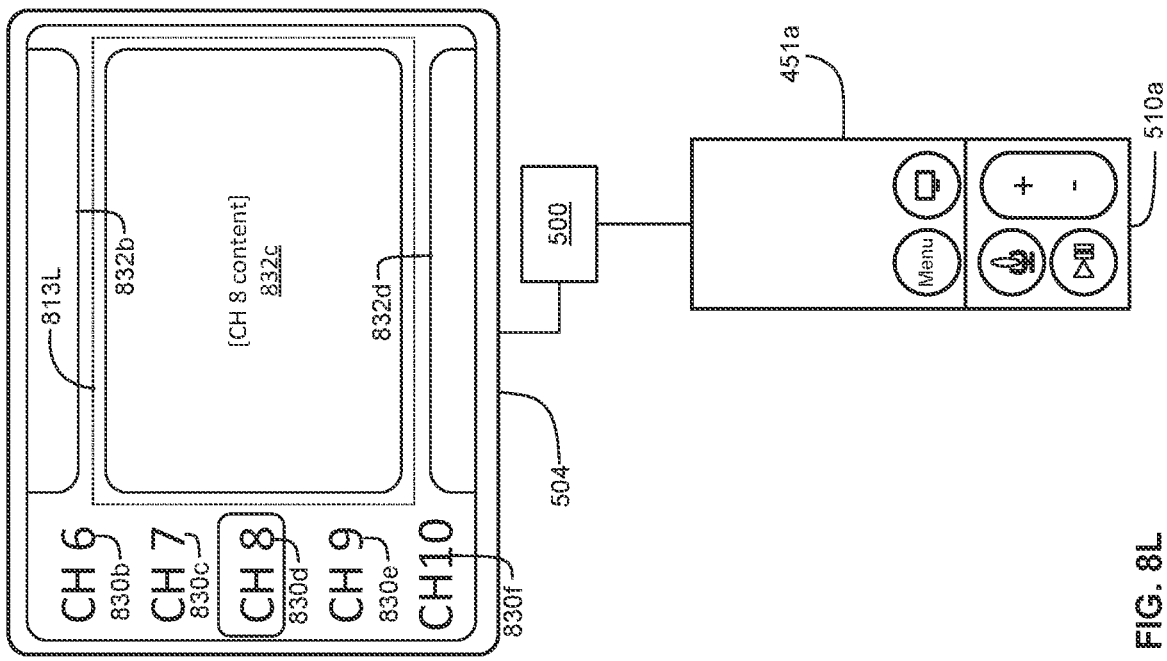
Figure 8K:
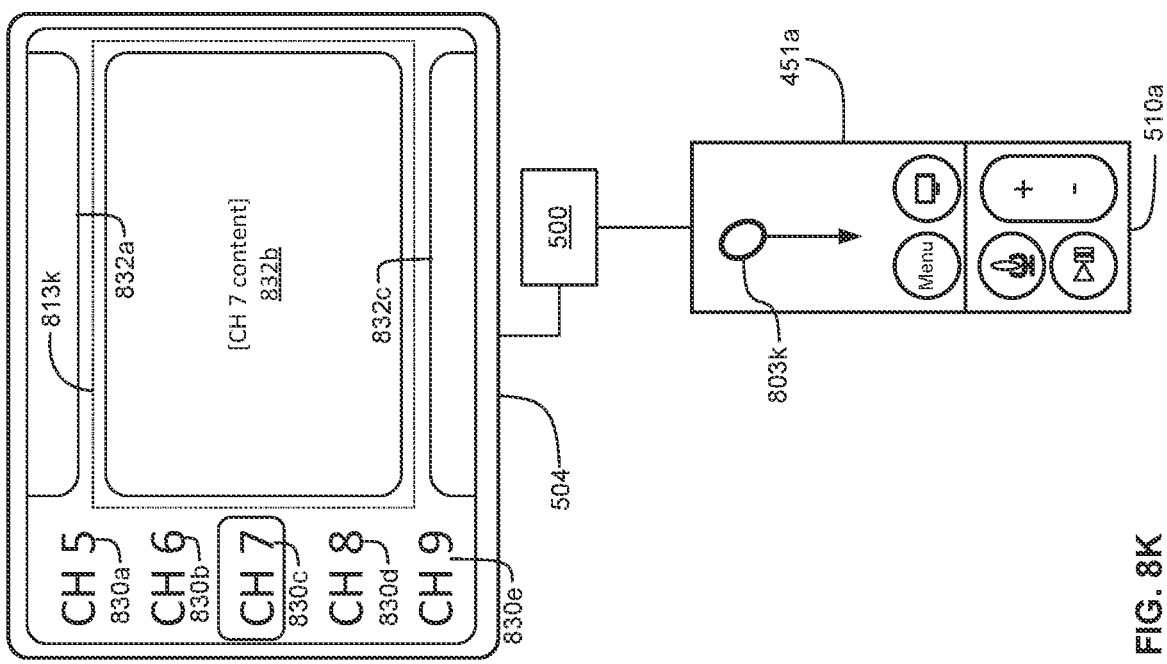

FIG. 8K illustrates an example of the channel changing user interface the electronic device 500 displays in response to the input illustrated in FIG. 8J. As shown in FIG. 8K, in some embodiments, the channel changing user interface includes indications 830*a-e* of the channels accessible to the electronic device and representations 832*a-c* of the content currently playing on the channels. In some embodiments, the indications 830*a-e* of the channels are numeric indications of the channels as shown in FIG. 8K. In some embodiments, the indications 830*a-e* are text indications of the names of the channels. In some embodiments, the indications 830*a-e* are images and/or icons corresponding to the channels. In some embodiments, when the channel changing user interface is first displayed, the representation 832*b* of the channel the user is currently watching has the current focus 813*k* and includes (e.g., live) video content of the channel (e.g., with or without sound). In some embodiments, the portions of representations 832*a* and 832*c* are portions of images corresponding to content on the channels adjacent to the channel the electronic device 500 is currently playing. For example, the electronic device 500 is currently playing content 832*b* from channel 7 and displays portions of an (e.g., still) image 832*a* corresponding to the content on channel 6 and an (e.g., still) image 832*c* corresponding to content on channel 8. In some embodiments, the electronic device 500 scales down the content that is currently being presented to fit into representation 832*b* so that the other representations 832*a* and 832*c* and the indications 830*a-e* of the channels are displayed concurrently with the content.

As shown in FIG. 8K, the electronic device 500 detects, via input device 510*a*, a downward swipe of contact 803*k* corresponding to a request to scroll the indications 830*a-e* of channels and representations 832*a-c* of content on the channels. In some embodiments, in response to the input illustrated in FIG. 8K, the electronic device 500 updates the user interface as shown in FIG. 8L. In some embodiments, the indications 830*a-e* and representations 822*a-c* scroll at different speeds and/or by different distances in response to the input (e.g., because they are different sizes).

FIG. 8L illustrates an example of how the electronic device 500 updates the channel changing user interface in response to the input illustrated in FIG. 8K. For example, the indications 830*b-f* of channels and representations 832*b-d* of content on the channels scroll and the input focus 813*L* is moved to representation 832*c* in response to the input illustrated in FIG. 8L. In some embodiments, the electronic device 500 plays content corresponding to channel 8 (e.g., with or without audio) within representation 832*c* while displaying (e.g., still) images 832*b* and 832*d* corresponding to channels 7 and 9 and updates the indication 830*d* of channel 8 to indicate that the electronic device 500 is currently playing content from channel 8. In some embodiments, in response to detecting selection of representation 832*c* (or a different representation 832), the electronic device 500 ceases display of the channel changing user interface and presents the content corresponding to representation 832*c* full-screen.

Figure 9:
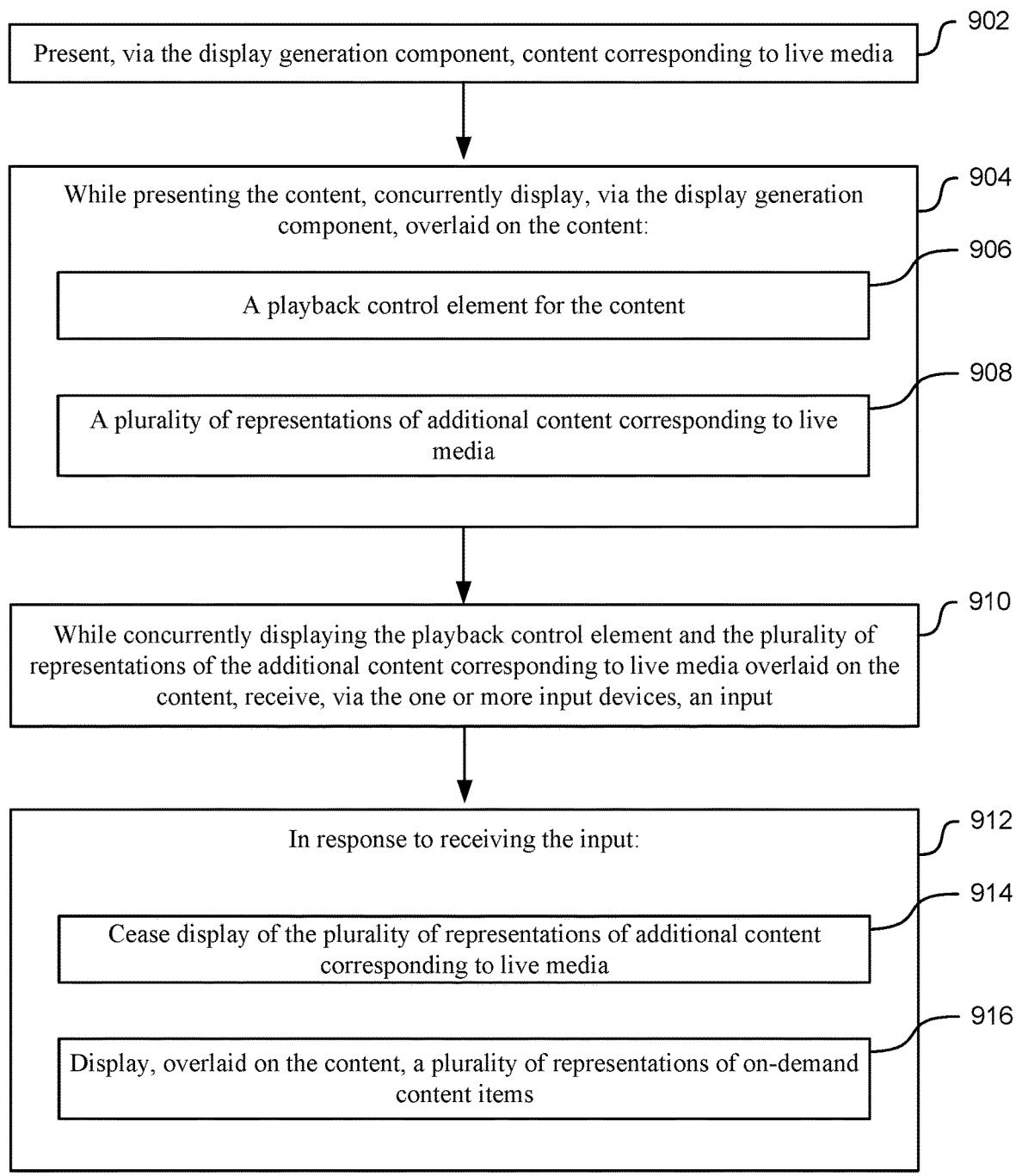
FIG. 9 is a flow diagram illustrating a method of presenting a user interface for browsing and switching between content items available for playback in accordance with some embodiments.

FIG. 9 is a flow diagram illustrating a method of presenting a user interface for browsing and switching between content items available for playback in accordance with some embodiments. The method 900 is optionally performed at an electronic device such as device 100, device 300, and device 500, as described above with reference to FIGS. 1A-1B, 2-3, 4A-4B and 5A-5C. Some operations in method 900 are, optionally combined and/or order of some operations is, optionally, changed.

As described below, the method 900 provides ways in which an electronic device presents a user interface for browsing and switching between content items available for playback in accordance with some embodiments. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, such as in FIG. 8A, method 900 is performed at an electronic device (e.g., 500) in communication with a display generation component (e.g., 504) and one or more input devices (e.g., 510*b*). In some embodiments, the electronic device is a mobile device (e.g., a tablet, a smartphone, a media player, or a wearable device), a computer (e.g., a desktop computer, a laptop computer), or a wearable device (e.g., a watch, a head-mounted device), optionally in communication with one or more of a mouse (e.g., external), trackpad (optionally integrated or external), remote control device (e.g., external), another mobile device (e.g., separate from the electronic device), a handheld device (e.g., external), and/or a controller (e.g., external, etc.), or a set-top box in communication one or more input devices (e.g., a remote control). In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc.

In some embodiments, such as in FIG. 8A, the electronic device (e.g., 500) presents (902), via the display generation component (e.g., 504), content (e.g., 802*a*) corresponding to live media. In some embodiments, live media includes content items that are presented at a predetermined time, such as broadcasted content items (e.g., over-the-air television, radio stations) and/or live streaming content items. In some embodiments, live media is different from on-demand media in that the user is able to initiate playback of ondemand media without being restricted to a scheduled broadcast or live stream of the media, whereas playback of live media is restricted to a predetermined broadcast or livestream time. In some embodiments, it is possible to rewind or fast-forward on-demand media without restrictions, whereas there may be limitations on how far from a current playback position the user is able to rewind or fast-forward live media. For example, it may be possible to rewind live media only by a threshold amount of time (e.g., 10, 30, 45, etc. seconds, 1, 2, 3, 5, 10, 15, etc. minutes).

In some embodiments, such as in FIG. 8A, while presenting the content (e.g., 802*a*), the electronic device (e.g., 500) concurrently displays (e.g., 904), via the display generation component (e.g., 504), overlaid on the content (e.g., 802*a*) (e.g., obscuring one or more portions of the content), a playback control element (e.g., 808*a*) for the content (906). In some embodiments, the playback control element is one or more of a scrubber bar, a selectable option to fast forward, rewind, and/or play/pause the content item; present audio options for the content item; and/or present subtitle options for the content item. The playback control element optionally has one or more of the characteristics of the playback control elements described with reference to method 700.

In some embodiments, such as in FIG. 8A, while presenting the content, the electronic device (e.g., 500) concurrently displays (e.g., 904), via the display generation component (e.g., 504), overlaid on the content (e.g., 802*a*) (e.g., obscuring one or more portions of the content), a plurality of representations (e.g., 812*a*, 812*c*, 812*d*) of additional content corresponding to live media (908). In some embodiments, the representations of additional content corresponding to live media are representations of live media currently being presented by other live media channels or sources. For example, the representations include images corresponding to the live media, such as thumbnails including a still image corresponding to the live media and/or a live video clip of the portion of the live media currently being broadcast and/or live streamed. In some embodiments, the representations of additional content include metadata, such as a progress bar indicating that current playback position of the additional content, a title of the content, the channel on or source from which the content is being presented, the current score of a live sports game, etc. In some embodiments, the progress bar indicates the current playback position of content being broadcast irrespective of whether or not the electronic device has presented (e.g., any portions of) the content item. In some embodiments, the representations of additional content corresponding to live media are presented in response to detecting selection and/or focus of a selectable option presented according to method 700. In some embodiments, the plurality of representations of additional content are displayed below the playback control element overlaid on the content.

In some embodiments, such as in FIG. 8A, while concurrently displaying the playback control element (e.g., 808*a*) and the plurality of representations (e.g., 812*a*, 812*c*, 812*d*) of the additional content corresponding to live media overlaid on the content (e.g., 802*a*), the electronic device (e.g., 500) receives (910), via the one or more input devices (e.g., 510*b*), an input (e.g., via contact 803*a*). In some embodiments, the additional content corresponding to the live media is displayed in a first tab of a user interface overlaid on the content and the input is an input corresponding to a request to present a second tab of the user interface overlaid on the content (e.g., an input moving a current focus from the first tab to the second tab). For example, the user interface includes a "Live" tab that includes the representations of the additional content corresponding to live media and an "Up Next" tab that includes representations of on-demand content items in a playback queue associated with (e.g., a user account associated with) the electronic device. In some embodiments, the representations of the additional content are selectable to cease presenting the content and initiate presentation of the content corresponding to the selected representation.

In some embodiments, in response to receiving the input (912), the electronic device (e.g., 500) ceases (914) display of the plurality of representations (e.g., 812*a*, 812*c*, 812*d*) of additional content corresponding to live media, such as in FIG. 8A.

In some embodiments, in response to receiving the input (912), the electronic device (e.g., 500) displays (916), overlaid on the content, a plurality of representations (e.g., 618*e*-618*h*) of on-demand content items, such as in FIG. 6G (while continuing playback of the content corresponding to live media). In some embodiments, the representations of on-demand content items are displayed at a location (e.g., of the display generation component, in the user interface including the playback of live content, etc.) at which the representations of live content channels were previously displayed. In some embodiments, the representations of on-demand content items include images corresponding to the on-demand content items (e.g., still images, videos). In some embodiments, the representations of on-demand content items include metadata such as the title of the content items and a progress bar indicating the playback position within the content at which the electronic device last stopped presenting the content (e.g., if the electronic device has played a subset of the content item already). In some embodiments, the representations are selectable to cease presenting the content and initiate presenting the respective content corresponding to the selected representation. In some embodiments, the representations of on-demand content items are presented in response to detecting selection and/or focus of a selectable option presented according to method 700. In some embodiments, the plurality of representations of on-demand content items are displayed below the playback control element overlaid on the content.

The above-described manner of presenting the representations of on-demand content in response to receiving the input while presenting the representations of content corresponding to live media overlaid on content corresponding to live media provides an efficient way of browsing other available live content and on-demand content while continuing to present the content corresponding to live media, which additionally reduces power usage and improves battery life of the electronic device by enabling the user to use the electronic device more quickly and efficiently.

In some embodiments, such as in FIG. 8B, the additional content (e.g., 812*a*-812*d*) corresponding to live media is provided by a plurality of content sources (e.g., channels) selected by a user of the electronic device (e.g., 500). In some embodiments, in accordance with a determination that the user selected a first plurality of content sources, the additional content corresponding to live media is provided by the first plurality of content sources. In some embodiments, in accordance with a determination that the user selected a second plurality of content sources, the additional content corresponding to live media is provided by the second plurality of content sources. In some embodiments, the user selects the plurality of content sources by adding the selected content sources to a respective list of content sources (e.g., a saved content sources list, a favorite content sources list). In some embodiments, the additional content corresponding to live media is a plurality of representations of live media content items that, when selected, causes the electronic device to initiate playback of the live media content item corresponding to the selected representation.

The above-described manner of presenting additional content provided by a plurality of content sources selected by the user of the electronic device provides an efficient way of accessing content from the content sources selected by the user while presenting the content, which additionally reduces power usage and improves battery life of the electronic device by enabling the user to use the electronic device more quickly and efficiently.

In some embodiments, such as in FIG. 8A, prior to receiving, via the one or more input devices, an input (e.g., 803a) corresponding to selection of a respective representation (e.g., 812b) of respective content included in the plurality of representations (e.g., 812a-812d) of additional content corresponding to live media, wherein the respective representation (e.g., 812b) of the respective content has a current focus (e.g., 813a), the electronic device (e.g., 500) concurrently displays, via the display generation component (e.g., 504), the respective content (e.g., 802a) without playing audio associated with the respective content (e.g., 802a), wherein the playback control element (e.g., 808a) and the plurality of representations (e.g., 812a-812d) of additional content are overlaid on the respective content (e.g., 802a). In some embodiments, the electronic device initially displays the plurality of representations of additional content corresponding to live media overlaid on the respective content with the current focus directed to the respective representation of the respective content. In some embodiments, prior to detecting the input corresponding to selection of the respective representation, the electronic device presents image content (e.g., one or more images, video content) of the respective content without presenting the audio content of the respective content at the size and location at which the content corresponding to live media will be displayed with the playback control element and representations of additional content overlaid thereon.

In some embodiments, such as in FIG. 8A, while displaying the respective content (e.g., 802a) without playing the audio associated with the respective content and while the respective representation (e.g., 812b) has the current focus (e.g., 813a), the electronic device (e.g., 500) receives, via the one or more input devices (e.g., 510b), the input corresponding to selection of the respective representation (e.g., 812b) of the respective content (e.g., 802a)

In some embodiments, in response to receiving the input (e.g., via contact 803a) corresponding to selection of the respective representation (e.g., 812b) of the respective content, the electronic device (e.g., 500) continues to display the respective content. In some embodiments, in response to receiving the input (e.g., via contact 803a) corresponding to selection of the respective representation (e.g., 812b) of the respective content, the electronic device (e.g., 500) plays the audio associated with the respective content (e.g., 802a). In some embodiments, the audio associated with the respective content is synchronized with video content of the respective content. In some embodiments, instead of detecting selection of the respective representation while playing the respective content, the electronic device detects selection of a second representation corresponding to second content. In some embodiments, in response to detecting selection of the second representation corresponding to second content, the electronic device ceases display of the respective content, displays the second content at the size and location at which the content corresponding to live media is displayed with the playback control element and representations of additional content overlaid thereon, and plays the audio associated with the second content. In some embodiments, the electronic device displays the plurality of representations of additional content corresponding to live media overlaid on the second content unless and until detecting an input corresponding to a request to cease display of the plurality of representations of additional content or a predetermined time period (e.g., 1, 2, 3, 5, 10, 15, etc. seconds) passes without receiving an input.

The above-described manner of initially playing the respective content without audio and initiating playback of the audio in response to detecting selection of the respective representation of the respective content provides an efficient way of allowing the user to select alternate content to play before presenting the audio associated with the respective content, which additionally reduces power usage and improves battery life of the electronic device by enabling the user to use the electronic device more quickly and efficiently.

In some embodiments, such as in FIG. 8A, the plurality of representations (e.g., 812a-812d) of additional content corresponding to live media include images corresponding to portions of the additional content currently available for live playback. In some embodiments, the images are video content corresponding to live previews of current portions of the live media currently being broadcast or live-streamed. In some embodiments, the images are still images corresponding to respective portions of the live media (e.g., predetermined respective portions associated with each content time corresponding to live media, a portion that was broadcast when the plurality of representations were initially displayed, etc.).

The above-described manner of including images corresponding to portions of the additional content currently available for live playback in the plurality of representations of additional content provides an efficient way of indicating the content items that correspond to each representation, which additionally reduces power usage and improves battery life of the electronic device by enabling the user to use the electronic device more quickly and efficiently.

In some embodiments, such as in FIG. 8A, displaying the plurality of representations (e.g., 812a-812d) of additional content includes, in accordance with a determination that a respective representation (e.g., 812b) of respective content of the plurality of representations of additional content has a current focus (e.g., 813a) of the electronic device (e.g., 500), the respective representation (e.g., 812b) is displayed with an indication (e.g., 816a, 816b) of metadata associated with the respective content. In some embodiments, the indication of metadata includes an indication of a content source (e.g., channel) that provides the respective content and a title of the respective content. In some embodiments, if the respective content is a sports game, the metadata further includes an indication of a current score of the sports game, the teams playing in the sports game, and/or the portion (e.g., quarter, inning, etc.) of the sports game currently available for playback. In some embodiments, the electronic device displays the other representations corresponding to live media without indications of metadata associated with the live media.

In some embodiments, such as in FIG. 8A, displaying the plurality of representations (e.g., 812a-812d) of additional content includes, in accordance with a determination that the respective representation (e.g., 812a) of the respective content does not have the current focus (e.g., 813a) of the electronic device (e.g., 500), the respective representation (e.g., 812a) is displayed without the indication of metadata associated with the respective content. In some embodiments, in response to an input corresponding to a request to move the current focus from the respective representation to a second representation, the electronic device ceases display of the indication of metadata associated with the respective content and displays the second representation with an indication of metadata associated with the content associated with the second representation.

The above-described manner of displaying the respective representation of respective content with the indication of metadata associated with the respective content while the current focus is on the respective representation provides an efficient way of presenting the metadata in a way that does not obstruct the other representations of additional content, which additionally reduces power usage and improves battery life of the electronic device by enabling the user to use the electronic device more quickly and efficiently.

In some embodiments, such as in FIG. 8A, the plurality of representations (e.g., 812a-812d) of additional content corresponding to live media include visual indications (e.g., 814a-814d) of playback positions corresponding to portions of the additional content currently available for live playback. In some embodiments, the playback positions corresponding to the portions of the additional content currently available for live playback indicate the portions of the live media that have already been broadcast and/or streamed and the portions of the live media that will be broadcast and/or streamed in the future irrespective of portions of the live media consumed by (e.g., a user account associated with) the electronic device. In some embodiments, the visual indications of playback positions corresponding to portions of the additional content currently available for live playback are displayed overlaid on images corresponding to the live media. In some embodiments, in response to detecting selection of one of the representations of additional content, the electronic device initiates playback of the respective additional content corresponding to the selected representation from the playback position indicated by the visual indication of the playback position included in the selected representation.

The above-described manner of presenting visual indications of playback positions included in the plurality of representations of additional content provides an efficient way of indicating to the user which portions of the live media will play in response to detecting selection of one of the representations, which additionally reduces power usage and improves battery life of the electronic device by enabling the user to use the electronic device more quickly and efficiently.

In some embodiments, such as in FIG. 8A, while concurrently displaying the playback control element (e.g., 808a) and the plurality of representations (e.g., 812a-812d) of the additional content corresponding to live media overlaid on the content (e.g., 802a), the electronic device (e.g., 500) receives, via the one or more input devices (e.g., 510b), a second input (e.g., via contact 803a) (or sequence of one or more second inputs). In some embodiments, the second input corresponds to a request to move the current focus from an option associated with the plurality of representations of additional content corresponding to live media to an option associated with information corresponding to the content. In some embodiments, the second input corresponds to selection of an option associated with information corresponding to the content.

In some embodiments, in response to receiving the second input (e.g., via contact 803a) (or sequence of one or more second inputs), the electronic device (e.g., 500) ceases display of the plurality of representations of additional content corresponding to live media, such as in FIG. 6D.

In some embodiments, in response to receiving the second input (or sequence of one or more second inputs), the electronic device (e.g., 500) displays, overlaid on the content (e.g., 602a), information corresponding to the content (e.g., 602a), such as in FIG. 6D. In some embodiments, the information corresponding to the content is displayed at a location in the user interface at which the plurality of representations of additional content corresponding to live media were displayed. In some embodiments, the information includes one or more of an image corresponding to the content item, a description of the content item, a score of the content item (e.g., if the content item is a sports game), an option to play the content item from the beginning, and an option to view a user interface associated with the content item. The above-described manner of displaying the information corresponding to the content provides an efficient way of presenting the information while continuing to present the content, which additionally reduces power usage and improves battery life of the electronic device by enabling the user to use the electronic device more quickly and efficiently.

In some embodiments, such as in FIG. 8B, while concurrently displaying the playback control element (e.g., 808a) and the plurality of representations (e.g., 812a-812d) of the additional content corresponding to live media overlaid on the content (e.g., 802a), the electronic device (e.g., 500) receives, via the one or more input devices (e.g., 510b), a second input (e.g., via contact 803b) (e.g., a downward directional input (e.g., swipe, selection of a down arrow key) received at an input device such as input device 510 or input device 511). In some embodiments, the electronic device displays a visual indication that the second input (e.g., a downward direction input) will cause the electronic device to present a content guide user interface concurrently with the playback control element and the plurality of representations of additional content overlaid on the content.

In some embodiments, in response to receiving the second input, the electronic device (e.g., 500) ceases concurrent display of the playback control element and the plurality of representations of additional content corresponding to live media overlaid on the content, such as in FIG. 8C. In some embodiments, the electronic device ceases presenting the content in response to receiving the second input. In some embodiments, the electronic device continues to present the content (e.g., the content guide user interface is displayed overlaid on the content).

In some embodiments, in response to receiving the second input, the electronic device (e.g., 500) displays, via the display generation component (e.g., 504), a content guide user interface including representations (e.g., 820a-820e) of respective content corresponding to live media displayed in association with indications (e.g., 818a-818e) of respective content sources (e.g., channels) associated with the respective content corresponding to live media, such as in FIG. 8C. In some embodiments, in response to detecting selection of one of the representations of respective content, the electronic device initiates playback of the content source of the content corresponding to the selected representation (e.g., the content corresponding to the selected representation if the content is currently playing or a different item of content from the same content source). In some embodiments, in response to detecting selection of an indication of a content source, the electronic device initiates playback of a content item from the content source corresponding to the selected indication. In some embodiments, in response to detecting selection of one of the representations of respective content or one of the indications of respective content sources, the electronic device ceases display of the content guide user interface.

The above-described manner of displaying the content guide user interface in response to the second input provides an efficient way of accessing the content guide from a user interface including content, which additionally reduces power usage and improves battery life of the electronic device by enabling the user to use the electronic device more quickly and efficiently.

In some embodiments, such as in FIG. 8J, while displaying the content (e.g., 802a) without displaying the playback control element and the plurality of representations of additional content corresponding to live content (e.g., displaying the content without other user interface elements or indications overlaid on the content), the electronic device (e.g., 500) receives, via the one or more input devices (e.g., 510a), a second input (e.g., via contact 803j). In some embodiments, the second input is a downward directional input, such as a downward swipe or selection of a down arrow button or key of an input device in communication with the electronic device.

In some embodiments, in response to receiving the second input, the electronic device (e.g., 500a) displays a user interface that includes a plurality of first representations (e.g., 830b, 830d) of first content sources (e.g., channels) associated with live media displayed in association with a plurality of representations (e.g., 832a, 832c) of respective additional content corresponding to live media available from the first content sources that is currently available for viewing. In some embodiments, the plurality of first representations of first content sources are displayed in a respective order in a first row or column of the user interface and the plurality of representations of respective additional content are displayed in a respective order corresponding to the order of the first representations in a second row or column of the user interface. For example, the electronic device displays a first column including representations of a first content source, a second content source, and a third content source next to a second column including representations of live media available on the first content source, second content source, and third content source in the same order. In some embodiments, the representations of additional content include still images associated with the additional content. In some embodiments, in response to detecting selection of one of the representations of additional content, the electronic device ceases display of the user interface and displays the additional content.

In some embodiments, in response to receiving the second input, the electronic device (e.g., 500a) displays a user interface that includes a plurality of second representations of second content sources (e.g., 830a, 830e) associated with live media that is currently available for viewing not displayed in association with a plurality of representations of respective additional content corresponding to live media available from the second content sources. In some embodiments, the electronic device displays a greater number of representations of content sources than the number of representations of respective additional content.

In some embodiments, in response to receiving the second input, the electronic device (e.g., 500a) displays a user interface that includes the content (e.g., 832b) displayed in association with a respective representation (e.g., 830c) of a respective content source associated with the content. In some embodiments, in response to detecting an input corresponding to a request to change content sources, the electronic device ceases display of the content and displays respective additional content at a position in the user interface at which the content had been presented and displays a representation of the content source of the respective additional content at the position in the user interface at which the respective representation of the respective content source associated with the content had been presented. In some embodiments, the user interface does not include indications of respective additional content corresponding to live media that is not currently available for (e.g., live) playback. In some embodiments, prior to receiving the input, the electronic device displays the content at a first size (e.g., full screen) and, in response to the input, the electronic device displays the content at a second size smaller than the first size.

The above-described manner of displaying representations of content sources associated with representations of respective additional content concurrently with the content provides an efficient way of browsing content corresponding to live media, which additionally reduces power usage and improves battery life of the electronic device by enabling the user to use the electronic device more quickly and efficiently.

In some embodiments, such as in FIG. 8E, the electronic device (e.g., 500) displays, via the display generation component (e.g., 504), a content guide user interface that does not include the playback control element and the plurality of representations of additional content corresponding to live media overlaid on the content. In some embodiments, the content guide user interface is displayed overlaid on the content. In some embodiments, the content guide user interface does not include display of the content.

In some embodiments, such as in FIG. 8E, the content guide user interface includes a first representation (e.g., 826c) of first content corresponding to live media that includes a graphical representation (e.g., 828a) of the first content. In some embodiments, the first content corresponding to live media is currently available for playback. In some embodiments, the first content corresponding to live media is available for playback at a future time. In some embodiments, the first content corresponding to live media was available for playback at a previous time. In some embodiments, the first representation of the first content includes an indication of a title of the additional content and an indication of a playback position of the first content that is currently being streamed or broadcast (e.g., if the first content is currently available for playback). In some embodiments, the graphical representation of the first content is an image associated with the first content, such as a marketing image or a still image from the video content of the content.

In some embodiments, such as in FIG. 8E, the content guide user interface includes a second representation (e.g., 826b) of second content corresponding to live media that includes a graphical representation of the second content. In some embodiments, the second content corresponding to live media is currently available for playback. In some embodiments, the second content corresponding to live media is available for playback at a future time. In some embodiments, the second content corresponding to live media was available for playback at a previous time. In some embodiments, the second representation of the second content includes an indication of a title of the additional content and an indication of a playback position of the second content that is currently being streamed or broadcast (e.g., if the second content is currently available for playback).

In some embodiments, such as in FIG. 8E, in accordance with a determination that the first representation (e.g., 826c) has a current focus (e.g., 813e), the graphical representation (e.g., 828a) of the first content is a first live video and the graphical representation (e.g., 826b) of the second content is a first still image. In some embodiments, representations of other additional content that do not have the current focus include still images. In some embodiments, in response to detecting an input corresponding to a request to update the current focus to a different representation, the electronic device ceases display of the first live video, displays a still image in the first representation, and displays a respective live video corresponding to the additional content of the different representation. In some embodiments, in response to detecting selection of one of the representations of additional content, the electronic device presents the additional content corresponding to the selected representation if the additional content is currently available for playback. In some embodiments, if the additional content corresponding to the selected representation is not currently available for playback, in response to detecting selection of the representation, the electronic device presents different additional content from the same content source as the additional content corresponding to the selected representation.

In some embodiments, such as in FIG. 8F, in accordance with a determination that the second representation (e.g., 826b) has the current focus (e.g., 813f), the graphical representation of the second content is a second live video and the graphical representation of the second content is a second still image. The above-described manner of presenting live video corresponding to the additional content of the representation with the current focus and still images corresponding to the additional content of the representations that do not have the current focus provides an efficient way of presenting live video corresponding to the additional content, which additionally reduces power usage and improves battery life of the electronic device by enabling the user to use the electronic device more quickly and efficiently.

In some embodiments, such as in FIG. 8H, the first representation (e.g., 826k) of the first content has a first size corresponding to a duration of the first content. In some embodiments, the representations are arranged in a grid where each unit of the grid corresponds to a respective duration of time (e.g., 20, 30, 60, etc. minutes). For example, if the first content has a duration of 30 minutes, and each unit of the grid corresponds to 30 minutes, the first representation has a width corresponding to (e.g., equal to) one unit of the grid.

In some embodiments, such as in FIG. 8H, the second representation (e.g., 826j) of the second content has a second size, different from the first size, corresponding to a duration of the second content, different from the duration of the first content, In some embodiments, the representations are arranged in a grid where each unit of the grid corresponds to a respective duration of time (e.g., 20, 30, 60, etc. minutes). For example, if the second content has a duration of 60 minutes, and each unit of the grid corresponds to 30 minutes, the first representation has a width corresponding to (e.g., equal to) two units of the grid.

In some embodiments, such as in FIG. 8H, the graphical representation of the first content has a size independent of the duration of the first content. In some embodiments, such as in FIG. 8H, the graphical representation of the second content has a size independent of the duration of the second content. In some embodiments, the sizes of the graphical representations of the first and second content are the same. In some embodiments, the graphical representations of the first and second content are smaller than the first and second representations. The above-described manner of presenting the first and second representations with sizes corresponding to the durations of the first and second content provides an efficient way of indicating the duration of the first and second content, which additionally reduces power usage and improves battery life of the electronic device by enabling the user to use the electronic device more quickly and efficiently.

In some embodiments, such as in FIG. 8E, while displaying a content guide user interface associated with a respective genre of content that does not include the playback control element and the plurality of representations of additional content corresponding to live media overlaid on the content, the electronic device (e.g., 500) displays, in the content guide user interface associated with the respective genre of content a first representation (e.g., 826c) of first content corresponding to live media of the respective genre that is currently available for viewing from a first content source. In some embodiments, the first representation of the first content includes an image corresponding to the first content, a title of the first content, and an indication of the duration of time for which the first content has been available for (e.g., live) playback. In some embodiments, the first representation is displayed in the content guide user interface in association with (e.g., next to, aligned with) a representation of a content source of the first content. In some embodiments, the content guide user interface includes representations of content of the respective genre that are currently available for viewing. In some embodiments, the content guide user interface does not include representations of content items of other genres (e.g., that are currently available for viewing). In some embodiments, the content guide user interface does not include representations of content items (e.g., of the respective genre) that are not currently available for viewing.

In some embodiments, such as in FIG. 8E, while displaying a content guide user interface associated with a respective genre of content that does not include the playback control element and the plurality of representations of additional content corresponding to live media overlaid on the content, the electronic device (e.g., 500) displays, in the content guide user interface associated with the respective genre of content a second representation (e.g., 826b) of second content corresponding to live media of the respective genre that is currently available for viewing from a second content source, different from the first content source. In some embodiments, the second representation of the second content includes an image corresponding to the second content, a title of the second content, and an indication of the duration of time for which the second content has been available for (e.g., live) playback. In some embodiments, the second representation is displayed in the content guide user interface in association with (e.g., next to, aligned with) a representation of a content source of the second content.

In some embodiments, such as in FIG. 8E, the content guide user interface does not include representations of content corresponding to live media that is not currently available for viewing (e.g., content corresponding to live media that was previously available for viewing but is no longer available, content corresponding to live media that is not currently available for viewing, but will be available for viewing in the future).

In some embodiments, such as in FIG. 8E, in accordance with a determination that the first representation (e.g., 826*c*) has a current focus (e.g., 813*e*), the first representation (e.g., 826*c*) includes a visual indication (e.g., 828*d*) of a third content item corresponding to live media (e.g., of the respective genre) that will be available for viewing from the first content source after the first content and the second representation (e.g., 826*b*) does not include a visual indication of a fourth content item corresponding to live media (e.g., of the respective genre) that will be available for viewing from the second content source after the second content. In some embodiments, in accordance with the determination that the first representation has the current focus, the first representation includes a live video preview of the first content and the second representation includes a still image corresponding to the second content. In some embodiments, the electronic device displays (e.g., some, all of) the representations of content items that do not have the current focus without indications of respective content items of the respective genre that will be available for viewing in the future. In some embodiments, the third content is the next content item available from the first content source after the first content irrespective of a genre of the third content. In some embodiments, the third content is the next content item available from the first content source that has the respective genre. In some embodiments, a fifth content item having a genre other than the respective genre is available from the first content source after the first content and before the third content, but the electronic device displays the indication of the third content because the fifth content does not have a genre corresponding to the respective genre.

In some embodiments, such as in FIG. 8F, in accordance with a determination that the second representation (e.g., 826*b*) has the current focus, the second representation (e.g., 826*b*) includes the visual indication (e.g., 828*e*) of the fourth content item corresponding to live media (e.g., of the respective genre) that will be available for viewing from the second content source after the second content and the first representation (e.g., 826*c*) does not include the visual indication of the third content item corresponding to live media (e.g., of the respective genre) that will be available for viewing from the first content source after the first content. In some embodiments, in accordance with the determination that the second representation has the current focus, the second representation includes a live video preview of the second content and the first representation includes a still image corresponding to the first content. In some embodiments, the fourth content is the next content item available from the second content source after the second content irrespective of a genre of the fourth content. In some embodiments, the fourth content is the next content item available from the second content source that has the respective genre. In some embodiments, a fifth content item having a genre other than the respective genre is available from the second content source after the second content and before the fourth content. The above-described manner of displaying a respective visual indication of a respective content item available for viewing from a respective content source in the respective representation that has the current focus provides an efficient way of browsing content items that will be available in the future, which additionally reduces power usage and improves battery life of the electronic device by enabling the user to use the electronic device more quickly and efficiently.

In some embodiments, such as in FIG. 8F, while displaying a content guide user interface associated with a first genre of content that does not include the playback control element and the plurality of representations of additional content corresponding to live media overlaid on the content, the electronic device (e.g., 500) displays, in the content guide user interface associated with the first genre of content, a plurality of representations (e.g., 826*a*-826*d*) of first content corresponding to live media of the first genre that is currently available for viewing from a plurality of content sources, wherein the content guide user interface associated with the first genre does not include representations of content corresponding to live media that is not currently available for viewing (e.g., content items corresponding to live media that were previously available for viewing, content items corresponding to live media that will be available for viewing in the future). In some embodiments, in response to detecting selection of one of the representations of first content, the electronic device presents the first content corresponding to the selected representation (and optionally ceases display of the content guide user interface associated with the first genre of content). In some embodiments, the first genre is one of movies, TV shows, sports, kids content, news, etc.

In some embodiments, such as in FIG. 8F, while displaying a content guide user interface associated with a first genre of content that does not include the playback control element and the plurality of representations of additional content corresponding to live media overlaid on the content, while displaying the plurality of representations (e.g., 826*a*-826*d*) of first content corresponding to live media of the first genre, the electronic device (e.g., 500) receives, via the one or more input devices (e.g., 510*a*), a respective input corresponding to a request to display a content guide user interface associated with a second genre of content, different from the first genre of content. In some embodiments, the second genre is one of movies, TV shows, sports, kids content, news, etc. that is different from the first genre. In some embodiments, the content guide user interface includes a plurality of selectable options that, when selected, cause the electronic device to present a content guide user interface associated with a genre of the selected option. For example, the respective input is selection of a selectable option associated with the second genre of content.

In some embodiments, such as in FIG. 8G, in response to receiving the respective input, the electronic device (e.g., 500) ceases display of the plurality of representations of first content corresponding to live media of the first genre that is currently available for viewing.

In some embodiments, such as in FIG. 8G, in response to receiving the respective input, the electronic device (e.g., 500) displays the content guide user interface associated with the second genre of content that includes a plurality of representations (e.g., 826*e*-826*h*) of second content corresponding to live media of the second genre that is currently available for viewing, wherein the content guide user interface associated with the second genre does not include representations of content corresponding to live media that is not currently available for viewing (e.g., content items corresponding to live media that were previously available for viewing, content items corresponding to live media that will be available for viewing in the future). In some embodiments, in response to detecting selection of one of the representations of second content, the electronic device presents the second content corresponding to the selected representation (and optionally ceases display of the content guide user interface associated with the second genre of content). The above-described manner of displaying content guide user interfaces associated with respective genres provides an efficient way of finding content items of a selected genre, which additionally reduces power usage and improves battery life of the electronic device by enabling the user to use the electronic device more quickly and efficiently.

In some embodiments, such as in FIG. 8E, while displaying a content guide user interface that does not include the playback control element and the plurality of representations of additional content corresponding to live media overlaid on the content, the electronic device (e.g., 500) displays, in the content guide user interface, a first representation (e.g., 826*c*) of first content corresponding to a sports game that is currently available for viewing, the first representation (e.g., 826*c*) including sports metadata (e.g., 828*c*). In some embodiments, the sports metadata includes one or more of the game clock (e.g., different from the duration for which the game has been playing), the portion (e.g., inning, quarter) of the first content currently available for playback, and the league of the game. In some embodiments, the first representation further includes an indication of the title of the first content and an image (e.g., a still image or live preview) corresponding to the first content. In some embodiments, in response to detecting selection of one of the representations of additional content, the electronic device displays the content corresponding to the selected representation.

In some embodiments, such as in FIG. 8G, while displaying a content guide user interface that does not include the playback control element and the plurality of representations of additional content corresponding to live media overlaid on the content, the electronic device (e.g., 500) displays, in the content guide user interface, a second representation (e.g., 825*f*) of second content not corresponding to a sports game, the second representation not including the sports metadata. In some embodiments, the second representation includes an indication of the title of the second content and an image (e.g., a still image or live preview) corresponding to the second content.

The above-described manner of displaying a representation of a sports game with sports metadata and a representation of content other than a sports game without the sports metadata provides an efficient way of presenting relevant information about content items in the content guide user interface which additionally reduces power usage and improves battery life of the electronic device by enabling the user to use the electronic device more quickly and efficiently.

In some embodiments, such as in FIG. 8B, while displaying the content (e.g., with or without displaying the playback control element and the plurality of representations of additional content corresponding to live content), the electronic device (e.g., 500) receives, via the one or more input devices (e.g., 510*b*), a second input. In some embodiments, the second input is a downward directional input (e.g., swipe, selection of directional button or key on an input device) received while displaying the playback control element and the plurality of representations of additional content corresponding to live content. In some embodiments, the second input is received while the electronic device is not displaying the playback control element and the plurality of representations of additional content corresponding to live content.

In some embodiments, such as in FIG. 8C in response to receiving the second input, the electronic device (e.g., 500) displays, overlaid on the content, a content guide user interface that does not include the playback control element and the plurality of representations of additional content corresponding to live media.

In some embodiments, such as in FIG. 8C, the content guide user interface includes a plurality of first representations (e.g., 818*a*-818*e*) of content sources associated with live media displayed in association with (e.g., adjacent to, aligned with, in a corresponding order with) a plurality of representations (e.g., 820*a*-820*e*) of respective additional content corresponding to live media. In some embodiments, the plurality of representations of respective additional content include images corresponding to the respective additional content. In some embodiments, in response to detecting selection of one of the representations, the electronic device ceases playback of the content and initiates playback of the additional content corresponding to the selected representation. In some embodiments, the representations of respective additional content corresponding to live media correspond to content items currently available for playback. In some embodiments, the content guide user interface does not include representations of content items corresponding to live media that are not currently available for playback (e.g., but were previously available for playback, but will be available for playback in the future).

In some embodiments, such as in FIG. 8C, the content guide user interface includes a respective representation (e.g., 818*c*) of a content source associated with the content (e.g., 802*a*) displayed in association with (e.g., proximate to, aligned with, in a corresponding order with the other representations of content sources and additional content) an indication (e.g., 820*c*) that the content source is associated with the content. In some embodiments, the indication that the content source is associated with the content does not include an image associated with the content. In some embodiments, the content guide user interface further includes second representations of content sources not displayed in association with representations of respective additional content. In some embodiments, the content guide user interface includes a greater number of representations of content sources than the number of representations of respective additional content plus the indication that the content source is associated with the content.

The above-described manner of displaying the representations of content sources in association with representations of respective additional content and the indication that the content source is associated with the content provides an efficient way of browsing content available for playback and the content sources of the content, which additionally reduces power usage and improves battery life of the electronic device by enabling the user to use the electronic device more quickly and efficiently.

It should be understood that the particular order in which the operations in FIG. 9 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 700) are also applicable in an analogous manner to method 900 described above with respect to FIG. 9. For example, the ways of presenting a user interface for controlling the playback of content items described above with reference to method 900 optionally have one or more of the characteristics of the ways of presenting user interfaces for browsing and switching between content items, etc., described herein with reference to other methods described herein (e.g., method 700). For brevity, these details are not repeated here.

The operations in the information processing methods described above are, optionally, implemented by running one or more functional modules in an information processing apparatus such as general purpose processors (e.g., a as described with respect to FIGS. 1A-1B, 3, 5A-5C) or application specific chips. Further, the operations described above with reference to FIG. 9 are, optionally, implemented by components depicted in FIGS. 1A-1B. For example, presenting operation 902, displaying operation 904, and receiving input 910 are, optionally, implemented by event sorter 170, event recognizer 180, and event handler 190. Event monitor 171 in event sorter 170 detects a contact on touch screen 504, and event dispatcher module 174 delivers the event information to application 136-1. A respective event recognizer 180 of application 136-1 compares the event information to respective event definitions 186, and determines whether a first contact at a first location on the touch screen corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve content consumption. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to recommend content items based on content consumption history of (e.g., a user account associated with) an electronic device. Accordingly, use of such personal information data enables users to discover new content they will enjoy. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of content recommendations, the present technology can be configured to allow users to select to "opt in" or "opt out" of participation in the collection of personal information data during registration for services or anytime thereafter. In another example, users can select not to share data associated with the user. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, the system can provide content recommendations by inferring preferences based on non-personal information data or a bare minimum amount of personal information, such as the content being requested by the device associated with a user, other non-personal information available to the content services, or publicly available information.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method comprising:
at an electronic device in communication with a display generation component and one or more input devices:
presenting, via the display generation component, content corresponding to live media;
while presenting the content, concurrently displaying, via the display generation component, overlaid on the content:
a playback control element for the content; and
a plurality of representations of additional content corresponding to live media, wherein displaying the plurality of representations of additional content includes:
in accordance with a determination that a respective representation of respective content of the plurality of representations of additional content has a current focus of the electronic device, the respective representation is displayed with an indication of metadata associated with the respective content; and
in accordance with a determination that the respective representation of the respective content does not have the current focus of the electronic device, the respective representation is displayed without the indication of metadata associated with the respective content;
while concurrently displaying the playback control element and the plurality of representations of the additional content corresponding to live media overlaid on the content, receiving, via the one or more input devices, an input; and
in response to receiving the input:
ceasing display of the plurality of representations of additional content corresponding to live media; and
displaying, overlaid on the content, a plurality of representations of on-demand content items.

2. The method of claim 1, wherein the additional content corresponding to live media is provided by a plurality of content sources selected by a user of the electronic device.

3. The method of claim 1, further comprising:
prior to receiving, via the one or more input devices, an input corresponding to selection of a respective representation of respective content included in the plurality of representations of additional content corresponding to live media, wherein the respective representation of the respective content has a current focus, concurrently displaying, via the display generation component, the respective content without playing audio associated with the respective content, wherein the playback control element and the plurality of representations of additional content are overlaid on the respective content;
while displaying the respective content without playing the audio associated with the respective content and while the respective representation has the current focus, receiving, via the one or more input devices, the input corresponding to selection of the respective representation of the respective content; and
in response to receiving the input corresponding to selection of the respective representation of the respective content:
continuing to display the respective content; and
playing the audio associated with the respective content.

4. The method of claim 1, wherein the plurality of representations of additional content corresponding to live media include images corresponding to portions of the additional content currently available for live playback.

5. The method of claim 1, wherein the plurality of representations of additional content corresponding to live media include visual indications of playback positions corresponding to portions of the additional content currently available for live playback.

6. The method of claim 1, further comprising:
while concurrently displaying the playback control element and the plurality of representations of the additional content corresponding to live media overlaid on the content, receiving, via the one or more input devices, a second input;
in response to receiving the second input:
ceasing display of the plurality of representations of additional content corresponding to live media; and
displaying, overlaid on the content, information corresponding to the content.

7. The method of claim 1, further comprising:
while concurrently displaying the playback control element and the plurality of representations of the additional content corresponding to live media overlaid on the content, receiving, via the one or more input devices, a second input; and in response to receiving the second input:
ceasing concurrent display of the playback control element and the plurality of representations of additional content corresponding to live media overlaid on the content; and
displaying, via the display generation component, a content guide user interface including representations of respective content corresponding to live media displayed in association with indications of respective content sources associated with the respective content corresponding to live media.

8. The method of claim 1, further comprising:
while displaying the content without displaying the playback control element and the plurality of representations of additional content corresponding to live content, receiving, via the one or more input devices, a second input; and in response to receiving the second input, displaying a user interface that includes:
a plurality of first representations of first content sources associated with live media displayed in association with a plurality of representations of respective additional content corresponding to live media available from the first content sources that is currently available for viewing, a plurality of second representations of second content sources associated with live media that is currently available for viewing not displayed in association with a plurality of representations of respective additional content corresponding to live media available from the second content sources, and the content displayed in association with a respective representation of a respective content source associated with the content.

9. The method of claim 1, further comprising:
displaying, via the display generation component, a content guide user interface that does not include the playback control element and the plurality of representations of additional content corresponding to live media overlaid on the content, wherein the content guide user interface includes:
   a first representation of first content corresponding to live media that includes a graphical representation of the first content, and
   a second representation of second content corresponding to live media that includes a graphical representation of the second content,
wherein:
   in accordance with a determination that the first representation has a current focus, the graphical representation of the first content is a first live video and the graphical representation of the second content is a first still image, and in accordance with a determination that the second representation has the current focus, the graphical representation of the second content is a second live video and the graphical representation of the second content is a second still image.

10. The method of claim 9, wherein:
the first representation of the first content has a first size corresponding to a duration of the first content,
the second representation of the second content has a second size, different from the first size, corresponding to a duration of the second content, different from the duration of the first content,
the graphical representation of the first content has a size independent of the duration of the first content, and
the graphical representation of the second content has a size independent of the duration of the second content.

11. The method of claim 1, further comprising:
while displaying a content guide user interface associated with a respective genre of content that does not include the playback control element and the plurality of representations of additional content corresponding to live media overlaid on the content, displaying, in the content guide user interface associated with the respective genre of content:
   a first representation of first content corresponding to live media of the respective genre that is currently available for viewing from a first content source; and
   a second representation of second content corresponding to live media of the respective genre that is currently available for viewing from a second content source, different from the first content source,
wherein:
   the content guide user interface does not include representations of content corresponding to live media that is not currently available for viewing,
   in accordance with a determination that the first representation has a current focus, the first representation includes a visual indication of a third content item corresponding to live media that will be available for viewing from the first content source after the first content and the second representation does not include a visual indication of a fourth content item corresponding to live media that will be available for viewing from the second content source after the second content, and
   in accordance with a determination that the second representation has the current focus, the second representation includes the visual indication of the fourth content item corresponding to live media that will be available for viewing from the second content source after the second content and the first representation does not include the visual indication of the third content item corresponding to live media that will be available for viewing from the first content source after the first content.

12. The method of claim 1, further comprising:
while displaying a content guide user interface associated with a first genre of content that does not include the playback control element and the plurality of representations of additional content corresponding to live media overlaid on the content:
   displaying, in the content guide user interface associated with the first genre of content, a plurality of representations of first content corresponding to live media of the first genre that is currently available for viewing from a plurality of content sources, wherein the content guide user interface associated with the first genre does not include representations of content corresponding to live media that is not currently available for viewing; and
   while displaying the plurality of representations of first content corresponding to live media of the first genre, receiving, via the one or more input devices, a respective input corresponding to a request to display a content guide user interface associated with a second genre of content, different from the first genre of content; and
in response to receiving the respective input:
   ceasing display of the plurality of representations of first content corresponding to live media of the first genre that is currently available for viewing; and
   displaying the content guide user interface associated with the second genre of content that includes a plurality of representations of second content corresponding to live media of the second genre that is currently available for viewing, wherein the content guide user interface associated with the second genre does not include representations of content corresponding to live media that is not currently available for viewing.

13. The method of claim 1, further comprising:
while displaying a content guide user interface that does not include the playback control element and the plurality of representations of additional content corresponding to live media overlaid on the content, displaying, in the content guide user interface:

a first representation of first content corresponding to a sports game that is currently available for viewing, the first representation including sports metadata, and a second representation of second content not corresponding to a sports game, the second representation not including the sports metadata.

14. The method of claim 1, further comprising:
while displaying the content, receiving, via the one or more input devices, a second input;
in response to receiving the second input, displaying, overlaid on the content, a content guide user interface that does not include the playback control element and the plurality of representations of additional content corresponding to live media, wherein the content guide user interface includes:
  a plurality of first representations of content sources associated with live media displayed in association with a plurality of representations of respective additional content corresponding to live media, and
  a respective representation of a content source associated with the content displayed in association with an indication that the content source is associated with the content.

15. An electronic device, comprising:
one or more processors;
memory; and
one or more programs, wherein the one or more programs are stored in the memory and configured to be executed by the one or more processors, the one or more programs including instructions for:
presenting, via a display generation component, content corresponding to live media;
while presenting the content, concurrently displaying, via the display generation component, overlaid on the content:
  a playback control element for the content; and
  a plurality of representations of additional content corresponding to live media, wherein displaying the plurality of representations of additional content includes:
    in accordance with a determination that a respective representation of respective content of the plurality of representations of additional content has a current focus of the electronic device, the respective representation is displayed with an indication of metadata associated with the respective content; and
    in accordance with a determination that the respective representation of the respective content does not have the current focus of the electronic device, the respective representation is displayed without the indication of metadata associated with the respective content;
while concurrently displaying the playback control element and the plurality of representations of the additional content corresponding to live media overlaid on the content, receiving, via one or more input devices, an input; and
in response to receiving the input:
  ceasing display of the plurality of representations of additional content corresponding to live media; and
  displaying, overlaid on the content, a plurality of representations of on-demand content items.

16. The electronic device of claim 15, wherein the additional content corresponding to live media is provided by a plurality of content sources selected by a user of the electronic device.

17. The electronic device of claim 15, wherein the one or more programs further include instructions for:
prior to receiving, via the one or more input devices, an input corresponding to selection of a respective representation of respective content included in the plurality of representations of additional content corresponding to live media, wherein the respective representation of the respective content has a current focus, concurrently displaying, via the display generation component, the respective content without playing audio associated with the respective content, wherein the playback control element and the plurality of representations of additional content are overlaid on the respective content;
while displaying the respective content without playing the audio associated with the respective content and while the respective representation has the current focus, receiving, via the one or more input devices, the input corresponding to selection of the respective representation of the respective content; and
in response to receiving the input corresponding to selection of the respective representation of the respective content:
  continuing to display the respective content; and
  playing the audio associated with the respective content.

18. The electronic device of claim 15, wherein the plurality of representations of additional content corresponding to live media include images corresponding to portions of the additional content currently available for live playback.

19. The electronic device of claim 15, wherein the plurality of representations of additional content corresponding to live media include visual indications of playback positions corresponding to portions of the additional content currently available for live playback.

20. The electronic device of claim 15, wherein the one or more programs further include instructions for:
while concurrently displaying the playback control element and the plurality of representations of the additional content corresponding to live media overlaid on the content, receiving, via the one or more input devices, a second input;
in response to receiving the second input:
  ceasing display of the plurality of representations of additional content corresponding to live media; and
  displaying, overlaid on the content, information corresponding to the content.

21. The electronic device of claim 15, wherein the one or more programs further include instructions for:
while concurrently displaying the playback control element and the plurality of representations of the additional content corresponding to live media overlaid on the content, receiving, via the one or more input devices, a second input; and in response to receiving the second input:
  ceasing concurrent display of the playback control element and the plurality of representations of additional content corresponding to live media overlaid on the content; and
  displaying, via the display generation component, a content guide user interface including representations of respective content corresponding to live media displayed in association with indications of respective content sources associated with the respective content corresponding to live media.

22. The electronic device of claim 15, wherein the one or more programs further include instructions for:
while displaying the content without displaying the playback control element and the plurality of representations of additional content corresponding to live content, receiving, via the one or more input devices, a second input; and
in response to receiving the second input, displaying a user interface that includes:
a plurality of first representations of first content sources associated with live media displayed in association with a plurality of representations of respective additional content corresponding to live media available from the first content sources that is currently available for viewing, a plurality of second representations of second content sources associated with live media that is currently available for viewing not displayed in association with a plurality of representations of respective additional content corresponding to live media available from the second content sources, and the content displayed in association with a respective representation of a respective content source associated with the content.

23. The electronic device of claim 15, wherein the one or more programs further include instructions for:
displaying, via the display generation component, a content guide user interface that does not include the playback control element and the plurality of representations of additional content corresponding to live media overlaid on the content, wherein the content guide user interface includes:
a first representation of first content corresponding to live media that includes a graphical representation of the first content, and
a second representation of second content corresponding to live media that includes a graphical representation of the second content,
wherein:
in accordance with a determination that the first representation has a current focus, the graphical representation of the first content is a first live video and the graphical representation of the second content is a first still image, and in accordance with a determination that the second representation has the current focus, the graphical representation of the second content is a second live video and the graphical representation of the second content is a second still image.

24. The electronic device of claim 23, wherein:
the first representation of the first content has a first size corresponding to a duration of the first content,
the second representation of the second content has a second size, different from the first size, corresponding to a duration of the second content, different from the duration of the first content,
the graphical representation of the first content has a size independent of the duration of the first content, and
the graphical representation of the second content has a size independent of the duration of the second content.

25. The electronic device of claim 15, wherein the one or more programs further include instructions for:
while displaying a content guide user interface associated with a respective genre of content that does not include the playback control element and the plurality of representations of additional content corresponding to live media overlaid on the content, displaying, in the content guide user interface associated with the respective genre of content:
a first representation of first content corresponding to live media of the respective genre that is currently available for viewing from a first content source; and
a second representation of second content corresponding to live media of the respective genre that is currently available for viewing from a second content source, different from the first content source,
wherein:
the content guide user interface does not include representations of content corresponding to live media that is not currently available for viewing,
in accordance with a determination that the first representation has a current focus, the first representation includes a visual indication of a third content item corresponding to live media that will be available for viewing from the first content source after the first content and the second representation does not include a visual indication of a fourth content item corresponding to live media that will be available for viewing from the second content source after the second content, and
in accordance with a determination that the second representation has the current focus, the second representation includes the visual indication of the fourth content item corresponding to live media that will be available for viewing from the second content source after the second content and the first representation does not include the visual indication of the third content item corresponding to live media that will be available for viewing from the first content source after the first content.

26. The electronic device of claim 15, wherein the one or more programs further include instructions for:
while displaying a content guide user interface associated with a first genre of content that does not include the playback control element and the plurality of representations of additional content corresponding to live media overlaid on the content:
displaying, in the content guide user interface associated with the first genre of content, a plurality of representations of first content corresponding to live media of the first genre that is currently available for viewing from a plurality of content sources, wherein the content guide user interface associated with the first genre does not include representations of content corresponding to live media that is not currently available for viewing; and
while displaying the plurality of representations of first content corresponding to live media of the first genre, receiving, via the one or more input devices, a respective input corresponding to a request to display a content guide user interface associated with a second genre of content, different from the first genre of content; and
in response to receiving the respective input:
ceasing display of the plurality of representations of first content corresponding to live media of the first genre that is currently available for viewing; and
displaying the content guide user interface associated with the second genre of content that includes a plurality of representations of second content corresponding to live media of the second genre that is currently available for viewing, wherein the content guide user interface associated with the second genre does not include representations of content corresponding to live media that is not currently available for viewing.

27. The electronic device of claim 15, wherein the one or more programs further include instructions for:
while displaying a content guide user interface that does not include the playback control element and the plurality of representations of additional content corresponding to live media overlaid on the content, displaying, in the content guide user interface:
a first representation of first content corresponding to a sports game that is currently available for viewing, the first representation including sports metadata, and
a second representation of second content not corresponding to a sports game, the second representation not including the sports metadata.

28. The electronic device of claim 15, wherein the one or more programs further include instructions for:
while displaying the content, receiving, via the one or more input devices, a second input;
in response to receiving the second input, displaying, overlaid on the content, a content guide user interface that does not include the playback control element and the plurality of representations of additional content corresponding to live media, wherein the content guide user interface includes:
a plurality of first representations of content sources associated with live media displayed in association with a plurality of representations of respective additional content corresponding to live media, and
a respective representation of a content source associated with the content displayed in association with an indication that the content source is associated with the content.

29. A non-transitory computer readable storage medium storing one or more programs, the one or more programs comprising instructions, which when executed by one or more processors of an electronic device, cause the electronic device to perform a method comprising:
presenting, via a display generation component, content corresponding to live media;
while presenting the content, concurrently displaying, via the display generation component, overlaid on the content:
a playback control element for the content; and
a plurality of representations of additional content corresponding to live media, wherein displaying the plurality of representations of additional content includes:
in accordance with a determination that a respective representation of respective content of the plurality of representations of additional content has a current focus of the electronic device, the respective representation is displayed with an indication of metadata associated with the respective content; and
in accordance with a determination that the respective representation of the respective content does not have the current focus of the electronic device, the respective representation is displayed without the indication of metadata associated with the respective content;
while concurrently displaying the playback control element and the plurality of representations of the additional content corresponding to live media overlaid on the content, receiving, via one or more input devices, an input; and
in response to receiving the input:
ceasing display of the plurality of representations of additional content corresponding to live media; and
displaying, overlaid on the content, a plurality of representations of on-demand content items.

30. The non-transitory computer readable storage medium of claim 29, wherein the additional content corresponding to live media is provided by a plurality of content sources selected by a user of the electronic device.

31. The non-transitory computer readable storage medium of claim 29, wherein the method further comprises:
prior to receiving, via the one or more input devices, an input corresponding to selection of a respective representation of respective content included in the plurality of representations of additional content corresponding to live media, wherein the respective representation of the respective content has a current focus, concurrently displaying, via the display generation component, the respective content without playing audio associated with the respective content, wherein the playback control element and the plurality of representations of additional content are overlaid on the respective content;
while displaying the respective content without playing the audio associated with the respective content and while the respective representation has the current focus, receiving, via the one or more input devices, the input corresponding to selection of the respective representation of the respective content; and
in response to receiving the input corresponding to selection of the respective representation of the respective content:
continuing to display the respective content; and
playing the audio associated with the respective content.

32. The non-transitory computer readable storage medium of claim 29, wherein the plurality of representations of additional content corresponding to live media include images corresponding to portions of the additional content currently available for live playback.

33. The non-transitory computer readable storage medium of claim 29, wherein the plurality of representations of additional content corresponding to live media include visual indications of playback positions corresponding to portions of the additional content currently available for live playback.

34. The non-transitory computer readable storage medium of claim 29, wherein the method further comprises:
while concurrently displaying the playback control element and the plurality of representations of the additional content corresponding to live media overlaid on the content, receiving, via the one or more input devices, a second input;
in response to receiving the second input:
ceasing display of the plurality of representations of additional content corresponding to live media; and
displaying, overlaid on the content, information corresponding to the content.

35. The non-transitory computer readable storage medium of claim 29, wherein the method further comprises:
while concurrently displaying the playback control element and the plurality of representations of the additional content corresponding to live media overlaid on the content, receiving, via the one or more input devices, a second input; and in response to receiving the second input:

ceasing concurrent display of the playback control element and the plurality of representations of additional content corresponding to live media overlaid on the content; and displaying, via the display generation component, a content guide user interface including representations of respective content corresponding to live media displayed in association with indications of respective content sources associated with the respective content corresponding to live media.

36. The non-transitory computer readable storage medium of claim 29, wherein the method further comprises:

while displaying the content without displaying the playback control element and the plurality of representations of additional content corresponding to live content, receiving, via the one or more input devices, a second input; and in response to receiving the second input, displaying a user interface that includes:

a plurality of first representations of first content sources associated with live media displayed in association with a plurality of representations of respective additional content corresponding to live media available from the first content sources that is currently available for viewing, a plurality of second representations of second content sources associated with live media that is currently available for viewing not displayed in association with a plurality of representations of respective additional content corresponding to live media available from the second content sources, and the content displayed in association with a respective representation of a respective content source associated with the content.

37. The non-transitory computer readable storage medium of claim 29, wherein the method further comprises:

displaying, via the display generation component, a content guide user interface that does not include the playback control element and the plurality of representations of additional content corresponding to live media overlaid on the content, wherein the content guide user interface includes:

a first representation of first content corresponding to live media that includes a graphical representation of the first content, and a second representation of second content corresponding to live media that includes a graphical representation of the second content, wherein:

in accordance with a determination that the first representation has a current focus, the graphical representation of the first content is a first live video and the graphical representation of the second content is a first still image, and in accordance with a determination that the second representation has the current focus, the graphical representation of the second content is a second live video and the graphical representation of the second content is a second still image.

38. The non-transitory computer readable storage medium of claim 37, wherein:

the first representation of the first content has a first size corresponding to a duration of the first content, the second representation of the second content has a second size, different from the first size, corresponding to a duration of the second content, different from the duration of the first content, the graphical representation of the first content has a size independent of the duration of the first content, and the graphical representation of the second content has a size independent of the duration of the second content.

39. The non-transitory computer readable storage medium of claim 29, wherein the method further comprises:

while displaying a content guide user interface associated with a respective genre of content that does not include the playback control element and the plurality of representations of additional content corresponding to live media overlaid on the content, displaying, in the content guide user interface associated with the respective genre of content:

a first representation of first content corresponding to live media of the respective genre that is currently available for viewing from a first content source; and a second representation of second content corresponding to live media of the respective genre that is currently available for viewing from a second content source, different from the first content source, wherein:

the content guide user interface does not include representations of content corresponding to live media that is not currently available for viewing, in accordance with a determination that the first representation has a current focus, the first representation includes a visual indication of a third content item corresponding to live media that will be available for viewing from the first content source after the first content and the second representation does not include a visual indication of a fourth content item corresponding to live media that will be available for viewing from the second content source after the second content, and in accordance with a determination that the second representation has the current focus, the second representation includes the visual indication of the fourth content item corresponding to live media that will be available for viewing from the second content source after the second content and the first representation does not include the visual indication of the third content item corresponding to live media that will be available for viewing from the first content source after the first content.

40. The non-transitory computer readable storage medium of claim 29, wherein the method further comprises:

while displaying a content guide user interface associated with a first genre of content that does not include the playback control element and the plurality of representations of additional content corresponding to live media overlaid on the content:

displaying, in the content guide user interface associated with the first genre of content, a plurality of representations of first content corresponding to live media of the first genre that is currently available for viewing from a plurality of content sources, wherein the content guide user interface associated with the first genre does not include representations of content corresponding to live media that is not currently available for viewing; and while displaying the plurality of representations of first content corresponding to live media of the first genre, receiving, via the one or more input devices, a respective input corresponding to a request to display a content guide user interface associated with a second genre of content, different from the first genre of content; and in response to receiving the respective input:

ceasing display of the plurality of representations of first content corresponding to live media of the first genre that is currently available for viewing; and displaying the content guide user interface associated with the second genre of content that includes a plurality of representations of second content corresponding to live media of the second genre that is currently available for viewing, wherein the content guide user interface associated with the second genre does not include representations of content corresponding to live media that is not currently available for viewing.

41. The non-transitory computer readable storage medium of claim 29, wherein the method further comprises:

while displaying a content guide user interface that does not include the playback control element and the plurality of representations of additional content corresponding to live media overlaid on the content, displaying, in the content guide user interface:

a first representation of first content corresponding to a sports game that is currently available for viewing, the first representation including sports metadata, and a second representation of second content not corresponding to a sports game, the second representation not including the sports metadata.

42. The non-transitory computer readable storage medium of claim 29, wherein the method further comprises:

while displaying the content, receiving, via the one or more input devices, a second input;

in response to receiving the second input, displaying, overlaid on the content, a content guide user interface that does not include the playback control element and the plurality of representations of additional content corresponding to live media, wherein the content guide user interface includes:

a plurality of first representations of content sources associated with live media displayed in association with a plurality of representations of respective additional content corresponding to live media, and a respective representation of a content source associated with the content displayed in association with an indication that the content source is associated with the content.

\* \* \* \* \*